(12) United States Patent
Yano

(10) Patent No.: US 8,706,671 B2
(45) Date of Patent: Apr. 22, 2014

(54) TRAVEL PROCESS PREDICTION SYSTEM, TRAVEL PROCESS PREDICTION APPARATUS AND NON-TRANSITORY RECORDING MEDIUM

(75) Inventor: Koichi Yano, Kisarazu (JP)

(73) Assignee: The Aqua Enterprise Company, Kisarazu-Shi Chiba (JP)

( * ) Notice: Subject to any disclaimer, the term of this patent is extended or adjusted under 35 U.S.C. 154(b) by 0 days.

(21) Appl. No.: 13/978,124

(22) PCT Filed: Dec. 13, 2011

(86) PCT No.: PCT/JP2011/078743
§ 371 (c)(1),
(2), (4) Date: Jul. 2, 2013

(87) PCT Pub. No.: WO2012/093560
PCT Pub. Date: Jul. 12, 2012

(65) Prior Publication Data
US 2013/0297549 A1 Nov. 7, 2013

(30) Foreign Application Priority Data
Jan. 6, 2011 (WO) .................. PCT/JP2011/050105

(51) Int. Cl.
*G06F 17/00* (2006.01)
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| 5,313,052 A | 5/1994 | Watanabe et al. |
| 5,478,991 A | 12/1995 | Watanabe et al. |

(Continued)

FOREIGN PATENT DOCUMENTS

| JP | 05-012311 A | 1/1993 |
| JP | 09-097282 A | 4/1997 |

(Continued)

OTHER PUBLICATIONS

Travel-Time Prediction using Gaussian Process Regression: A Trajectory-Based Approach IBM Tokyo Research Lab. Tsuyoshi Idé.*

(Continued)

*Primary Examiner* — Kakali Chaki
*Assistant Examiner* — Ababacar Seck
(74) *Attorney, Agent, or Firm* — Bret E. Field; Bozicevic, Field & Francis, LLP

(57) ABSTRACT

An information acquiring apparatus acquires, when a travel object such as a traveler travels with transportation, passage time at which the travel object passes through each passage point at a departure/arrival facility, transportation specifying information indicating transportation, situation information indicating a situation and so forth. The travel process prediction apparatus stores the acquired information in an associated manner, and obtains a regression equation representing the relationship between items included in the transportation specifying information or situation information and passage time at a specific passage point, elapsed time while the travel object passes through two specific passage points or a result of comparison between the passage time and boarding completion time. The travel process prediction apparatus calculates a predicted value of future passage time, elapsed time or a result of comparison by substituting the content of the expected transportation specifying information or situation information for the regression equation.

36 Claims, 22 Drawing Sheets

(56) References Cited

U.S. PATENT DOCUMENTS

| | | |
|---|---|---|
| 5,511,045 A | 4/1996 | Sasaki et al. |
| 6,076,041 A | 6/2000 | Watanabe |
| 7,932,812 B2 | 4/2011 | Nerat |
| 8,049,616 B2 | 11/2011 | Hill |
| 2004/0174264 A1 | 9/2004 | Reisman et al. |
| 2005/0128304 A1 | 6/2005 | Manasseh et al. |
| 2007/0230656 A1 | 10/2007 | Lowes et al. |

FOREIGN PATENT DOCUMENTS

| | | | |
|---|---|---|---|
| JP | 10-188056 A | 7/1998 | |
| JP | 10-293035 A | 11/1998 | |
| JP | 11-282913 A | 10/1999 | |
| JP | 2002-034073 A | 1/2002 | |
| JP | 2002-145067 A | 5/2002 | |
| JP | 2002-245133 A | 8/2002 | |
| JP | 2003-025995 A | 1/2003 | |
| JP | 2003-276609 A | 10/2003 | |
| JP | 2005-024517 A | 1/2005 | |
| JP | 2006-039978 A | 2/2006 | |
| JP | 2006-127322 A | 5/2006 | |
| JP | 2007-334901 A | 12/2007 | |
| JP | 2008-226164 A | 9/2008 | |
| JP | 2010-061413 A | 3/2010 | |

OTHER PUBLICATIONS

Travel-Time Prediction With Support Vector Regression Chun-Hsin Wu, Member, IEEE, Jan-Ming Ho, Member, IEEE, and D. T. Lee, Fellow, IEEE.*

* cited by examiner

FIG. 8

| | OBSERVATION DATA NUMBER | 1 | 2 | ... |
|---|---|---|---|---|
| TRAVELER | ID | | | ... |
| | NAME | | | ... |
| | AGE | | | ... |
| | LANGUAGE | | | ... |
| | ⋮ | ⋮ | ⋮ | ... |
| BAGGAGE | ID | | | ... |
| | OWNER'S ID | | | ... |
| | WEIGHT | | | ... |
| | ⋮ | ⋮ | ⋮ | ... |
| FLIGHT | FLIGHT NUMBER | | | ... |
| | FLIGHT TYPE | | | ... |
| | DEPARTURE PLACE | | | ... |
| | ARRIVAL PLACE | | | ... |
| | SCHEDULED TIME OF DEPARTURE | | | ... |
| | SCHEDULED TIME OF ARRIVAL | | | ... |
| | ⋮ | ⋮ | ⋮ | ... |
| | ACTUAL DEPARTURE DATE AND TIME | | | ... |
| | ACTUAL ARRIVAL DATE AND TIME | | | ... |
| | BOARDING COMPLETION TIME | | | ... |
| | SEAT NUMBER | | | ... |
| | ⋮ | ⋮ | ⋮ | ... |
| DEPARTURE AIRPORT | YEAR/MONTH/DATE | | | ... |
| | NAME OF AIRPORT | | | ... |
| | LANGUAGE | | | ... |
| | TERMINAL | | | ... |
| | WEATHER | | | ... |
| | ⋮ | ⋮ | ⋮ | ... |
| | CHECK MACHINE NO. | | | ... |
| | PASSAGE DATE AND TIME (NO. A) | | | ... |
| | COMPARISON DATA (NO. A) | | | ... |
| | PHOTOGRAPH (NO. A) | | | ... |
| | ⋮ | ⋮ | ⋮ | ... |
| | ELAPSED TIME (NO. A → NO. B) | | | ... |
| | ⋮ | ⋮ | ⋮ | ... |
| ARRIVAL AIRPORT | YEAR/MONTH/DATE | | | ... |
| | ⋮ | ⋮ | ⋮ | ... |
| | NAME OF A CHANGED ITEM | | | ... |
| | WHETHER OR NOT ABNORMALITY IS OCCURRED | | | ... |
| | ⋮ | ⋮ | ⋮ | ... |

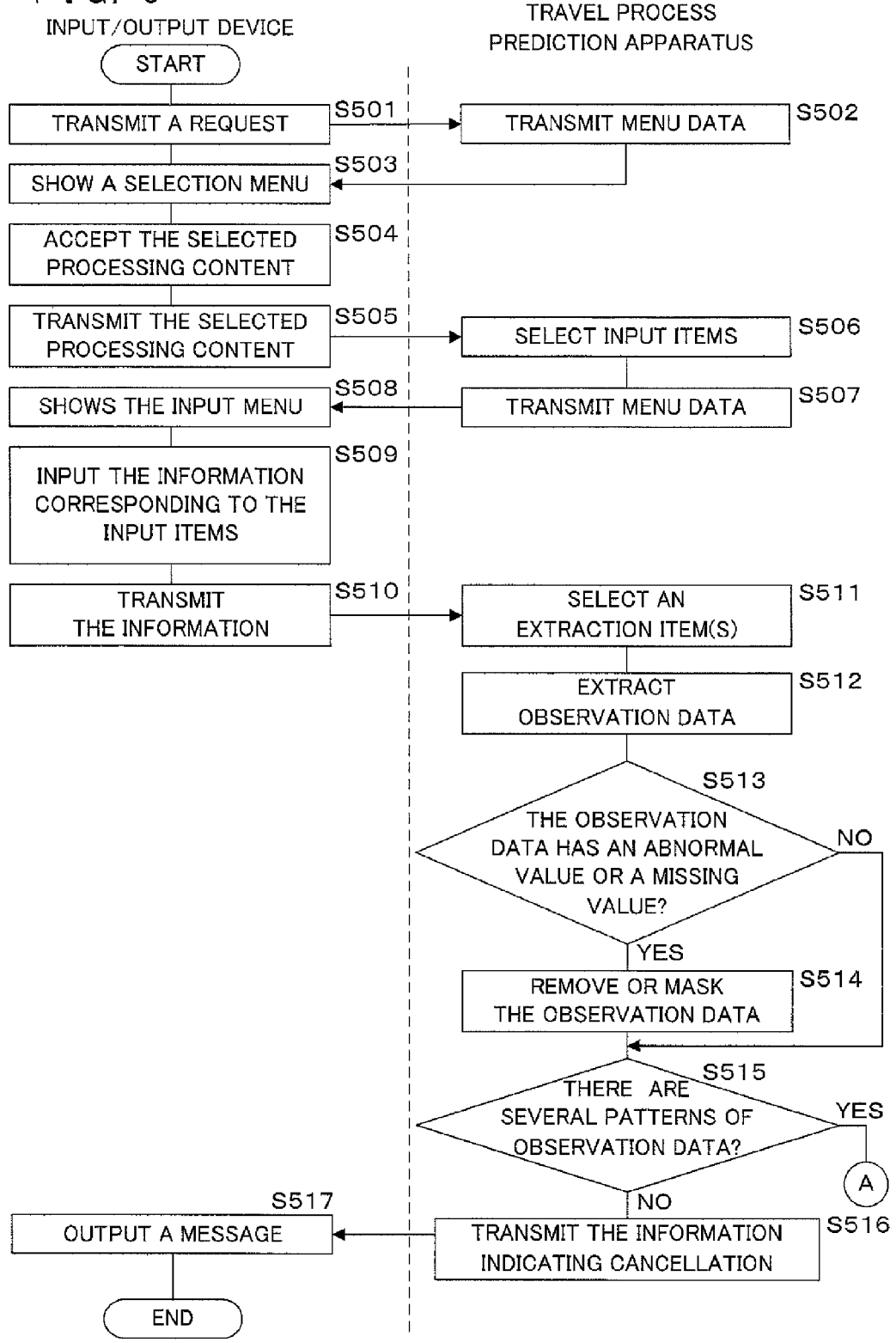

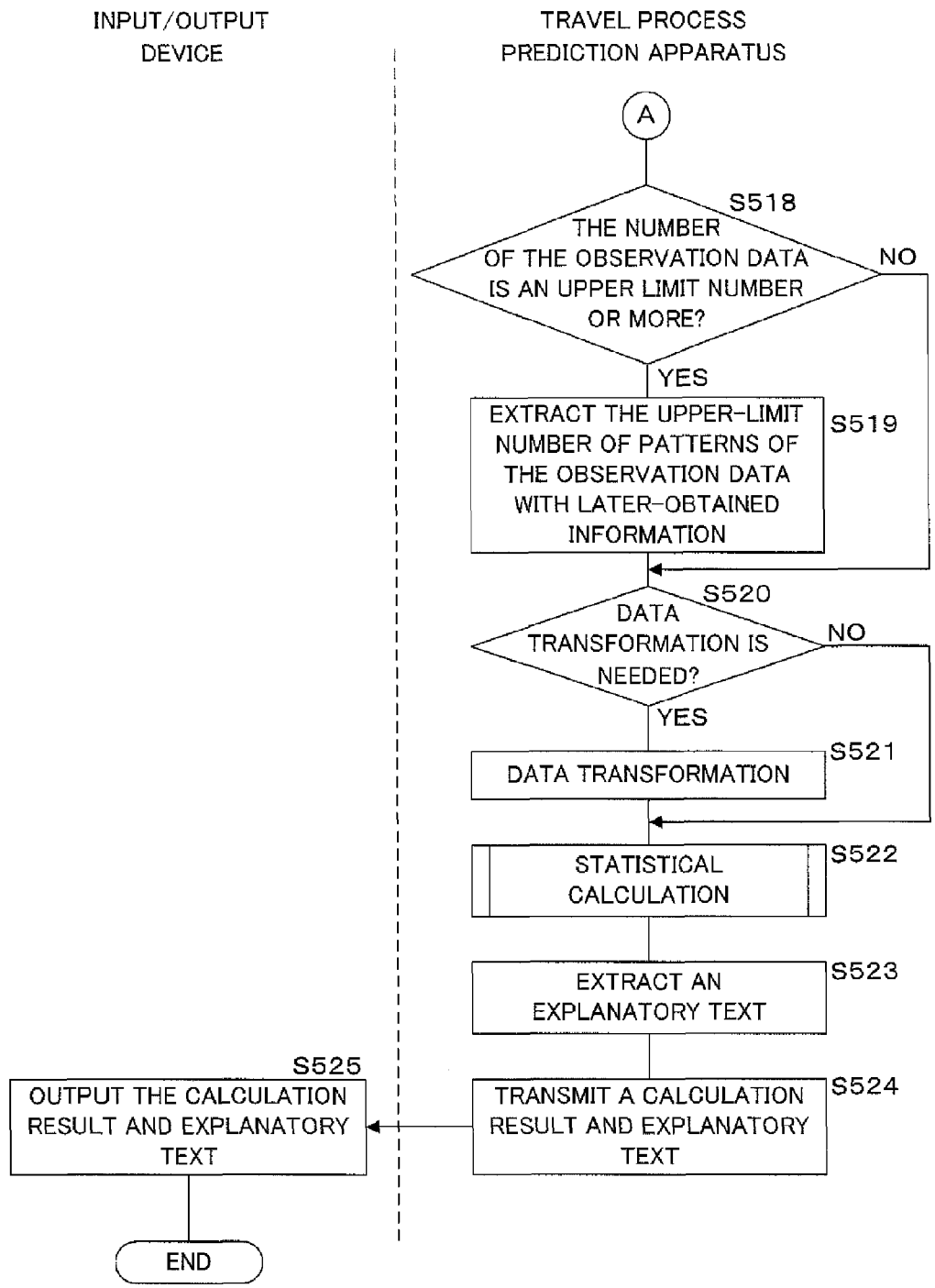

F I G. 1 1

| PREDICTION | COMPARATIVE PREDICTION | STATISTIC CALCULATION |
|---|---|---|
| PREDICTION FOR STAYING TIME AT DEPARTURE AIRPORT | COMPARISON FOR STAYING TIME AT DEPARTURE AIRPORT | MEAN |
| PREDICTION FOR TRANSPORT TIME OF BAGGAGE AT ARRIVAL AIRPORT | COMPARISON FOR DISPERSION IN STAYING TIME AT ARRIVAL AIRPORT | STANDARD DEVIATION |
| PREDICTION FOR EXIT TIME AT ARRIVAL AIRPORT | COMPARISON FOR EXIT TIME AT ARRIVAL AIRPORT | MEDIAN |
| PREDICTION FOR TIME REQUIRED FOR IMMIGRATION | COMPARISON FOR DISPERSION IN EXIT TIME AT ARRIVAL AIRPORT | MODE |
| . | . | . |
| . | . | . |
| . | . | . |

FIG. 12

PREDICTION FOR EXIT TIME AT ARRIVAL AIRPORT

| PREDICTION ITEM | PASSAGE TIME AT ARRIVAL AIRPORT EXIT | |
|---|---|---|
| PREDICTION CONDITION | EXTRACTION CONDITION ITEMS | NAME OF AIRLINE<br>FLIGHT NUMBER<br>FLIGHT TYPE<br>DEPARTURE PLACE<br>ARRIVAL PLACE | SCHEDULED DEPARTURE TIME<br>SCHEDULED ARRIVAL TIME |
| | ANALYSIS ITEMS | MONTH OF USING DEPARTURE AIRPORT<br>DAY OF THE WEEK OF USING DEPARTURE AIRPORT<br>ARRIVAL TIME<br>SEAT NUMBER<br>AGE OF TRAVELER<br>SQUARED AGE OF TRAVELER<br>GENDER OF TRAVELER<br>NATIONALITY OF TRAVELER<br>PRESENCE/ABSENCE OF COMPANION<br>CONSISTENCY IN LANGUAGE USED BY TRAVELER AND LANGUAGE USED IN ARRIVAL AIRPORT | NEED/NO NEED FOR SUPPORT IN TRAVELING<br>CHECK-IN TIME OF TRAVELER<br>WEATHER AT DEPARTURE AIRPORT<br>TEMPERATURE AT DEPARTURE AIRPORT<br>PRECIPITATION PROBABILITY AT DEPARTURE AIRPORT<br>WEATHER AT ARRIVAL AIRPORT<br>TEMPERATURE AT ARRIVAL AIRPORT<br>PRECIPITATION PROBABILITY AT ARRIVAL AIRPORT |
| NOTIFICATION CONDITION | DATE AND TIME OF NOTIFICATION<br>NOTIFICATION ADDRESS | |

FIG. 13

COMPARISON FOR EXIT TIME AT ARRIVAL AIRPORT

| COMPARISON ITEM | | PASSAGE TIME AT ARRIVAL AIRPORT EXIT | |
|---|---|---|---|
| COMPARISON CONDITION | EXTRACTION CONDITION ITEMS | COMPARISON SUBJECT A | COMPARISON SUBJECT B |
| | | NAME OF TRANSPORTATION USED | NAME OF TRANSPORTATION USED |
| | | FLIGHT NUMBER | FLIGHT NUMBER |
| | | FLIGHT TYPE | FLIGHT TYPE |
| | | DEPARTURE PLACE | DEPARTURE PLACE |
| | | SCHEDULED DEPARTURE TIME | SCHEDULED DEPARTURE TIME |
| | | ARRIVAL PLACE | ARRIVAL PLACE |
| | | SCHEDULED ARRIVAL TIME | SCHEDULED ARRIVAL TIME |
| | REFINEMENT CONDITION ITEMS | YEAR OF USING ARRIVAL AIRPORT | YEAR OF USING ARRIVAL AIRPORT |
| | | MONTH OF USING ARRIVAL AIRPORT | MONTH OF USING ARRIVAL AIRPORT |
| | | DATE OF USING ARRIVAL AIRPORT | DATE OF USING ARRIVAL AIRPORT |
| | | WEATHER AT ARRIVAL AIRPORT | WEATHER AT ARRIVAL AIRPORT |
| NOTIFICATION CONDITION | | DATE AND TIME OF NOTIFICATION | |
| | | NOTIFICATION ADDRESS | |

FIG. 14

| PREDICTION ITEM | | PASSAGE TIME AT ARRIVAL AIRPORT [ ] EXIT | |
|---|---|---|---|
| PREDICTION CONDITION | EXTRACTION CONDITION ITEMS | NAME OF AIRLINE [ ]<br>FLIGHT NUMBER [ ]<br>FLIGHT TYPE [ ]<br>DEPARTURE PLACE [ ]<br>ARRIVAL PLACE [ ] | SCHEDULED DEPARTURE TIME [ ]<br>SCHEDULED ARRIVAL TIME [ ] |
| | ANALYSIS ITEMS | YEAR/MONTH/DAY OF USING [ ]<br>DEPARTURE AIRPORT [ ]<br>ARRIVAL TIME [ ]<br>SEAT NUMBER [ ]<br>AGE OF TRAVELER [ ]<br>GENDER OF TRAVELER [ ]<br>NATIONALITY OF TRAVELER [ ]<br>NEED/NO NEED FOR SUPPORT IN TRAVELING [ ]<br>PRESENCE/ABSENCE OF COMPANION [ ]<br>LANGUAGE USED BY TRAVELER [ ] | CHECK-IN TIME OF TRAVELER [ ]<br>WEATHER AT DEPARTURE AIRPORT [ ]<br>TEMPERATURE AT DEPARTURE AIRPORT [ ]<br>PRECIPITATION PROBABILITY AT DEPARTURE AIRPORT [ ]<br>WEATHER AT ARRIVAL AIRPORT [ ]<br>TEMPERATURE AT ARRIVAL AIRPORT [ ]<br>PRECIPITATION PROBABILITY AT ARRIVAL AIRPORT [ ] |
| NOTIFICATION CONDITION | | DATE AND TIME OF NOTIFICATION [ ]<br>NOTIFICATION ADDRESS [ ] | |

F I G. 1 5

| COMPARISON ITEM | | PASSAGE TIME AT ARRIVAL AIRPORT [ ] EXIT | |
|---|---|---|---|
| COMPARISON CONDITION | EXTRACTION CONDITION ITEMS | COMPARISON SUBJECT A | COMPARISON SUBJECT B |
| | | NAME OF TRANSPORTATION USED [ ] <br> FLIGHT NUMBER [ ] <br> FLIGHT TYPE [ ] <br> DEPARTURE PLACE [ ] <br> SCHEDULED DEPARTURE TIME [ ] <br> ARRIVAL PLACE [ ] <br> SCHEDULED ARRIVAL TIME [ ] | NAME OF TRANSPORTATION USED [ ] <br> FLIGHT NUMBER [ ] <br> FLIGHT TYPE [ ] <br> DEPARTURE PLACE [ ] <br> SCHEDULED DEPARTURE TIME [ ] <br> ARRIVAL PLACE [ ] <br> SCHEDULED ARRIVAL TIME [ ] |
| | REFINEMENT CONDITION ITEMS | YEAR OF USING ARRIVAL AIRPORT [ ] <br> MONTH OF USING ARRIVAL AIRPORT [ ] <br> DATE OF USING ARRIVAL AIRPORT [ ] <br> WEATHER AT ARRIVAL AIRPORT [ ] | YEAR OF USING ARRIVAL AIRPORT [ ] <br> MONTH OF USING ARRIVAL AIRPORT [ ] <br> DATE OF USING ARRIVAL AIRPORT [ ] <br> WEATHER AT ARRIVAL AIRPORT [ ] |
| NOTIFICATION CONDITION | | DATE AND TIME OF NOTIFICATION [ ] <br> NOTIFICATION ADDRESS [ ] | |

FIG. 18

| A FEATURE OF THE FIRST OBSERVATION DATA SET | | | A FEATURE OF THE SECOND OBSERVATION DATA SET | | STATISTICS | | | | EXPLANATORY TEXT | | |
|---|---|---|---|---|---|---|---|---|---|---|---|
| THE NUMBER OF OBSERVATIONS | THE NUMBER OF ABNORMAL VALUES | PERIOD SPENT FOR ACQUIRING INFORMATION | THE NUMBER OF OBSERVATIONS | ... | TEST IN SIGNIFICANT DIFFERENCE | COEFFICIENT OF(MULTIPLE) CORRELATION | DURBIN-WATSON STATISTIC | ... | COMMENT | JUDGMENT | ADVICE |
| ≦ 30 | 2 TO 5 | ≦ 5 DAYS | — | ... | NOT SIGNIFICANT | ≦ 0.4 | 3.5 ≦ | ... | H | N | T |
| 31 TO 90 | 0 | 6 TO 30 DAYS | — | ... | 1% SIGNIFICANT | 0.91 ≦ | 1.6 TO 2.4 | ... | J | P | V |
| 91 TO 365 | ≦ 2 | 31 TO 100 DAYS | — | ... | 5% SIGNIFICANT | 0.71 TO 0.9 | 2.5 TO 3.4 | ... | K | Q | W |
| 366 ≦ | 6 TO 10 | 101 TO 365 DAYS | — | ... | 1% SIGNIFICANT | 0.71 TO 0.9 | 0.5 TO 1.5 | ... | L | R | X |
| ≦ 20 | 0 | ≦15 DAYS | ≦ 20 | ... | 5% SIGNIFICANT | | | ... | I | O | U |
| 200000 TO 600000 | 0 | 1 TO 3 YEARS | 200000 TO 600000 | ... | 1% SIGNIFICANT | | | ... | M | S | Y |
| ... | ... | ... | ... | ... | ... | ... | ... | ... | ... | ... | ... |

FIG. 19

COMMENT
- H STATISTICAL PREDICTION IS IMPOSSIBLE.
- I PREDICTION IS POSSIBLE UNDER A CONDITION CORRESPONDING TO PERIOD OF DATA ACQUISITION.
- J HIGHLY ACCURATE PREDICTION IS POSSIBLE UNDER A CONDITION CORRESPONDING TO PERIOD OF DATA ACQUISITION.
- K CONSIDERATION IS NECESSARY FOR MAJOR CHANGE SUCH AS CHANGE BY SEASON.
- L RESULT OF PREDICTION IS HIGHLY RELIABLE.
- M RESULT OF PREDICTION IS EXTREMELY RELIABLE.

JUDGMENT
- N PREDICTION NEEDS TO BE PERFORMED WITH OTHER INFORMATION.
- O THOUGH STATISTICAL PREDICTION IS POSSIBLE, SUFFICIENT CAUTION IS NECESSARY BECAUSE CHANGE DEPENDING ON MONTH OR THE LIKE WAS NOT TAKEN INTO ACCOUNT.
- P THOUGH STATISTICALLY EXTREMELY ACCURATE, SUFFICIENT CAUTION IS NECESSARY BECAUSE CHANGE DEPENDING ON MONTH OR THE LIKE WAS NOT TAKEN INTO ACCOUNT.
- Q THOUGH STATISTICALLY ACCURATE, CAUTION IS NECESSARY BECAUSE CHANGE DEPENDING ON SEASON OR THE LIKE IS NOT CONSIDERED.
- R IT IS STATISTICALLY HIGHLY ACCURATE AND RELIABLE PREDICTION INFORMATION AS LONG AS THERE IS NO MAJOR CHANGE DEPENDING ON YEAR.
- S IT IS STATISTICALLY EXTREMELY ACCURATE AND RELIABLE PREDICTION INFORMATION AS LONG AS THERE IS NO ACCIDENTAL CHANGE.

ADVICE
- T MAKE TRAVEL PLAN WITH SUFFICIENT TIME TO SPARE.
- U MAKE TRAVEL PLAN WITH SOME TIME TO SPARE.
- V MAKE TRAVEL PLAN WITH SOME TIME TO SPARE IF NEEDED IN CONSIDERATION OF, E.G., CHANGES DEPENDING ON MONTH, SEASON OR YEAR, AND OF EVENT.
- W MAKE TRAVEL PLAN IN CONSIDERATION OF, E.G., CHANGES DEPENDING ON SEASON OR YEAR, AND OF EVENT
- X IT IS RECOMMENDED TO MAKE TRAVEL PLAN IN ACCORDANCE WITH PREDICTION INFORMATION UNLESS THERE IS CHANGE DEPENDING ON YEAR OR EVENT.
- Y IT IS RECOMMENDED TO MAKE TRAVEL PLAN IN ACCORDANCE WITH PREDICTION INFORMATION UNLESS THERE IS EVENT.

FIG. 21

| ANALYSIS ITEMS | YEAR/MONTH/DAY OF USING DEPARTURE AIRPORT [ ] | DATA RANGE: * * * * * |
|---|---|---|
| | ARRIVAL TIME [ ] | DATA RANGE: * * * * * |
| | SEAT NUMBER [ ] | DATA RANGE: * * * * * |
| | AGE OF TRAVELER [ ] | DATA RANGE: * * * * * |
| | GENDER OF TRAVELER [ ] | DATA RANGE: * * * * * |
| | NATIONALITY OF TRAVELER [ ] | DATA RANGE: * * * * * |
| | NEED/NO NEED FOR SUPPORT IN TRAVELING [ ] | DATA RANGE: * * * * * |
| | PRESENCE/ABSENCE OF COMPANION [ ] | DATA RANGE: * * * * * |
| | LANGUAGE USED BY TRAVELER [ ] | DATA RANGE: * * * * * |
| | CHECK-IN TIME OF TRAVELER [ ] | DATA RANGE: * * * * * |
| | WEATHER AT DEPARTURE AIRPORT [ ] | DATA RANGE: * * * * * |
| | TEMPERATURE AT DEPARTURE AIRPORT [ ] | DATA RANGE: * * * * * |
| | PRECIPITATION PROBABILITY AT DEPARTURE AIRPORT [ ] | DATA RANGE: * * * * * |
| | WEATHER AT ARRIVAL AIRPORT [ ] | DATA RANGE: * * * * * |
| | TEMPERATURE AT ARRIVAL AIRPORT [ ] | DATA RANGE: * * * * * |
| | PRECIPITATION PROBABILITY AT ARRIVAL AIRPORT [ ] | DATA RANGE: * * * * * |

_US 8,706,671 B2_

TRAVEL PROCESS PREDICTION SYSTEM, TRAVEL PROCESS PREDICTION APPARATUS AND NON-TRANSITORY RECORDING MEDIUM

This application is the national phase under 35 U.S.C. §371 of PCT International Application No. PCT/JP2011/078743 which has an International filing date of Dec. 13, 2011 and designated the United States of America.

BACKGROUND

1. Technical Field

The present invention relates to a travel process prediction system and a computer program for predicting a process related to time required for travelling with a travelling means such as an airplane (hereinafter referred to as "transportation").

2. Description of Related Art

When a person travels by using transportation such as an airplane or a train, he/she may predict in advance a traveling time required for using such transportation based on an operation schedule or the like of the transportation in order to plan a travelling schedule. Japanese Patent Application Laid-Open No. 11-282913 discloses a technology for predicting travelling time of the transportation based on an actual operating situation of the transportation. It is also possible to predict travelling time of an object such as baggage, as in the case of a person.

SUMMARY OF THE INVENTION

It is, however, not sufficient to create a proper travelling schedule by merely predicting travelling time of the transportation itself. This is because, in travelling by using transportation, some length of time is consumed at a departure/arrival facility of transportation, such as an airport or a train station. When, for example, travelling by airplane, a traveler needs to spend some time at a departure airport in order to purchase a ticket, check baggage, go through boarding procedures and so forth. It is also necessary for a traveler to stay some time at an arrival airport for collecting baggage and the like. The traveler also needs some time for transit and transfer at a departure/ arrival facility in places of departure, transfer and arrival. Likewise, an object also needs to stay for a certain time at a departure/arrival facility for loading, transshipment and discharge, as well as waiting the order for such work. Therefore, in order to plan an appropriate schedule, it is necessary to predict not only the travelling time of transportation itself but also time of a person or object staying at a departure/arrival facility of the transportation. Conventionally, a user of transportation predicts the time for staying at a departure/arrival facility based on his/her own experiences or hearsay information. The conventional way has problems of low accuracy in prediction for the time and difficulty in prediction for the time at an unknown departure/arrival facility. This makes the user become more anxious, reflecting the current situation that the user expects more than enough time for staying in order to just feel safe.

The present invention has been made in the viewpoint of the above circumstances and has an objective of providing a travel process prediction system and computer program which enable more reliable prediction in the time required for traveling by statistically processing a relationship between a time required for traveling and a situation at the time of traveling.

A travel process prediction system according to the present invention predicting a travel process of a travel object travelling with transportation repeatedly operated at specific time is characterized by comprising: a passage time specifying unit specifying passage time at which a travel object actually passes through each of a plurality of passage points at a departure/arrival facility of transportation; a transportation specifying information acquiring unit acquiring transportation specifying information which specifies transportation used by the travel object; a situation information acquiring unit acquiring situation information indicating a situation in which the travel object uses the transportation; a storage unit storing passage time at each passage point, transportation specifying information and situation information, in an associated manner for each of a plurality of travel objects; an extraction unit extracting, from the storage unit, a plurality of combinations of passage time concerning a specific passage point and other information associated with the passage time; and a calculation unit calculating, based on the extracted plurality of combinations, an estimate value of passage time at which a travel object passes through a specific passage point under a specific condition by conducting at least one of a regression analysis for obtaining a relationship between the passage time and the above-described other information and a calculation of at least one of a mean and variance of the passage time.

A travel process prediction system according to the present invention predicting a travel process of a travel object travelling with transportation repeatedly operated at specific time is characterized by comprising: a passage time specifying unit specifying passage time at which a travel object actually passes through each of a plurality of passage points at a departure/arrival facility of transportation; a transportation specifying information acquiring unit acquiring transportation specifying information which specifies transportation used by the travel object; a situation information acquiring unit acquiring situation information indicating a situation in which the travel object uses the transportation; a storage unit storing elapsed time calculated from passage time at each passage point while the travel object passes through two passage points, transportation specifying information and situation information, in an associated manner for each of a plurality of travel objects; an extraction unit extracting, from the storage unit, a plurality of combinations of elapsed time concerning two specific passage points and other information associated with the elapsed time; and a calculation unit calculating, based on the extracted plurality of combinations, an estimate value of elapsed time while a travel object passes through two specific passage points under a specific condition by conducting at least one of a regression analysis for obtaining a relationship between the elapsed time and the above-described other information and a calculation of at least one of a mean and variance of the elapsed time.

A travel process prediction system according to the present invention predicting a travel process of a travel object travelling with transportation repeatedly operated at specific time is characterized by comprising: a passage time specifying unit specifying passage time at which a travel object actually passes through each of a plurality of passage points at a departure/arrival facility of transportation; a transportation specifying information acquiring unit acquiring transportation specifying information which specifies transportation used by the travel object; a situation information acquiring unit acquiring situation information indicating a situation in which the travel object uses the transportation; a boarding completion time specifying unit specifying boarding completion time at which boarding of travel objects is actually completed for the transportation; a storage unit storing transportation specifying information, situation information and a result of comparison between boarding completion time and passage time at each passage point, in an associated manner for each of a plurality of travel objects; an extraction unit extracting, from the storage unit, a plurality of combinations of a result of comparison between passage time concerning a specific passage point and boarding completion time concerning specific transportation and other information associated with the result of comparison; and a calculation unit calculating, based on the extracted plurality of combinations, an estimate value of a result of comparison between boarding completion time under a specific condition and passage time concerning a specific passage point by conducting at least one of a regression analysis for obtaining a relationship between the results of comparison and the above-described other information and a calculation of at least one of a mean and variance of the results of comparison.

A travel process prediction system according to the present invention predicting a travel process of a travel object traveling with repeatedly operated transportation is characterized by comprising: a passage time specifying unit specifying passage time at which a travel object actually passes through one passage point or a plurality of passage points at a departure/arrival facility of transportation; a transportation specifying information acquiring unit acquiring transportation specifying information which specifies transportation used by the travel object; a situation information acquiring unit acquiring situation information indicating a situation in which the travel object uses the transportation; a storage unit storing passage time at one passage point or a plurality of passage points, transportation specifying information and situation information, in an associated manner for each of a plurality of travel objects; an extraction unit extracting, from the storage unit, a plurality of combinations of passage time concerning a specific passage point and other information associated with the passage time; and a calculation unit calculating, based on the extracted plurality of combinations, a statistic of the passage time at which travel objects pass through a specific passage point under a specific condition.

A travel process prediction system according to the present invention predicting a travel process of a travel object traveling with repeatedly operated transportation is characterized by comprising: a passage time specifying unit specifying passage time at which a travel object actually passes through a plurality of passage points at a departure/arrival facility of transportation; a transportation specifying information acquiring unit acquiring transportation specifying information which specifies transportation used by the travel object; a situation information acquiring unit acquiring situation information indicating a situation in which the travel object uses the transportation; a storage unit storing elapsed time calculated from passage time at a plurality of passage points while the travel object passes through two passage points, transportation specifying information and situation information, in an associated manner for each of a plurality of travel objects; an extraction unit extracting, from the storage unit, a plurality of combinations of elapsed time concerning two specific passage points and other information associated with the elapsed time; and a calculation unit calculating, based on the extracted plurality of combinations, a statistic of the elapsed time while travel objects pass through two specific passage points under a specific condition.

A travel process prediction system according to the present invention predicting a travel process of a travel object traveling with repeatedly operated transportation is characterized by comprising: a passage time specifying unit specifying passage time at which a travel object actually passes through one passage point or a plurality of passage points at a departure/arrival facility of transportation; a transportation specifying information acquiring unit acquiring transportation specifying information which specifies transportation used by the travel object; a situation information acquiring unit acquiring situation information indicating a situation in which the travel object uses the transportation; a boarding completion time specifying unit specifying boarding completion time at which boarding of travel objects is actually completed for the transportation; a storage unit storing transportation specifying information, situation information and a result of comparison between boarding completion time and passage time at one passage point or a plurality of passage points, in an associated manner for each of a plurality of travel objects; an extraction unit extracting, from the storage unit, a plurality of combinations of a result of comparison between passage time concerning a specific passage point and boarding completion time concerning specific transportation and other information associated with the result of comparison; and a calculation unit calculating, based on the extracted plurality of combinations, a statistic of the results of comparison between passage time concerning a specific passage point and boarding completion time under a specific condition.

A travel process prediction system according to the present invention predicting a travel process of a travel object traveling with transportation repeatedly operated at specific time is characterized by comprising: a passage time specifying unit specifying passage time at which a travel object actually passes through each of a plurality of passage points at a departure/arrival facility of transportation; a transportation specifying information acquiring unit acquiring transportation specifying information which specifies transportation used by the travel object; and a travel process prediction apparatus predicting a travel process of a travel object under a specific condition, wherein the travel process prediction apparatus includes: a storage unit storing passage time specified at each passage point and the acquired transportation specifying information, in an associated manner for each of a plurality of travel objects; a transportation specifying information accepting unit accepting a plurality of pieces of transportation specifying information which specifies a plurality of pieces of transportation which is candidates to be used by an arbitrary travel object; a request accepting unit accepting a request for comparing passage time at which the travel object passes through a specific passage point when the travel object uses each of the plurality of pieces of transportation; an extraction unit extracting, from the storage unit, for each of the plurality of pieces of transportation specifying information, a plurality of pieces of passage time concerning the specific passage point, associated with transportation specifying information having a same content as the accepted transportation specifying information; a calculation unit calculating, for each of the plurality of pieces of transportation specifying information, at least one of a mean and variance of the extracted passage time; a test unit statistically testing a difference in at least one of the mean and variance of the passage time calculated for each of the plurality of pieces of transportation specifying information; and an output unit outputting a test result obtained by the test unit.

A travel process prediction system according to the present invention predicting a travel process of a travel object traveling with transportation repeatedly operated at specific time is characterized by comprising: a passage time specifying unit specifying passage time at which a travel object actually passes through each of a plurality of passage points at a departure/arrival facility of transportation; a situation information acquiring unit acquiring situation information indicating a situation specified by a plurality of items when the travel object uses transportation; and a travel process prediction apparatus predicting a travel process of a travel object under a specific condition, wherein the travel process prediction apparatus includes: a storage unit storing the passage time specified at each passage point and the acquired situation information, in an associated manner for each of a plurality of travel objects; a situation information accepting unit accepting a plurality of pieces of situation information indicating a plurality of situations in which an arbitrary travel object uses transportation; a request accepting unit accepting a request for comparing passage time at which the travel object passes through a specific passage point when the travel object uses transportation in the plurality of situations; an extraction unit extracting, from the storage unit, a plurality of pieces of passage time concerning the specific passage point, associated with the situation information having a same content as the accepted situation information, for each of the plurality of pieces of situation information; a calculation unit calculating at least one of a mean and variance of the extracted passage time for each of the plurality of pieces of situation information; a test unit statistically testing a difference in at least one of the mean and variance of the passage time calculated for each of the plurality of pieces of situation information; and an output unit outputting a test result obtained by the test unit.

A travel process prediction system according to the present invention predicting a travel process of a travel object traveling with transportation repeatedly operated at specific time is characterized by comprising: a passage time specifying unit specifying passage time at which a travel object actually passes through each of a plurality of passage points at a departure/arrival facility of transportation; a transportation specifying information acquiring unit acquiring transportation specifying information which specifies transportation used by the travel object; and a travel process prediction apparatus predicting a travel process of a travel object under a specific condition, wherein the travel process prediction apparatus includes: a storage unit storing elapsed time calculated from the passage time specified at each passage point while the travel object passes through two passage points and the acquired transportation specifying information, in an associated manner for each of a plurality of travel objects; a transportation specifying information accepting unit accepting a plurality of pieces of transportation specifying information which specifies a plurality of pieces of transportation which is candidates to be used by an arbitrary travel object; a request accepting unit accepting a request for comparing elapsed time while the travel object passes through two specific passage points when the travel object uses each of the plurality of pieces of transportation; an extraction unit extracting, from the storage unit, a plurality of pieces of elapsed time concerning the two specific passage points, associated with transportation specifying information having a same content as the accepted transportation specifying information, for each of the plurality of pieces of transportation specifying information; a calculation unit calculating at least one of a mean and variance of the extracted elapsed time for each of the plurality of pieces of transportation specifying information; a test unit statistically testing a difference in at least one of the mean and variance of the elapsed time calculated for each of the plurality of pieces of transportation specifying information; and an output unit outputting a test result obtained by the test unit.

A travel process prediction system according to the present invention predicting a travel process of a travel object traveling with transportation repeatedly operated at specific time is characterized by comprising: a passage time specifying unit specifying passage time at which a travel object actually passes through each of a plurality of passage points at a departure/arrival facility of transportation; a situation information acquiring unit acquiring situation information indicating a situation specified by a plurality of items when the travel object uses the transportation; and a travel process prediction apparatus predicting a travel process of a travel object under a specific condition, wherein the travel process prediction apparatus includes: a storage unit storing elapsed time calculated from the passage time specified at each passage point while the travel object passes through two passage points and the acquired situation information, in an associated manner for each of a plurality of travel objects; a situation information accepting unit accepting a plurality of pieces of situation information indicating a plurality of situations in which an arbitrary travel object uses transportation; a request accepting unit accepting a request for comparing elapsed time while the travel object passes through two specific passage points when the travel object uses transportation in the plurality of situations; an extraction unit extracting, from the storage unit, a plurality of pieces of elapsed time concerning the two specific passage points, associated with situation information having a same content as the accepted situation information, for each of the plurality of pieces of situation information; a calculation unit calculating at least one of a mean and variance of the extracted elapsed time for each of the plurality of pieces of situation information; a test unit statistically testing a difference in at least one of the mean and variance of the elapsed time calculated for each of the plurality of pieces of situation information; and an output unit outputting a test result obtained by the test unit.

A travel process prediction system according to the present invention predicting a travel process of a travel object traveling with transportation repeatedly operated at specific time is characterized by comprising: a passage time specifying unit specifying passage time at which a travel object actually passes through each of a plurality of passage points at a departure/arrival facility of transportation; a transportation specifying information acquiring unit acquiring transportation specifying information which specifies transportation used by the travel object; a boarding completion time specifying unit specifying boarding completion time at which boarding of travel objects is actually completed for the transportation; and a travel process prediction apparatus predicting a travel process of a travel object under a specific condition, wherein the travel process prediction apparatus includes: a storage unit storing the acquired transportation specifying information and a result of comparison between boarding completion time and passage time at each passage point, in an associated manner for each of the plurality of travel objects; a transportation specifying information accepting unit accepting a plurality of pieces of transportation specifying information which specifies a plurality of pieces of transportation which is candidates to be used by an arbitrary travel object; a request accepting unit accepting a request for comparing the results of comparison between passage time at a specific passage point and boarding completion time for the plurality of pieces of transportation; an extraction unit extracting, from the storage unit, a plurality of results of comparison between boarding completion time and passage time at the specific passage point, associated with transportation specifying information having a same content as the accepted transportation specifying information, for each of the plurality of pieces of transportation specifying information; a calculation unit calculating at least one of a mean and variance of the extracted results of comparison for each of the plurality of pieces of transportation specifying information; a test unit statistically testing a difference in at least one of the mean and variance of the results of comparison calculated for each of the plurality of pieces of transportation specifying information; and an output unit outputting a test result obtained by the test unit.

A travel process prediction system according to the present invention predicting a travel process of a travel object traveling with transportation repeatedly operated at specific time is characterized by comprising: a passage time specifying unit specifying passage time at which a travel object actually passes through each of a plurality of passage points at a departure/arrival facility of transportation; a situation information acquiring unit acquiring situation information indicating a situation specified by a plurality of items when the travel object uses transportation; a boarding completion time specifying unit specifying boarding completion time at which boarding of travel objects is actually completed for the transportation used by the travel object; and a travel process prediction apparatus predicting a travel process of a travel object under a specific condition, wherein the travel process prediction apparatus includes: a storage unit storing the acquired situation information and a result of comparison between boarding completion time and passage time at each passage point, in an associated manner for each of the plurality of travel objects; a situation information accepting unit accepting a plurality of pieces of situation information indicating a plurality of situations in which an arbitrary travel object uses transportation; a request accepting unit accepting a request for comparing the results of comparison between passage time at a specific passage point and boarding completion time for the transportation used by the travel object in the plurality of situations; an extraction unit extracting, from the storage unit, a plurality of results of comparison between boarding completion time and the passage time at the specific passage point, associated with situation information having a same content as the accepted situation information, for each of the plurality of pieces of situation information; a calculation unit calculating at least one of a mean and variance of the extracted results of comparison for each of the plurality of pieces of situation information; a test unit statistically testing a difference in at least one of the mean and variance of the results of comparison calculated for each of the plurality of pieces of situation information; and an output unit outputting a test result obtained by the test unit.

A travel process prediction apparatus according to the present invention predicting a travel process of a travel object traveling with transportation repeatedly operated at specific time is characterized by comprising: a storage unit storing passage time at which a travel object actually passes through each of a plurality of passage points at a departure/arrival facility of transportation, transportation specifying information which specifies transportation used by the travel object, and situation information indicating a situation in which the travel object uses the transportation, in an associated manner for each of a plurality of travel objects; an extraction unit extracting, from the storage unit, a plurality of combinations of passage time concerning a specific passage point and other information associated with the passage time; and a calculation unit calculating, based on the extracted plurality of combinations, an estimate value of passage time at which a travel object passes through a specific passage point under a specific condition by conducting at least one of a regression analysis for obtaining a relationship between the passage time and the above-described other information, and a calculation of at least one of a mean and variance of the passage time.

A travel process prediction apparatus according to the present invention predicting a travel process of a travel object traveling with transportation repeatedly operated at specific time is characterized by comprising: a storage unit storing elapsed time while a travel object passes through two passage points of a plurality of passage points at a departure/arrival facility of transportation, transportation specifying information which specifies transportation used by the travel object, and situation information indicating a situation in which the travel object uses the transportation, in an associated manner for each of a plurality of travel objects; an extraction unit extracting, from the storage unit, a plurality of combinations of elapsed time concerning two specific passage points and other information associated with the elapsed time; and a calculation unit calculating, based on the extracted plurality of combinations, an estimate value of elapsed time while a travel object passes through two specific passage points under a specific condition by conducting at least one of a regression analysis for obtaining a relationship between the elapsed time and the above-described other information, and a calculation of at least one of a mean and variance of the elapsed time.

A travel process prediction apparatus according to the present invention predicting a travel process of a travel object traveling with transportation repeatedly operated at specific time is characterized by comprising: a storage unit storing transportation specifying information which specifies transportation, situation information indicating a situation in which a travel object uses the transportation, and a result of comparison between passage time at which a travel object actually passes through each of a plurality of passage points at a departure/arrival facility of the transportation and boarding completion time at which boarding of travel objects is actually completed for the transportation, in an associated manner for each of a plurality of travel objects; an extraction unit extracting, from the storage unit, a plurality of combinations of a result of comparison between boarding completion time concerning specific transportation and passage time concerning a specific passage point, and other information associated with the result of comparison; and a calculation unit calculating, based on the extracted plurality of combinations, an estimate value of a result of comparison between boarding completion time under a specific condition and passage time concerning a specific passage point by conducting at least one of a regression analysis for obtaining a relationship between the results of comparison and the above-described other information, and a calculation of at least one of a mean and variance of the results of comparison.

A travel process prediction apparatus according to the present invention predicting a travel process of a travel object traveling with repeatedly operated transportation is characterized by comprising: a storage unit storing passage time at which a travel object actually passes through one passage point or a plurality of passage points at a departure/arrival facility of transportation, transportation specifying information which specifies transportation used by the travel object, and situation information indicating a situation in which the travel object uses the transportation, in an associated manner for each of a plurality of travel objects; an extraction unit extracting, from the storage unit, a plurality of combinations of passage time concerning a specific passage point and other information associated with the passage time; and a calculation unit calculating a statistic of the passage time at which travel objects pass through a specific passage point under a specific condition, based on the extracted plurality of combinations.

A travel process prediction apparatus according to the present invention predicting a travel process of a travel object traveling with repeatedly operated transportation is characterized by comprising: a storage unit storing elapsed time while a travel object passes through two passage points of a plurality of passage points at a departure/arrival facility of transportation, transportation specifying information which specifies transportation used by the travel object, and situation information indicating a situation in which the travel object uses the transportation, in an associated manner for each of a plurality of travel objects; an extraction unit extracting, from the storage unit, a plurality of combinations of elapsed time concerning two specific passage points and other information associated with the elapsed time; and a calculation unit calculating, based on the extracted plurality of combinations, a statistic of the elapsed time while travel objects pass through two specific passage points under a specific condition.

A travel process prediction apparatus according to the present invention predicting a travel process of a travel object traveling with repeatedly operated transportation is characterized by comprising: a storage unit storing transportation specifying information which specifies transportation, situation information indicating a situation in which a travel object uses the transportation, and a result of comparison between passage time at which a travel object actually passes through one passage point or a plurality of passage points at a departure/arrival facility of the transportation and boarding completion time at which boarding of travel objects is actually completed for the transportation, in an associated manner for each of a plurality of travel objects; an extraction unit extracting, from the storage unit, a plurality of combinations of a result of comparison between boarding completion time concerning specific transportation and passage time concerning a specific passage point, and other information associated with the result of comparison; and a calculation unit calculating, based on the extracted plurality of combinations, a statistic of the results of comparison between passage time concerning a specific passage point and boarding completion time under a specific condition.

A travel process prediction apparatus according to the present invention predicting a travel process of a travel object traveling with transportation repeatedly operated at specific time is characterized by comprising: a storage unit storing passage time at which a travel object actually passes through each of a plurality of passage points at a departure/arrival facility of transportation and transportation specifying information which specifies transportation used by the travel object, in an associated manner for each of a plurality of travel objects; a transportation specifying information accepting unit accepting a plurality of pieces of transportation specifying information which specifies a plurality of pieces of transportation which is candidates to be used by an arbitrary travel object; a request accepting unit accepting a request for comparing passage time at which the travel object passes through a specific passage point when the travel object uses each of the plurality of pieces of transportation; an extraction unit extracting, from the storage unit, for each of the plurality of pieces of transportation specifying information, a plurality of pieces of passage time concerning the specific passage point, associated with transportation specifying information having a same content as the accepted transportation specifying information; a calculation unit calculating, for each of the plurality of pieces of transportation specifying information, at least one of a mean and variance of the extracted passage time; a test unit statistically testing a difference in at least one of the mean and variance of the passage time calculated for each of the plurality of pieces of transportation specifying information; and an output unit outputting a test result obtained by the test unit.

A travel process prediction apparatus according to the present invention predicting a travel process of a travel object traveling with transportation repeatedly operated at specific time is characterized by comprising: a storage unit storing passage time at which a travel object actually passes through each of a plurality of passage points at a departure/arrival facility of transportation, and situation information indicating a situation specified by a plurality of items when the travel object uses transportation, in an associated manner for each of a plurality of travel objects; a situation information accepting unit accepting a plurality of pieces of situation information indicating a plurality of situations in which an arbitrary travel object uses transportation; a request accepting unit accepting a request for comparing passage time at which the travel object passes through a specific passage point when the travel object uses transportation in the plurality of situations; an extraction unit extracting, from the storage unit, for each of the plurality of pieces of situation information, a plurality of pieces of passage time concerning the specific passage point, associated with situation information having a same content as the accepted situation information; a calculation unit calculating at least one of a mean and variance of the extracted passage time for each of the plurality of pieces of situation information; a test unit statistically testing a difference in at least one of the mean and variance of the passage time calculated for each of the plurality of pieces of situation information; and an output unit outputting a test result obtained by the test unit.

A travel process prediction apparatus according to the present invention predicting a travel process of a travel object traveling with transportation repeatedly operated at specific time is characterized by comprising: a storage unit storing elapsed time while a travel object passes through two passage points of a plurality of passage points at a departure/arrival facility of transportation, and transportation specifying information which specifies transportation used by the travel object, in an associated manner for each of a plurality of travel objects; a transportation specifying information accepting unit accepting a plurality of pieces of transportation specifying information which specifies a plurality of pieces of transportation which is candidates to be used by an arbitrary travel object; a request accepting unit accepting a request for comparing elapsed time while the travel object passes through two specific passage points when the travel object uses each of the plurality of pieces of transportation; an extraction unit extracting, from the storage unit, for each of the plurality of pieces of transportation specifying information, a plurality of pieces of elapsed time concerning the two specific passage points, associated with transportation specifying information having a same content as the accepted transportation specifying information; a calculation unit calculating, for each of the plurality of pieces of transportation specifying information, at least one of a mean and variance of the extracted elapsed time; a test unit statistically testing a difference in at least one of the mean and variance of the elapsed time calculated for each of the plurality of pieces of transportation specifying information; and an output unit outputting a test result obtained by the test unit.

A travel process prediction apparatus according to the present invention predicting a travel process of a travel object traveling with transportation repeatedly operated at specific time is characterized by comprising: a storage unit storing elapsed time while a travel object passes through two passage points of a plurality of passage points at a departure/arrival facility of transportation and situation information indicating a situation specified by a plurality of items when the travel object uses transportation, in an associated manner for each of a plurality of travel objects; a situation information accepting unit accepting a plurality of pieces of situation information indicating a plurality of situations in which an arbitrary travel object uses transportation; a request accepting unit accepting a request for comparing elapsed time while the travel object passes through two specific passage points when the travel object uses transportation in the plurality of situations; an extraction unit extracting, from the storage unit, for each of the plurality of pieces of situation information, a plurality of pieces of elapsed time concerning the two specific passage points associated with situation information having a same content as the accepted situation information; a calculation unit calculating at least one of a mean and variance of the extracted elapsed time for each of the plurality of pieces of situation information; a test unit statistically testing a difference in at least one of the mean and variance of the elapsed time calculated for each of the plurality of pieces of situation information; and an output unit outputting a test result obtained by the test unit.

A travel process prediction apparatus according to the present invention predicting a travel process of a travel object traveling with transportation repeatedly operated at specific time is characterized by comprising: a storage unit storing transportation specifying information which specifies transportation, and a result of comparison between passage time at which a travel object actually passes through each of a plurality of passage points at a departure/arrival facility of the transportation and boarding completion time at which boarding of travel objects is actually completed for the transportation, in an associated manner for each of a plurality of travel objects; a transportation specifying information accepting unit accepting a plurality of pieces of transportation specifying information which specifies a plurality of pieces of transportation which is candidates to be used by an arbitrary travel object; a request accepting unit accepting a request for comparing results of comparison between passage time at a specific passage point and boarding completion time for the plurality of pieces of transportation; an extraction unit extracting, from the storage unit, for each of the plurality of pieces of transportation specifying information, a plurality of results of comparison between boarding completion time and passage time at the specific passage point, associated with transportation specifying information having a same content as the accepted transportation specifying information; a calculation unit calculating at least one of a mean and variance of the extracted results of comparison for each of the plurality of pieces of transportation specifying information; a test unit statistically testing a difference in at least one of the mean and variance of the results of comparison calculated for each of the plurality of pieces of transportation specifying information; and an output unit outputting a test result obtained by the test unit.

A travel process prediction apparatus according to the present invention predicting a travel process of a travel object traveling with transportation repeatedly operated at specific time is characterized by comprising: a storage unit storing situation information indicating a situation specified by a plurality of items when a travel object uses transportation, and a result of comparison between passage time at which the travel object actually passes through each of a plurality of passage points at a departure/arrival facility of transportation and boarding completion time at which boarding of travel objects is actually completed for the transportation used by the travel object, in an associated manner for a plurality of travel objects; a situation information accepting unit accepting a plurality of pieces of situation information indicating a plurality of situations in which an arbitrary travel object uses transportation; a request accepting unit accepting a request for comparing results of comparison between passage time at a specific passage point and boarding completion time for the transportation used by the travel object in the plurality of situations; an extraction unit extracting, from the storage unit, for each of the plurality of pieces of situation information, a plurality of results of comparison between passage time at the specific passage point and boarding completion time, associated with situation information having a same content as the accepted situation information; a calculation unit calculating at least one of a mean and variance of the extracted results of comparison for each of the plurality of pieces of situation information; a test unit statistically testing a difference in at least one of the mean and variance of the results of comparison calculated for each of the plurality of pieces of situation information; and an output unit outputting a test result obtained by the test unit.

A non-transitory recording medium according to the present invention is characterized by having a computer program recorded for making a computer predict a travel process of a travel object traveling with transportation operated repeatedly at specific time, the computer program comprising the steps of: making a computer extract a plurality of combinations of passage time concerning a specific passage point and other information associated with the passage time from data including passage time at which a travel object actually passes through each of a plurality of passage points at a departure/arrival facility of transportation, transportation specifying information which specifies transportation used by the travel object and situation information indicating a situation in which the travel object uses the transportation, in an associated manner for each of a plurality of travel objects; and making a computer calculate, based on the extracted plurality of combinations, an estimate value of passage time at which a travel object passes through a specific passage point under a specific condition by conducting at least one of a regression analysis for obtaining a relationship between the passage time and the above-described other information, and a calculation of at least one of a mean and variance of the passage time.

A non-transitory recording medium according to the present invention is characterized by having a computer program recorded for making a computer predict a travel process of a travel object traveling with transportation operated repeatedly at specific time, the computer program comprising the steps of: making a computer extract a plurality of combinations of elapsed time concerning two specific passage points and other information associated with the elapsed time from data including elapsed time while a travel object passes through two passage points of a plurality of passage points at a departure/arrival facility of transportation, transportation specifying information which specifies transportation used by the travel object and situation information indicating a situation in which the travel object uses the transportation, in an associated manner for each of the plurality of travel objects; and making a computer calculate, based on the extracted plurality of combinations, an estimate value of elapsed time while a travel object passes through two specific passage points under a specific condition by conducting at least one of a regression analysis for obtaining a relationship between the elapsed time and the above-described other information, and a calculation of at least one of a mean and variance of the elapsed time.

A non-transitory recording medium according to the present invention is characterized by having a computer program recorded for making a computer predict a travel process of a travel object traveling with transportation operated repeatedly at specific time, the computer program comprising the steps of: making a computer extract a plurality of combinations of a result of comparison between passage time concerning a specific passage point and boarding completion time concerning specific transportation, and other information associated with the result of comparison, from data including transportation specifying information which specifies transportation, situation information indicating a situation in which a travel object uses the transportation, and a result of comparison between passage time at which the travel object actually passes through each of a plurality of passage points at a departure/arrival facility of the transportation and boarding completion time at which boarding of travel objects is actually completed for the transportation, in an associated manner for each of the plurality of travel objects; and making a computer calculate, based on the extracted plurality of combinations, an estimate value of a result of comparison between passage time concerning a specific passage point and boarding completion time under a specific condition by conducting at least one of a regression analysis for obtaining a relationship between the results of comparison and the above-described other information, and a calculation of at least one of a mean and variance of the results of comparison.

A non-transitory recording medium according to the present invention is characterized by having a computer program recorded for making a computer predict a travel process of a travel object traveling with repeatedly operated transportation, the computer program comprising the steps of: making a computer extract a plurality of combinations of passage time concerning a specific passage point and other information associated with the passage time from data including passage time at which a travel object actually passes through one passage point or a plurality of passage points at a departure/arrival facility of transportation, transportation specifying information which specifies transportation used by the travel object and situation information indicating a situation in which the travel object uses the transportation, in an associated manner for each of the travel objects; and making a computer calculate, based on the extracted plurality of combinations, a statistic of the passage time at which travel objects pass through a specific passage point under a specific condition.

A non-transitory recording medium according to the present invention is characterized by having a computer program recorded for making a computer predict a travel process of a travel object traveling with repeatedly operated transportation, the computer program comprising the steps of: making a computer extract a plurality of combinations of elapsed time concerning two specific passage points and other information associated with the elapsed time from data including elapsed time while a travel object passes through two passage points of a plurality of passage points at a departure/arrival facility of transportation, transportation specifying information which specifies transportation used by the travel object and situation information indicating a situation in which the travel object uses the transportation, in an associated manner for each of the plurality of travel objects; and making a computer calculate, based on the extracted plurality of combinations, a statistic of elapsed time while the travel object passes through two specific passage points under a specific condition.

A non-transitory recording medium according to the present invention is characterized by having a computer program recorded for making a computer predict a travel process of a travel object traveling with repeatedly operated transportation, the computer program comprising the steps of: making a computer extract a plurality of combinations of a result of comparison between passage time concerning a specific passage point and boarding completion time concerning specific transportation, and other information associated with the result of comparison, from data including transportation specifying information which specifies transportation, situation information indicating a situation in which a travel object uses the transportation, and a result of comparison between passage time at which the travel object actually passes through one passage point or a plurality of passage points at a departure/arrival facility of the transportation and boarding completion time at which boarding of travel objects is actually completed for the transportation, in an associated manner for each of the plurality of travel objects; and making a computer calculate, based on the extracted plurality of combinations, a statistic of the results of comparison between passage time concerning a specific passage point and boarding completion time under a specific condition.

A non-transitory recording medium according to the present invention is characterized by having a computer program recorded for making a computer conduct a comparison in passage time at which a travel object traveling with transportation repeatedly operated at specific time passes through a specific passage point when the travel object uses each of the plurality of pieces of transportation, the computer program comprising the steps of: making a computer extract, when data, including passage time at which a travel object actually passes through each of a plurality of passage points provided at a departure/arrival facility of transportation and including transportation specifying information that specifies transportation which is used by the travel object and which is specified by a plurality of items, are stored in an associated manner for each of the plurality of travel objects and when a plurality of pieces of transportation specifying information which specifies a plurality of pieces of transportation which is candidates to be used by an arbitrary travel object is accepted, a plurality of pieces of passage time which concerns the specific passage point and which is associated with transportation specifying information having a same content as the accepted transportation specifying information, from the data, for each of the plurality of pieces of transportation specifying information; making a computer calculate, for each of the plurality of pieces of transportation specifying information, at least one of a mean and variance of the extracted passage time; and making a computer statistically test a difference in at least one of the mean and variance of the passage time calculated for each of the plurality of pieces of transportation specifying information.

A non-transitory recording medium according to the present invention is characterized by having a computer program recorded for making a computer conduct a comparison in passage time at which a travel object traveling with transportation repeatedly operated at specific time passes through a specific passage point when the travel object uses the transportation in a plurality of situations, the computer program comprising the steps of making a computer extract, when data, including passage time at which a travel object actually passes through each of a plurality of passage points provided at a departure/arrival facility of transportation and including situation information indicating a situation specified by a plurality of items at a time when the travel object uses transportation, are stored in an associated manner for each of the plurality of travel objects and when a plurality of pieces of situation information indicating a plurality of situations in which an arbitrary travel object uses transportation is accepted, a plurality of pieces of passage time which concerns the specific passage point and which is associated with situation information having a same content as the accepted situation information, from the data, for each of the plurality of pieces of situation information; making a computer calculate, for each of the plurality of pieces of situation information, at least one of a mean and variance of the extracted passage time; and making a computer statistically test a difference in at least one of the mean and variance of the passage time calculated for each of the plurality of pieces of situation information.

A non-transitory recording medium according to the present invention is characterized by having a computer program recorded for making a computer conduct a comparison in elapsed time while a travel object traveling with transportation repeatedly operated at specific time passes through two specific passage points when the travel object uses each of the plurality of pieces of transportation, the computer program comprising the steps of: making a computer extract, when data, including elapsed time while a travel object passes through two passage points of a plurality of passage points provided at a departure/arrival facility of transportation and including transportation specifying information that specifies transportation which is used by the travel object and which is specified by a plurality of items, are stored in an associated manner for each of the plurality of travel objects and when a plurality of pieces of transportation specifying information which specifies a plurality of pieces of transportation which is candidates to be used by an arbitrary travel object is accepted, a plurality of pieces of elapsed time which concerns the two specific passage points and which is associated with transportation specifying information having a same content as the accepted transportation specifying information, from the data, for each of the plurality of pieces of transportation specifying information; making a computer calculate at least one of a mean and variance of the extracted elapsed time for each of the plurality of pieces of transportation specifying information; and making a computer statistically test a difference in at least one of the mean and variance of the elapsed time calculated for each of the plurality of pieces of transportation specifying information.

A non-transitory recording medium according to the present invention is characterized by having a computer program recorded for making a computer conduct a comparison in elapsed time while a travel object traveling with transportation repeatedly operated at specific time passes through two specific passage points when the travel object uses the transportation in a plurality of situations, the computer program comprising the steps of: making a computer extract, when data, including elapsed time while a travel object passes through two passage points of a plurality of passage points provided at a departure/arrival facility of transportation and including situation information indicating a situation specified by a plurality of items at a time when the travel object uses transportation, are stored in an associated manner for each of the plurality of travel objects and when a plurality of pieces of situation information indicating a plurality of situations in which an arbitrary travel object uses transportation is accepted, a plurality of pieces of elapsed time which concerns the two specific passage points and which is associated with situation information having a same content as the accepted situation information, from the data, for each of the plurality of pieces of situation information; making a computer calculate at least one of a mean and variance of the extracted elapsed time for each of the plurality of pieces of situation information; and making a computer statistically test a difference in at least one of the mean and variance of the elapsed time calculated for each of the plurality of pieces of situation information.

A non-transitory recording medium according to the present invention is characterized by having a computer program recorded for making a computer conduct a comparison in results of comparison between passage time at which a travel object traveling with transportation repeatedly operated at specific time passes through a specific passage point when the travel object uses the plurality of pieces of transportation, and boarding completion time at which boarding the transportation is completed, the computer program comprising the steps of: making a computer extract, when data, including transportation specifying information which specifies transportation by a plurality of items and including results of comparison between passage time at which a travel object actually passes through each of a plurality of passage points at a departure/arrival facility of the transportation and boarding completion time at which boarding of travel objects is actually completed for the transportation, are stored in an associated manner for each of the plurality of travel objects and when a plurality of pieces of transportation specifying information which specifies a plurality of pieces of transportation which is candidates to be used by an arbitrary travel objet is accepted, a plurality of results of comparison between passage time at the specific passage point and boarding completion time which are associated with transportation specifying information having a same content as the accepted transportation specifying information, from the data, for each of the plurality of pieces of transportation specifying information; making a computer calculate, for each of the plurality of pieces of transportation specifying information, at least one of a mean and variance of the extracted results of comparison; and making a computer statistically test a difference in at least one of the mean and variance of the results of comparison calculated for each of the plurality of pieces of transportation specifying information.

A non-transitory recording medium according to the present invention is characterized by having a computer program recorded for making a computer conduct a comparison in results of comparison between passage time at which a travel object traveling with transportation repeatedly operated at specific time passes through a specific passage point when the travel object uses the transportation in a plurality of situations, and boarding completion time at which boarding the transportation is completed, the computer program comprising the steps of: making a computer extract, when data, including situation information indicating a situation specified by a plurality of items at a time when a travel object uses transportation and including results of comparison between passage time at which the travel object actually passes through each of a plurality of passage points at a departure/ arrival facility of transportation and boarding completion time at which boarding of travel objects is actually completed for the transportation used by the travel object, are stored in an associated manner for each of the plurality of travel objects and when a plurality of pieces of situation information indicating a plurality of situations in which an arbitrary travel object uses transportation is accepted, a plurality of results of comparison between passage time at the specific passage point and boarding completion time which are associated with situation information having a same content as the accepted situation information, from the data, for each of the plurality of pieces of situation information; making a computer calculate, for each of the plurality of pieces of situation information, at least one of a mean and variance of the extracted results of comparison; and making a computer statistically test a difference in at least one of the mean and variance of the results of comparison calculated for each of the plurality of pieces of situation information.

In the present invention, when a travel object such as a traveler actually used transportation for traveling in the past, the travel process prediction system acquired passage time at which the traveler passed each passage point at a departure/arrival facility, transportation specifying information indicating the transportation used and situation information indicating a situation, and stores them in an associated manner. Moreover, the travel process prediction apparatus extracts passage time concerning a specific passage point and information associated with the passage time, and obtains a regression equation representing a relationship between passage time at which the travel object passes through a specific passage point, elapsed time while the travel object passes through two specific passage points or a result of comparison between passage time and boarding completion time at which boarding for the transportation is completed, and the extracted other information. The travel process prediction apparatus calculates a predicted value for passage time concerning a specific passage point, elapsed time or a result of comparison under a specific condition by substituting for the obtained regression equation the content of information such as situation information expected when transportation is used. By statistically analyzing the degree of effect caused by multiple pieces of information such as situation information, which is applied in a complicated manner on the passage time, elapsed time or result of comparison, and by substituting the expected information for a regression equation, a highly accurate predicted value may be obtained.

Further in the present invention, the travel process prediction apparatus extracts passage time and the like associated with each of multiple pieces of transportation specifying information or situation information, and tests whether or not there is a statistically significant difference in the mean or variance of specific passage time, specific elapsed time or the specific results of comparison between passage time and boarding completion time when plural pieces of transportation are used. Since the test is conducted based on the past records, the travel process prediction apparatus is able to accurately determine whether or not there is a difference in the specific passage time, specific elapsed time or the specific results of comparison between passage time and boarding completion time when plural pieces of transportation are used.

The present invention adopts a method for reducing an error at the time of measurement or collection for eliminating a sampling error and for performing a large amount of statistical processing, for the item calculated as a predicted value and for various kinds of items affecting such an item. Thus, the obtained predicted value will have high accuracy. Furthermore, according to the present invention, a general user without a special knowledge may also easily obtain a predicted value, so that the time required for traveling can be predicted more accurately than a conventional case. This allows the traveler to plan a more accurate travel schedule and to travel more efficiently. The present invention, therefore, presents beneficial effects.

The above and further objects and features of the invention will more fully be apparent from the following detailed description with accompanying drawings.

BRIEF DESCRIPTION OF THE SEVERAL VIEWS OF THE DRAWINGS

FIG. 8 is a conceptual view illustrating an example of contents of multivariate data;

FIG. 9 is a flowchart illustrating a procedure of processing for travel process prediction executed by a travel process prediction system;

FIG. 10 is a flowchart illustrating a procedure of processing for travel process prediction executed by the travel process prediction system;

FIG. 11 is a conceptual view illustrating an example of a selection menu;

FIG. 12 is a conceptual view illustrating an example of contents of set data;

FIG. 13 is a conceptual view illustrating an example of contents of set data;

FIG. 14 is a conceptual view illustrating an example of an input menu;

FIG. 15 is a conceptual view illustrating an example of an input menu;

FIG. 18 is a conceptual view illustrating an example of contents of explanatory data;

FIG. 19 is a conceptual view illustrating an example of contents of explanatory data;

FIG. 21 is a conceptual view illustrating an example of an input menu according to Embodiment 2.

DETAILED DESCRIPTION

The present invention will be described below in detail with reference to the drawings illustrating the embodiments thereof. In the present embodiment, the present invention will be mainly described by an example where a travelling object travels by using an airplane as transportation. The travelling object in the present invention is assumed to be a traveler travelling by airplane or baggage conveyed by airplane.

Embodiment 1

Figure 1:
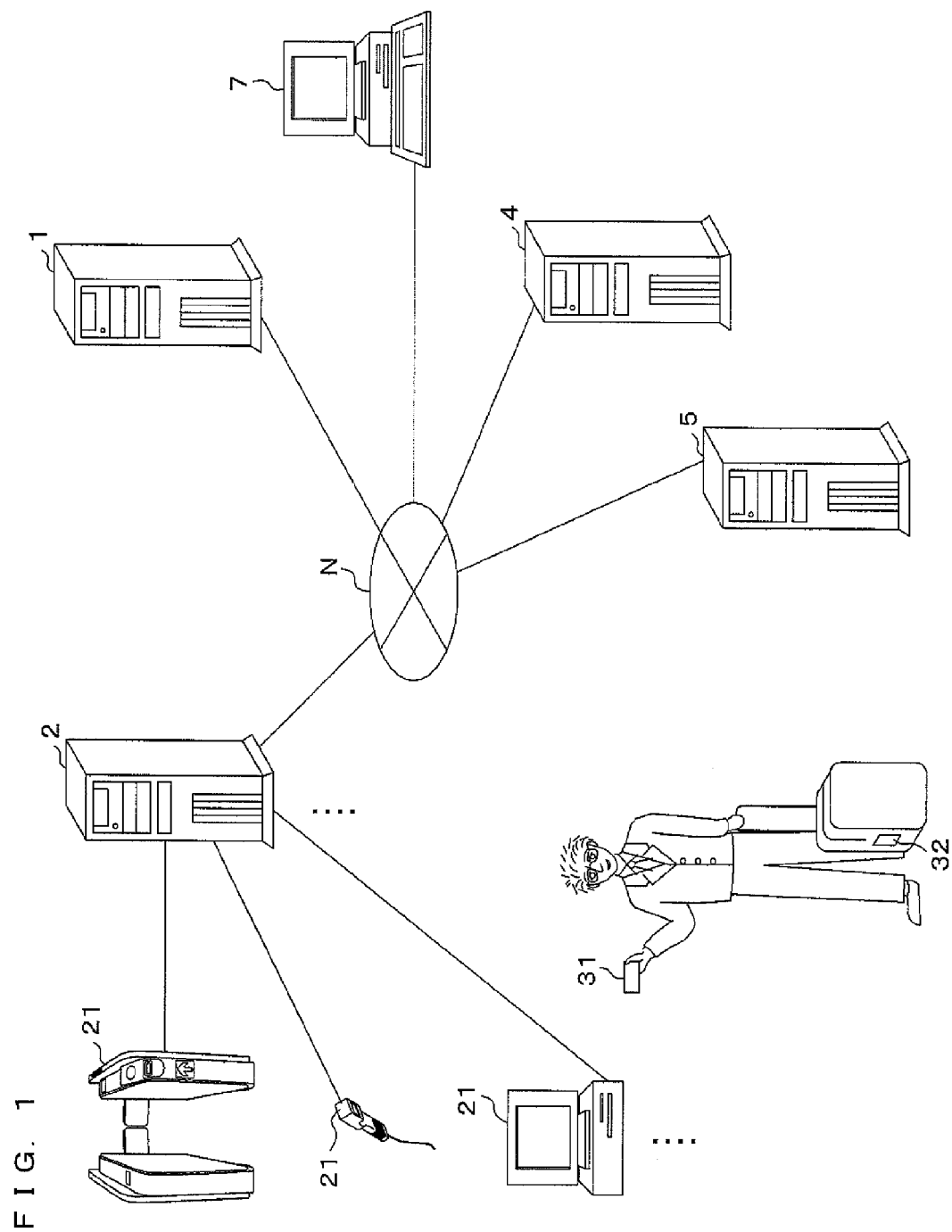
FIG. 1 is a conceptual view illustrating the entire configuration of a travel process prediction system according to the present invention.

FIG. 1 is a conceptual view illustrating the entire configuration of a travel process prediction system according to the present invention. A travel process prediction apparatus 1 performing processing for predicting a travel process of a traveler or baggage, which corresponds to, for example, time of staying at an airport in a departure place or date and time of leaving an airport in an arrival place, is connected to a communication network N such as the Internet. A traveler who uses an airplane holds an air ticket 31, while baggage to be conveyed is tagged with a baggage claim tag 32. On the air ticket 31, an ID which is identification information for identifying the traveler is recorded. For example, the ID of the traveler is printed on the air ticket 31 as a barcode that indicates the ID, or is recorded in such a manner that the air ticket 31 is provided with a semiconductor memory for storing electronic data indicating the ID. Similarly, an ID which is identification information of baggage is recorded on the baggage claim tag 32.

In an airport, which is a departure/arrival facility for airplanes, there are several sites for passage (passage points) through which a traveler or baggage passes, such as a check-in counter, a baggage check-in counter, a security inspection, a boarding gate, a baggage discharging area, a baggage collecting area, an airplane exit, an arrival counter, a baggage claim, an arrival gate and the like. At each passage point, check machines 21, 21, . . . are installed for reading an ID from the air ticket 31 or baggage claim tag 32, checking the passage of a traveler or baggage and detecting date and time of reading the ID. The check machine 21 may be, for example, a ticketing device that issues a ticket 31 or a baggage claim tag 32, a barcode reader connected to a computer to read a barcode printed on the ticket 31 or baggage claim tag 32, or a ticket gate machine that can read an ID recorded in the ticket 31, and display and record necessary information. Another mode for the check machine 21 may be an input device for inputting information such as an ID of the ticket 31 by an operator's operation. Moreover, the check machines 21, 21, . . . determine whether or not a passing traveler or baggage is in a correct state based on criteria set in advance, and perform error processing if it is in an incorrect state. The check machines 21, 21, . . . placed at an airport are connected to an information acquiring apparatus 2 through a communication network installed at the airport. Each check machine 21 transmits the acquired ID and the detected date and time to the information acquiring apparatus 2, which stores the received information therein. The information acquiring apparatus 2 and check machines 21, 21, . . . are placed in each one of several airports. Each information acquiring apparatus 2 is connected to the communication network N and communicates with the travel process prediction apparatus 1 through the communication network N. It is noted that another form may also be possible in which the information acquiring apparatus 2 is integrally configured with the check machine 21 while the check machines 21, 21, . . . are connected to one another. Such a form eliminates the need for the communication network between the check machine 21 and the information acquiring apparatus 2, which improves the processing speed of the check machine 21.

Moreover, the communication network N is connected to a transportation information storing apparatus 4 that stores information related to operation of airplanes. The transportation information storing apparatus 4 is installed in each airline company. The transportation information storing apparatus 4 is connected to a database for managing flight schedule of airplanes through a communication network (not shown), and stores latest information transmitted from the database. Note that the transportation information storing apparatus 4 may also be configured with the database. The transportation information storing apparatus 4 stores therein, for each operating flight, flight specifying information that specifies each flight. For example, stored as the flight specifying information are a flight number including the name of an airline, a flight type such as a regular flight or charter flight, the name of a departure place, the name of an arrival place, a scheduled date and time of departure and a scheduled date and time of arrival. The flight specifying information may also include, for example, an airplane type, passenger capacity and the rate of vacant seats that are normally included in reservation information which will be described later. The transportation information storing apparatus 4 further stores information related to the facilities of an airport and information related to an incident occurred at an airport or on an airplane by associating them with the flight specifying information. The information related to facilities of an airport involving a flight includes information indicating a terminal number, a gate number, the number of operators, an airplane parking apron number, an airplane maintenance area number, and date and time of departure/arrival. Also included is information indicating a worker ID for identifying a person who works at an airport such as an operator, and the number of workers. The information related to facilities of an airport involving a traveler or baggage includes, for example, information indicating the numbers assigned to a ticket counter, security inspection, immigration, baggage conveying pathway and baggage claim area, the number of workers and the order of passage through the facilities, as well as worker's ID. The information related to an incident occurred at an airport or on an airplane includes, for example, information indicating whether or not any flight is cancelled, details of a failure of an airplane, details of a criminal act occurred, a name of a disease occurred, a site of incident, date and time of incident, and the size of damage. Note that the information related to airport facilities, security inspection, quarantine, emigration/immigration and custom inspection may directly be acquired from databases (not shown) respectively managed by specific organizations.

Moreover, the transportation information storing apparatus 4 stores, for each traveler, reservation information indicating contents of reservation made by a specific traveler for a specific flight. The reservation information includes an ID which is identification information of a traveler, as well as information indicating a status of the traveler, such as the name, age, gender and nationality of the traveler. The reservation information also includes at least a part of flight specifying information that specifies a flight to be used by the traveler, such as a departure place, an arrival place, a flight number for the flight to be used, and the planned date, month and year of departure, which are associated with one another. The reservation information further includes information indicating conditions for a traveler who uses a flight, for example a type of seat such as coach or business class, a seat number, and the number of baggage. The flight specifying information corresponds to transportation specifying information.

In addition, the communication network N is connected to a weather information storing apparatus 5 that stores information related to the weather of different areas. The weather information storing apparatus 5 stores weather information indicating a state of the weather in each of the areas including the airport. The weather information storing apparatus 5 acquires latest weather information through a communication network (not shown) from a database at an airport weather station or a closest weather station. The database transmits, for example, each piece of information at the areas including the airport, such as actual weather, temperature, precipitation probability and various kinds of weather warnings or advisories, to the weather information storing apparatus 5. The weather information storing apparatus 5 stores therein the transmitted information by associating it with positional information such as the name of the airport and with time information such as the date and time of observation. It is noted that the weather information storing apparatus 5 may be configured with the database.

The user who employs the technology of the present invention to predict a travel process can use an input/output device 7 such as a personal computer (PC) or a mobile phone. The input/output device 7 may be connected to the communication network N as required and communicate with the travel process prediction apparatus 1 through the communication network N. The input/output device 7 includes a display unit such as a liquid-crystal panel, a sound output unit such as a speaker, and an input unit such as a keyboard, mouse or microphone. The display unit and sound output unit output various kinds of information including a prediction result obtained by the present invention, and the input unit serves to input various kinds of information in response to operation by the user.

Figure 2:
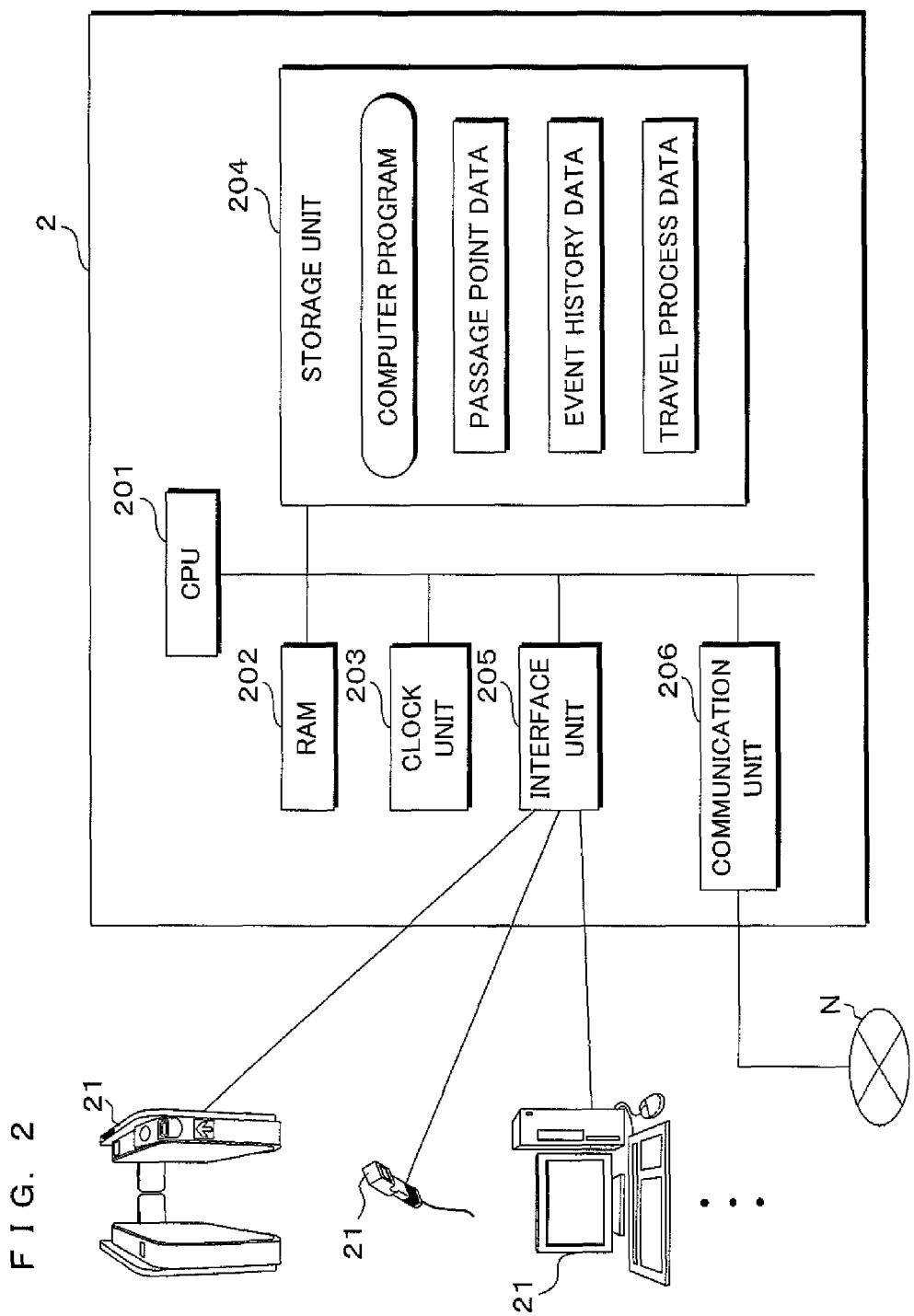
FIG. 2 is a block diagram illustrating an internal configuration of an information acquiring apparatus.

FIG. 2 is a block diagram illustrating an internal configuration of the information acquiring apparatus 2. The information acquiring apparatus 2 is configured with a general-purpose computer such as a server device. The information acquiring apparatus 2 includes a CPU (Central Processing Unit) 201 for performing arithmetic operation, an RAM (Random Access Memory) 202 for storing temporary data generated along with the arithmetic operation and a nonvolatile storage unit 204 such as a hard disk. The information acquiring apparatus 2 further includes a clock unit 203 for measuring date and time, an interface unit 205 to which check machines 21, 21, . . . are connected, and a communication unit 206 connected to the communication network N. In the storage unit 204, a computer program is stored. The computer program is read from a recording medium such as an optical disk by a drive unit such as an optical disk drive (not shown), or is downloaded from another server device (not shown) connected to the communication network N. The computer program is loaded to RAM 202 as required, and the CPU 201 executes processing necessary for the information acquiring apparatus 2 in accordance with the computer program loaded to RAM 202.

The storage unit 204 stores passage point data in which information related to check machines 21, 21, . . . installed at each passage point at an airport is recorded. For example, at the passage point data, the ID and name of the check machine 21, the location of the passage point and the like are recorded for each passage point. In the present invention, a change in once-determined contents of information is referred to as an "event." The storage unit 204 stores therein event history data which records change information which indicates that information related to the operation of transportation, or traveling of a traveler or baggage has been changed. For example, at the event history data, change information, including a changed item name which is the name of an item for changed information among the information stored in the transportation information storing apparatus 4 and weather information storing apparatus 5, contents of information before and after change, date and time of change and the number of changes, is stored in association with the flight specifying information at least including a flight number and departure date. Also at the event history data, error information indicating that error processing is performed at each check machine 21 is recorded in being associated with ID of the check machine 21, ID of the checked traveler or baggage and flight specifying information. The error information includes a determination item in determination by the check machine 21, a result before and after determination, date and time of determination, and the number of determinations. For instance, if the error processing is performed at the first determination with respect to a traveler or baggage, "no determination" is recorded in the result before determination, while the content of an output error message is recorded in the result after determination. If, for example, the error processing is performed in the second or subsequent determination, the error message for the previous determination or a message "normal" is recorded in the result before determination, while an output error message is recorded in the result after determination.

In addition, the storage unit 204 stores therein travel process data in which date and time when a traveler or baggage passes through each passage point are recorded. The CPU 201 regularly performs processing of reading out from travel process data passage time at which travelers or baggage passes through each passage point, calculating a mean value and standard deviation of the passage time for each flight with respect to different passage points, and recording the calculated mean value and standard deviation of the passage time at the travel process data by associating them with the flight specifying information and ID of the check machine 21. For example, the CPU 201 calculates and records the mean and standard deviation of passage time at a predetermined time such as 1:00 am every day. Here, the CPU 201 performs calculation such that the read-out passage time has the right chronological order when the read-out passage time includes time around midnight. For example, the CPU 201 reads out date information together with passage time, adds 24:00 to the passage time after midnight based on the date information, and then calculates the mean value and standard deviation. Furthermore, if the obtained mean value exceeds 24:00, the CPU 201 subtracts 24:00 from the obtained mean value. It is noted that the information acquiring apparatus 2 may also take a form configured with more than one computer.

Figure 3:
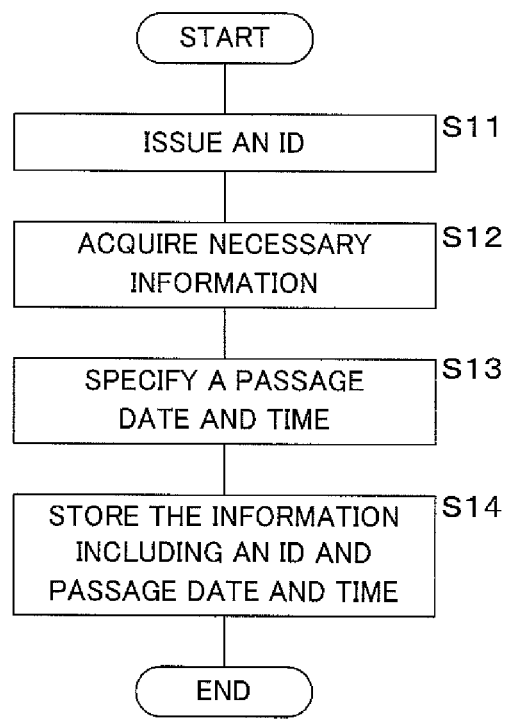
FIG. 3 is a flowchart illustrating a procedure of processing in which the travel process prediction system according to the present invention issues an ID at the first passage point.

Next, the processing executed by the information acquiring apparatus 2 and check machines 21, 21, . . . installed at an airport is described. A traveler who has no ID recorded in the air ticket 31 first needs to receive an ID at the first passage point such as a check-in counter. FIG. 3 is a flowchart illustrating a procedure of processing in which the travel process prediction system according to the present invention issues an ID at the first passage point. The check machine 21 such as a ticketing device issues an ID for identifying a traveler by a method of, for example, issuing the air ticket 31 in which a new ID is recorded (S11). The check machine 21 and information acquiring apparatus 2 subsequently perform processing of acquiring information required for the traveler who uses an airplane and information required for the travel process prediction apparatus 1 which predicts a travel process of a traveler or baggage (S12). It is noted that the check machine 21 may perform the processing at steps S11 and S12 in the reverse order. The information acquiring apparatus 2 that acquired information at step S12 transmits the acquired information to other information acquiring apparatuses 2 through the communication network N, while other information acquiring apparatuses 2 acquire the transmitted information. That is, at step S12, all information acquiring apparatuses 2 acquire the same information. Note that the travel process prediction system may take such a form that one information acquiring apparatus 2 acquires information and thereafter transmits the acquired information to other information acquiring apparatuses 2 located in places of departure, transfer and arrival of a traveler or baggage. In such a form, multiple information acquiring apparatuses 2 related to the traveling pathway of the traveler or baggage acquire the same information. Moreover, the travel process prediction system may have such a form that a single information acquiring apparatus 2 acquires information at step S12. In such a form, as necessary, the information acquired by and stored in the information acquiring apparatus 2 may be shared by other information devices 2 through the communication network N.

At step S12, when, for example, a reservation for a flight has been made, the information acquiring apparatus 2 performs processing of acquiring reservation information from the transportation information storing apparatus 4 through the communication network N. More specifically, the CPU 201 makes the communication unit 206 transmit a search instruction for reservation information based on a reservation number or the like to the transportation information storing apparatus 4. The transportation information storing apparatus 4 transmits the reservation information found in response to the search instruction to the information acquiring apparatus 2, which receives the reservation information at the communication unit 206. If no reservation has been made, an operator or a traveler him/herself operates the check machine 21, such as a ticketing device, so that the check machine 21 accepts flight specifying information and information related to traveler. The information related to traveler includes information indicating a status of a traveler, such as name and age, as well as information indicating conditions for a traveler who uses a flight, such as a seat number. It is note that the CPU 201 may first accept a part of the flight specifying information and then acquire the remaining flight specifying information from the transportation information storing apparatus 4 through the communication network N. The CPU 201 also acquires the remaining information associated with the acquired flight specifying information from the transportation information storing apparatus 4. The CPU 201 further acquires weather information indicating the weather condition of the area including the airport from the weather information storing apparatus 5 through the communication network N. It is noted that the information acquired from the transportation information storing apparatus 4 and weather information storing apparatus 5 is a copy of the latest information. Furthermore, the check machine 21 such as a ticketing device records a part or whole of the acquired information to the air ticket 31 as necessary. Among the information acquired by the check machine 21 and information acquiring apparatus 2, the information except for traveler's ID and the flight specifying information corresponds to situation information indicating a situation in which a traveler uses a flight.

The CPU 201 next specifies a passage date and time at which a traveler passes through the first passage point such as a check-in counter, based on a date and time obtained by the clock unit 203 (S13). The passage date and time include at least a date and time. The CPU 201 then stores, in the storage unit 204 in association with one another, the acquired information including IDs of the traveler and the check machine 21 as well as passage date/time by recording it at the travel process data (S14). Here, the information acquiring apparatus 2 and check machine 21 terminate the processing of ID issuance.

Also when a traveling object is baggage, the information acquiring apparatus 2 and check machine 21 execute similar processing. At the first passage point such as a check-in counter, the check machine 21 such as a ticketing device, at step S11, issues an ID for identifying baggage by issuing a baggage claim tag 32 in which a new ID is recorded. Also at step S12, the information acquiring apparatus 2 and check machine 21 acquire flight specifying information and information associated with the flight specifying information by a method of, for example, reading out information related to a traveler who is the owner of the baggage based on the traveler's ID. Moreover, an operator or a traveler operates a necessary machine to acquire other necessary information such as the size, weight, content and radiograph of the baggage and input them to the check machine 21. It is noted that the check machine 21 may be provided with equipment which automatically acquires these pieces of information. Furthermore, the information acquiring apparatus 2 acquires weather information from the weather information storing apparatus 5. Among the information acquired by the check machine 21 and information acquiring apparatus 2, the information except for baggage's ID and the flight specifying information is situation information indicating a situation of the baggage carried by the flight. The information acquiring apparatus 2 similarly specifies a passage date and time for the baggage at step S13, and records the acquired information including the IDs of the baggage and check machine 21 as well as passage date/time at the travel process data in the storage unit 204 in association with one another at step S14. The check machine 21 further records a part or whole of the acquired information in the baggage claim tag 32.

Figure 4:
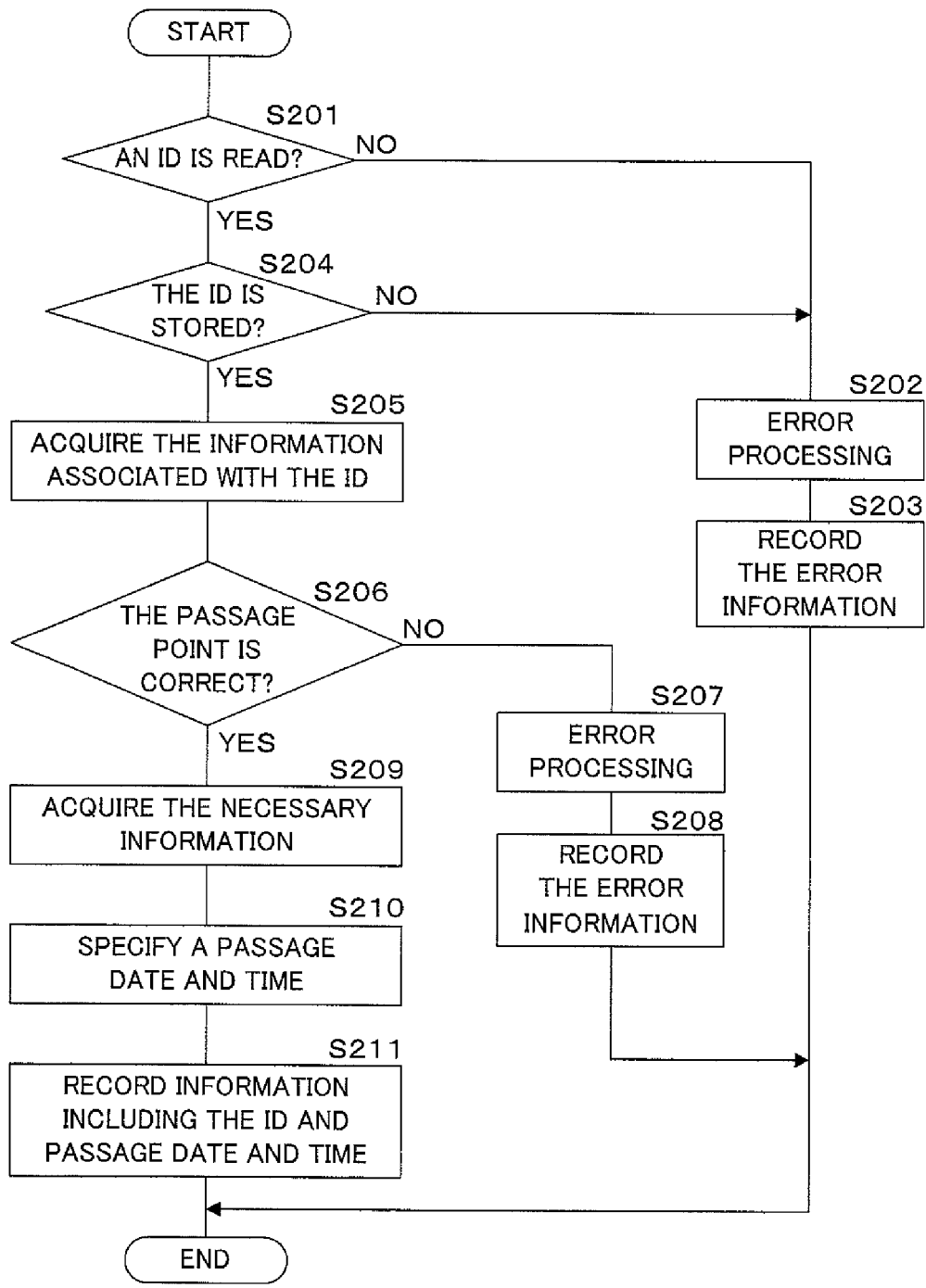
FIG. 4 is a flowchart illustrating a procedure of processing in which the travel process prediction system according to the present invention checks a passage of a traveler at the first passage point.

When a traveler who has already been issued an ID passes through the first passage point, such as the case where a traveler has the air ticket 31 in which the ID has already been recorded, the information acquiring apparatus 2 and check machine 21 use the ID to check the passage. FIG. 4 is a flowchart illustrating a procedure of processing in which the travel process prediction system according to the present invention checks a passage of a traveler at the first passage point. The check machine 21 such as a terminal device at a check-in counter performs processing of reading an ID recorded in the air ticket 31 and determines whether or not the ID is read (S201). If the ID reading fails (S201: NO), the CPU 201 performs error processing (S202). In the error processing at step S202, the CPU 201 outputs an error message such as "ID cannot be read" with a speaker, display or the like of the check machine 21 for example, and executes the processing of reading an ID again. Alternatively, the CPU 201 may perform processing of reissuing an ID. The CPU 201 then records the error information at event history data (S203) and terminates the processing. At step S203, the error information is recorded in association with a reissued ID or a predetermined ID indicating the failure of ID reading.

If an ID is successfully read at step S201 (S201: YES), the CPU 201 determines whether or not the read ID is stored in the transportation information storing apparatus 4 as a reserved ID (S204). If the read ID is not stored in the transportation information storing apparatus 4 as the reserved ID (S204: NO), the CPU 201 proceeds to step S202. If the read ID is stored in the transportation information storing apparatus 4 as the reserved ID (S204: YES), the CPU 201 performs processing of acquiring the information associated with the ID from the transportation information storing apparatus 4 through the communication network N (S205). The information to be acquired includes flight specifying information and the like. The CPU 201 subsequently determines based on the information associated with ID whether or not the current passage point is a correct passage point through which a traveler can pass (S206). For example, the CPU 201 reads out information related to airport facilities associated with the acquired flight specifying information from the transportation information storing apparatus 4, and makes determination by comparing the read-out information with the information related to the current passage point. If the current passage point is not a correct passage point (S206: NO), the CPU 201 performs error processing (S207). In the error processing at step S207, the CPU 201 outputs an error message such as "the check-in counter is incorrect" by the check machine 21 through a speaker or display. The CPU 201 then records error information at the event history data (S208) and terminates the processing.

If the current passage point is the correct passage point at step S206 (S206: YES), the CPU 201 performs processing of acquiring information which is required for a traveler to board an airplane but which was not acquired at the time of reservation (S209). In other words, the CPU 201 accepts at the check machine 21 missing information among necessary information such as the flight specifying information, information related to traveler or baggage and information indicating conditions for boarding a flight. Moreover, the CPU 201 acquires information specifying airport facilities to be used and workers, information specifying passage points through which a traveler should pass or may pass as well as the order of passage, information related to an incident or accident occurred, weather information and the like. Among the information acquired by the check machine 21 and information acquiring apparatus 2, the information except for a traveler or baggage's ID and flight specifying information corresponds to situation information indicating a situation of a traveler using the flight. Furthermore, the check machine 21 such as a ticketing device records, as necessary, a part or whole of the acquired information in the air ticket 31. The CPU 201 subsequently specifies a passage date and time at which a traveler passes through the first passage point based on a date and time obtained by the clock unit 203 (S210). The CPU 201 then records the acquired information, including IDs of the traveler, baggage and check machine 21, determination items not regarded as error processing, results before and after determination, and passage date and time, at the travel process data in order to store them in the storage unit 204 by associating with one another (S211). The information acquiring apparatus 2 and check machine 21 thus terminate the processing of checking the passage of a traveler at the first point.

Figure 5:
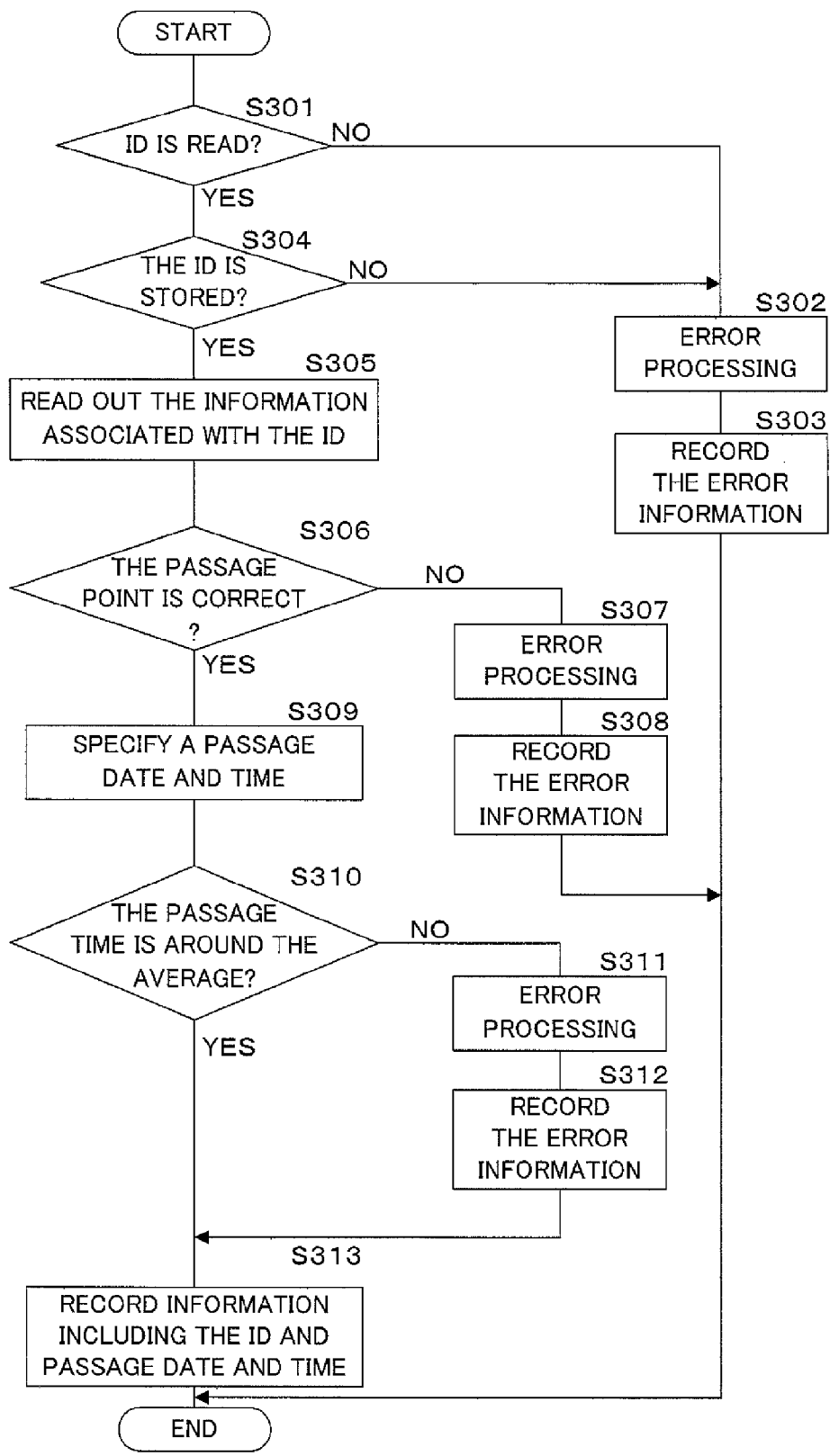
FIG. 5 is a flowchart illustrating a procedure of processing in which the travel process prediction system according to the present invention checks a passage of a traveler at the second and subsequent passage points.

At the second or subsequent passage point, the information acquiring apparatus 2 and check machine 21 perform processing of checking the passage of a traveler or baggage. FIG. 5 is a flowchart illustrating a procedure of processing in which the travel process prediction system according to the present invention checks the passage of a traveler at the second and subsequent passage points. The check machine 21 such as a barcode reader or a ticket gate performs processing of reading an ID recorded in the air ticket 31 or baggage claim tag 32 and determines whether or not an ID has been read (S301). If the ID reading is failed (S301: NO), the CPU 201 performs error processing (S302). In the error processing at step S302, the CPU 201 uses a speaker or display of the check machine 21, for example, to output an error message such as "ID cannot be read," and executes the processing of reading the ID again. The CPU 201 may also execute the processing for forcibly prohibiting passage of a traveler or baggage along with the processing at step S302. When, for example, the check machine 21 is a ticket gate, the CPU 201 performs the processing of making the ticket gate close a pathway. When, for example, an ID of baggage being conveyed on a conveyance path cannot be read, the CPU 201 performs processing of stopping the conveyance of baggage. The CPU 201 then records the error information at the event history data (S303) and terminates the processing.

If an ID is successfully read at step S301 (S301: YES), the CPU 201 determines whether or not the read ID is recorded at the travel process data stored in the storage unit 204 (S304). At step S304, the CPU 201 may also search it at other travel process data stored in other storage units 204 of other information acquiring apparatuses 2 through the communication network N. If the read ID is not recorded at the travel process data (S304: NO), the CPU 201 proceeds to the step S302. If the read ID is recorded at the travel process data (S304: YES), the CPU 201 reads out information associated with the ID from the storage unit 204 (S305). The CPU 201 compares the read information with the latest information in the transportation information storing apparatus 4 and weather information storing apparatus 5 through the communication network N, to determine whether or not information is updated. If the information is updated, the item name of the changed information, contents of information before and after change, date and time of change, and the number of changes are recorded at the event history data in the storage unit 204 in being associated with the flight specifying information including at least a flight number and departure date.

The CPU 201 subsequently determines, based on the information which is associated to the ID and which includes the changed information, whether or not the current passage point is the correct passage point where the traveler or baggage can pass through (S306). For example, the CPU 201 determines whether or not the current passage point at which the check machine 21 is present is included in the passage points specified by the latest information associated with the ID, and whether or not the order of passage calculated from the actual passage date and time matches with the order of passages specified by the latest information. If the current passage point is not included in the passage points specified by the latest information associated with the ID or if the orders of passages do not match with each other, the CPU 201 determines that the current passage point is not the correct passage point. If the current passage point is not the correct passage point (S306: NO), the CPU 201 performs error processing (S307). In the error processing at step S307, for instance, the CPU 201 outputs by using the check machine 21 an error message such as "the flight number is incorrect", "the gate number is incorrect", "the baggage claim area is incorrect", "the order of passages is incorrect", or the like. The CPU 201 may also perform processing of outputting, by using the check machine 21, a message to direct the user to the correct passage point. The CPU 201 may further execute processing of forcibly prohibiting the passage of a traveler or baggage along with the processing at step S307. The CPU 201 then records the error information at the event history data (S308) and terminates the processing. Note that the determination related to passage points may be performed by all the check machines 21.

If the current passage point is the correct passage point at step S306 (S306: YES), the CPU 201 specifies the passage date and time when a traveler passes the current passage point based on the date and time obtained by the clock unit 203 (S309). It is noted that, at step S306, the processing of determining whether or not the correct baggage is picked up may further be performed. For example, the check machine 21 requests the traveler to present a baggage ID and a traveler ID at the exit of a baggage claim area, while the CPU 201 determines whether or not the traveler picked up the correct baggage. More specifically, the CPU 201 searches for the same baggage ID as the actually-acquired baggage ID from the storage unit 204, specifies the ID for the owner of the baggage associated with the found baggage ID, and determines whether or not it matches with the actually-acquired traveler ID. If they do not match with each other, the CPU 201 proceeds to step S307 to perform error processing of, for example, outputting a message such as "wrong baggage." If they match with each other, the CPU 201 proceeds to step S309.

The CPU 201 then performs processing of determining if the passage time at each passage point is earlier, later or around the average compared to the past records (S310). More specifically, the CPU 201 makes determination based on the mean value and standard deviation of passage time recorded for each of the respective passage points and flights at the travel process data stored in the storage unit 204. For example, the CPU 201 assumes the standard deviation as σ and determines that the passage time is earlier if it is smaller than (mean−4σ) and that it is later if it is larger than (mean+4σ). Moreover, the CPU 201 determines that the passage time is around the average if the passage time is in a range between (mean−4σ) and (mean+4σ) inclusive. If the passage time is earlier or later than that in the past records (S310: NO), the CPU 201 performs error processing of, for example, outputting a message such as "too early compared to normal" or "too late compared to normal" (S311). The CPU 201 subsequently records the error information at the event history data (S312). Note that the determination related to passage time may be made in all the check machines 21.

If step S312 is completed, or if the passage time is around the average compared to the past records at step S310 (S310: YES), the CPU 201 records, at the travel process data, information including IDs for the traveler, baggage and check machine, the item name of determination which is not to cause error processing and the result before and after the determination, as well as the passage date and time, to store them in the storage unit 204 in association with one another (S313). Here, the check machine 21 records a part or whole of the acquired information in the air ticket 31 or baggage claim tag 32. The information acquiring apparatus 2 and check machine 21 terminate the processing of checking the passage of a traveler at the second or subsequent passage point. The processing at steps S301-313 is executed at each of the second and subsequent passage points every time the traveler or baggage passes.

By executing the processing at steps S11-14, steps S201-211 and steps S301-313 as described above, the information acquiring apparatus 2 and check machines 21, 21, ... specify the passage date and time when the traveler or baggage passes through each passage point. Though it was described that the processing is performed mainly by the information acquiring apparatus 2 and check machines 21, 21, ... installed at an airport in a departure place, similar processing is executed by the information acquiring apparatus 2 and check machines 21, 21, ... installed at airports in places of transfer and arrival of a flight. Note that a part of the processing described to be executed by the CPU 201 among the processing at steps S11-14, steps S201-211 and steps S301-313 may alternatively be executed by the check machine 21.

Moreover, the information acquiring apparatus 2 performs processing of acquiring boarding completion date and time for each flight which are the date and time when travelers or baggage is completely on board for the flight. For example, the boarding completion date and time are the date and time when the boarding gate, which is the last passage point where a traveler needs to pass through before boarding an airplane, is closed. Alternatively, the boarding completion date and time are, for example, the date and time when a loading dock where baggage is carried into the airplane is closed. The boarding completion date and time include at least a date and time. The boarding completion date and time are specified by the check machine 21 installed at a boarding gate or a loading dock, while the CPU 201 records the specified boarding completion date and time at the travel process data by associating it with the ID for a traveler or baggage and flight specifying information. It is also possible to specify the boarding completion date and time by a worker such as a cabin crew of an airplane operating an input device (not shown) connected to the interface unit 205.

Furthermore, the information acquiring apparatus 2 detects the state where the departure and arrival time of an airplane is different from the scheduled time by a degree greater than a predetermined allowable range, such as delay in arrival of the airplane by a predetermined time or more, delay in departure of the airplane by a predetermined time or more, or cancellation of the flight, and where no change information has been recorded. When such a state arises, the passage date and time when a traveler or baggage passes through each passage point is affected and changed, while the cause of change in the passage date and time is unknown. If the travel process of a traveler or baggage is predicted based on the past records including the data in such a state, the prediction accuracy is lowered. The CPU 201 therefore determines, when the departure/arrival date and time of a flight is different from the scheduled time by a degree greater than a predetermined allowable range, whether or not the change information associated with flight specific information including at least the same flight number and departure date as the above-described flight is recorded at the event history data. If the change information is not recorded at the event history data, the CPU 201 performs processing of recording the information indicating an abnormality in transportation at the event history data by associating it with the flight specifying information therefor. Likewise, the CPU 201 also detects a state where the actual passage time of a traveler or baggage at each passage point is different from the past average passage time of past travelers or baggage concerning the same flight at the same passage point by a degree greater than a predetermined allowable range. Here, the CPU 201 compares the time in consideration of a difference in dates. For example, the CPU 201 determines whether or not the average passage time is different from the actual passage time by a predetermined time or greater, and whether or not the average passage time is in a pre-set time zone around midnight. For example, the predetermined time is set as twelve hours, while the preset time zone around midnight is between 21:00 and 3:00 inclusive. When the average passage time is different from the actual passage time by a predetermined time or greater, and the average passage time is in the pre-set time zone around midnight, the CPU 201 performs the calculation below for obtaining a difference between the pieces of time in different dates. Between the average passage time and the actual passage time, the time with a larger number is assumed as $T_{max}$ while the time with a smaller number is assumed as $T_{min}$. The CPU 201 calculates $\{(24:00-T_{max})+T_{min}\}$. The CPU 201 then compares the calculated time with the predetermined allowable range. When the difference between the average passage time and the actual passage time falls in a time shorter than the predetermined time, or when the average passage time is outside the preset time zone around midnight, the CPU 201 directly compares the difference between the average passage time and the actual passage time with the predetermined allowable range.

If the difference between the pieces of passage time is greater than the predetermined allowable range, the CPU 201 determines whether or not there is error information associated with the ID of the traveler or baggage and with the flight specifying information of the flight, among the error information recorded at the event history data. If such error information is not recorded at the event history data, the CPU 201 performs processing of recording the information indicating abnormality of the traveling object at the event history data by associating it with the ID of the traveler or baggage and the flight specifying information of the flight. As described above, the information acquiring apparatus 2 automatically acquires information in almost all the procedures, to reduce errors in data measurement or collection.

Figure 6:
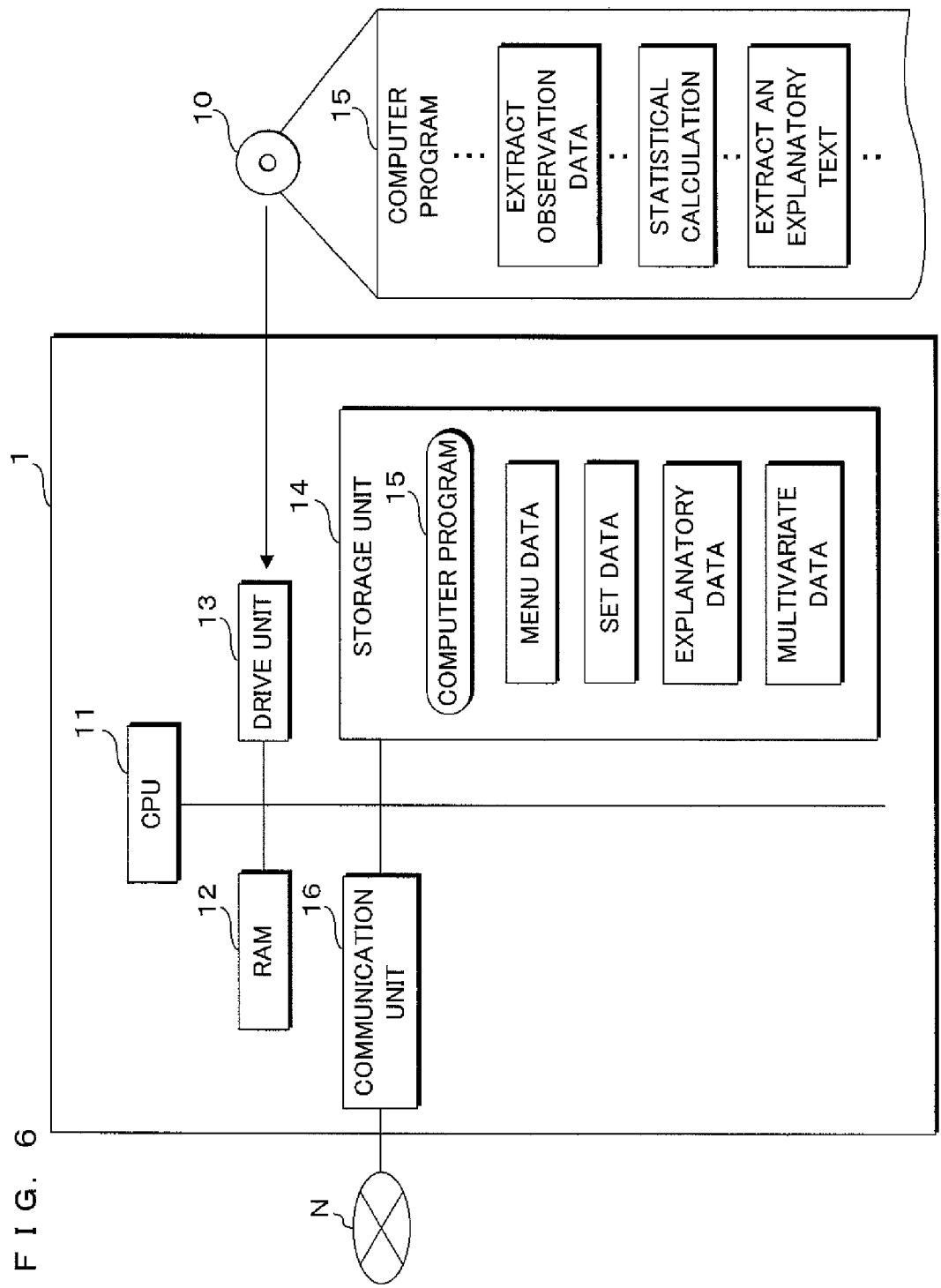
FIG. 6 is a block diagram illustrating an internal configuration of the travel process prediction apparatus.

Next, the travel process prediction apparatus 1 is described. FIG. 6 is a block diagram illustrating an internal configuration of the travel process prediction apparatus 1. The travel process prediction apparatus 1 is configured with a general-purpose computer such as a server device. The travel process prediction apparatus 1 includes a CPU 11 performing arithmetic operation, a RAM 12 storing data associated with the arithmetic operation, a drive unit 13 reading information from the recording medium 10 such as an optical disk, and a non-volatile storage unit 14 such as a hard disk. The travel process prediction apparatus 1 further includes a communication unit 16 connected to the communication network N. The CPU 11 makes the drive unit 13 read the computer program 15 recorded in the recording medium 10 and makes the storage unit 14 store the read computer program 15. The computer program 15 is loaded from the storage unit 14 to the RAM 12 as needed, and the CPU 11 executes processing necessary for the travel process prediction apparatus 1 based on the loaded computer program 15. The storage unit 14 stores therein multivariate data at which the information acquired by multiple information acquiring apparatuses 2 is collectively recorded. As described above, the information acquiring apparatus 2 acquires passage date and time at each passage point, flight specifying information as well as situation information for each of the travelers and baggage that used airplanes in the past.

Figure 7:
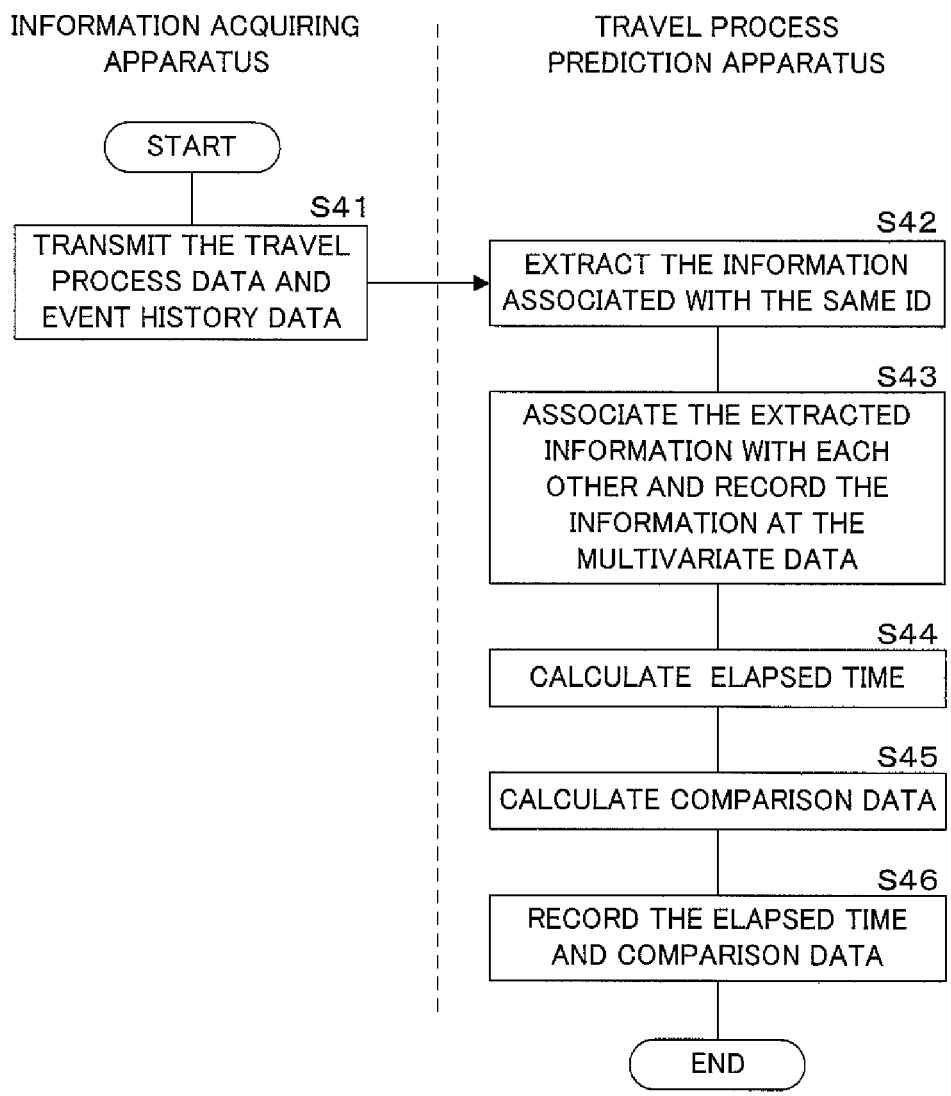
FIG. 7 is a flowchart illustrating a procedure of processing for transferring data from the information acquiring apparatus to the travel process prediction apparatus.

FIG. 7 is a flowchart illustrating a procedure of processing for transferring data from the information acquiring apparatus 2 to the travel process prediction apparatus 1. The CPU 201 of the information acquiring apparatus 2 transmits the travel process data and event history data stored in the storage unit 204 to the travel process prediction apparatus 1 through the communication network N at an appropriate timing such as a regular timing or a timing such that a predetermined amount of travel process data is stored in the storage unit 204 (S41). It is noted that the information acquiring apparatus 2 may transmit a difference between the stored data and previously transmitted data. The travel process prediction apparatus 1 receives at the communication unit 16 the travel process data and event history data transmitted from the information acquiring apparatuses 2, 2, . . . . The CPU 11 of the travel process prediction apparatus 1 extracts information associated with the same ID from the received multiple pieces of travel process data and event history data (S42). At step S42, the CPU 11 extracts information further associated with the information associated with the same ID. The CPU 11 then associates the extracted information with each other and adds the associated information to the multivariate data stored in the storage unit 14 in order to record the extracted information at the multivariate data (S43). It is noted that when the ID to which the extracted information is associated has already been recorded at the multivariate data, the CPU 11 records the extracted information by associating it with the information recorded in association with the ID. The original of the information received by the travel process prediction apparatus 1 is saved by the storage unit 14 or erased by the CPU 11 after a certain period.

FIG. 8 is a conceptual view illustrating an example of contents of multivariate data. Information related to a traveler is recorded, which includes an ID for identifying the traveler as well as information indicating a status of the traveler such as gender, age, nationality and language used. Information related to baggage is also recorded, which includes an ID for identifying the baggage as well as information indicating a status of baggage such as an owner's ID of the baggage and weight of the baggage. It is noted that either of the information related to the traveler or the information related to the baggage may be recorded. Moreover, information related to a flight used by the traveler or baggage is also recorded, which includes flight specifying information such as a flight number and an flight type, information indicating past records such as actual departure date and time, and information indicating conditions in which the traveler used the flight such as a seat number and the rate of vacant seats. The information related to the flight also includes a boarding completion date and time. Also stored at the multivariate data is information related to a departure airport from which the flight departed. This information includes date, month and year when the traveler or baggage used the airport of departure, information indicating a state of the departure airport such as the name of the airport and a language that can be used at the departure airport, information specifying facilities used such as a terminal, a worker ID, information specifying the number of workers, and weather information indicating the weather condition of the area including the airport. Also recorded as a similar item is information related to an airport of arrival at which the flight arrived. Furthermore, change information related to an event in which once determined contents of information are changed is recorded. It includes information indicating the name of a changed item, contents of information before and after change, date and time of change, the number of changes and the like. The multivariate data also includes information indicating abnormalities in transportation or traveling object. The recorded items are associated with one another and applied to an observation data number for each traveler or baggage. Furthermore, the information related to the departure airport and arrival airport includes information indicating the check machine 21 installed at each passage point and information acquired by the check machine 21 such as passage date/time and error information. The information acquired by the check machine 21 is applied to information indicating the check machine 21 which acquired the information. FIG. 8 shows that "passage date and time (No. a)" which is a passage date and time specified by the No. 8 check machine 21 is recorded at the multivariate data. Among the above described information included in the multivariate data, the information, except for the traveler, baggage or owner's IDs and the flight specifying information as well as passage date/time, corresponds to situation information comprised of multiple items indicating situations in which the traveler or baggage used the flight.

The CPU 11 then calculates elapsed time while the traveler or baggage passes through two passage points, from the passage date/time at each passage point recorded at the multivariate data (S44). The CPU 11 next calculates comparison data indicating a result of comparison obtained by comparing the passage date and time at each passage point with the boarding completion date and time (S45). For example, the CPU 11 calculates the difference in time between the boarding completion date and time for a flight and the passage date and time when a traveler who uses the flight passes through each passage point in order to obtain data indicating the calculated time difference as comparison data. The comparison data is not limited to the difference in time. For example, the comparison data may have a determination value of "1" if the passage date/time is earlier than the boarding completion date and time, whereas it may have a determination value of "0" if the passage date and time is the same as or later than the boarding completion date and time. Moreover, when the comparison is made for time around midnight, the CPU 11 performs calculation such that the chronological relationship between pieces of time is correctly maintained. For example, when comparing passage time with boarding completion time around midnight, the CPU 11 adds 24:00 to the time after midnight before calculation. Note that the timing at which the elapsed time or comparison data is calculated may be any other timing before extracting observation data from the multivariate data at step S512 which will be described later. The CPU 11 then records the calculated elapsed time and comparison data at the multivariate data by associating them with the original passage date and time (S46), and terminates the processing.

FIG. 8 shows, for example, that the elapsed time from the time when a travel object passes through the passage point of the No. a check machine 21 to the time when the travel object moves to the passage point of the No. b check machine 21 is recorded at the multivariate data. FIG. 8 also shows that the comparison data is recorded at the multivariate data in association with the passage date and time of each check machine. The CPU 11 similarly calculates the elapsed time and comparison data also for an arrival airport at steps S44 and S45. If there is a wayport for the flight, information similar to that for the departure airport is recorded at the multivariate data also for the wayport. The information recorded at the multivariate data in an associated manner is recorded for each traveler and each baggage. As shown in FIG. 8, the information recorded at the multivariate data includes both quantitative data and qualitative data. The quantitative data is composed of numeric values such as date and time, temperature or the like, and has a meaning in the interval of the values. The qualitative data may be data other than numeric values, such as the name of an airport, or may be a numeric value such as a terminal number which only has a meaning in the difference of values themselves and no meaning in the interval of different values. As described above, the travel process prediction apparatus 1 stores, for each of the travelers and baggage that used airplanes in the past, passage date and time at each passage point, elapsed time while the travel object passes through two arbitrary passage points, boarding completion date and time, and comparison data, as well as the flight specifying information and situation information that are other than the above, by making them associated.

Next, a method of predicting a travel process performed by the travel process prediction system according to the present invention is described. The travel process prediction system performs processing for predicting a process in which a future traveler or baggage uses a specific flight to travel. FIGS. 9 and 10 show a flowchart illustrating a procedure of processing for travel process prediction executed by the travel process prediction system. The user such as a person who plans to travel operates the input/output device 7, which transmits a request for travel process prediction to the travel process prediction apparatus 1 through the communication network N by a method of, for example, accessing a website for the present invention (S501). The travel process prediction apparatus 1 receives the request for travel process prediction at the communication unit 16. The CPU 11 makes the communication unit 16 transmit menu data for causing the input/output device 7 to display a selection menu for showing a list of names of executable processing in order for the input/output device 7 to accept a selection of processing to be actually executed through the communication network N (S502). The menu data is stored in the storage unit 14 in advance. Note that the menu data may be included in the computer program 15. The input/output device 7 receives the menu data and shows a selection menu on the display unit based on the menu data (S503).

FIG. 11 is a conceptual view illustrating an example of a selection menu. In the present invention, prediction can be made for passage time at which a travel object who uses a particular flight passes through a specific passage point, elapsed time while the travel object passes through two passage points, or comparison data indicating a result of comparison between a boarding completion date and time for the flight and the passage date and time. Also in the present invention, comparative prediction can be performed by comparing and predicting the pieces of passage time or elapsed time or comparison data which are predicted when two flights are used. Furthermore, in the present invention, the processing of statistic calculation, such as the processing of calculating a mean value of the pieces of passage time or elapsed time or the comparison data, can be performed. As shown in FIG. 11, the selection menu is shown to the user in order for him/her to select one piece of processing among the predictions, the comparative predictions and statistic calculations for various kinds of values which are to be performed by the travel process prediction apparatus 1. For example, a prediction, comparative prediction, or statistic calculation may be selected for each kind of values such as a departure airport staying time, i.e. elapsed time while a travel object passes through the first passage point to the last passage point at the departure airport, or an arrival airport exit time, i.e. the time at which the travel object passes through the passage point located at the exit of the arrival airport. The user operates the input/output device 7 to select any one piece of processing from multiple processing contents shown on the selection menu.

According to the present invention, in the processing of prediction, the travel process prediction apparatus 1 reads out the result made by travelers who used of having used the same flight as one user plans to board and multiple pieces of the multiple pieces of situation information for the flight from the multivariate data. And based on the read-out data, it performs a regression analysis by using the read-out result as a response variable and by using each item in the situation information as an explanatory variable. In the regression analysis, the travel process prediction apparatus 1 calculates a predicted value including a prediction interval or a predicted value including a confidence interval as an estimate value. Moreover, according to the present invention, in the processing of comparative prediction, the travel process prediction apparatus 1 reads out the results made by travelers who used two flights from the multivariate data in order to perform a statistical test of whether or not there is a difference between the read-out results. In the statistical test processing, the travel process prediction apparatus 1 calculates a point estimate including a confidence interval as an estimate value. Furthermore, according to the present invention, in the processing of statistic calculation, the travel process prediction apparatus 1 reads out the result made by travelers who used the same flight as the one the user plans to board, from the multivariate data, to calculate a statistic of the result.

The input/output device 7 accepts the processing content selected by the user's operation (S504) and transmits the information indicating the selected processing content to the travel process prediction apparatus 1 (S505). The travel process prediction apparatus 1 receives information indicating the selected processing content at the communication unit 16, while the CPU 11 performs processing of selecting input items required to be input in order to execute the selected processing content (S506). The input items include flight specifying information for specifying a flight. The flight specifying information serves as a condition for extracting observation data to be analyzed from the multivariate data.

The input items used when prediction is performed include plural analysis items which are to be subjects of regression analysis as explanatory variables, among the items included in the situation information. As analysis items, multiple items are determined in advance, which are assumed to have greater correlation with values to be predicted among the items included in the situation information. The storage unit 14 stores therein set data at which input items have been determined for each of the processing contents which are to be executed by the travel process prediction apparatus 1.

FIGS. 12 and 13 are conceptual views illustrating examples of contents of set data. FIG. 12 shows an example of input items determined for the case where the processing content represents a prediction for an arrival airport exit time. The arrival airport exit passage time is determined as the prediction item corresponding to a value to be predicted, items corresponding to flight specifying information such as the name of an airline and a flight number are determined as extraction condition items, and items corresponding to a part of situation information such as a month in which a departure airport is used and an arrival time are determined as analysis items. Included in the analysis items are items corresponding to information indicating the status of a traveler such as age, information indicating past records such as a month in which the traveler used the departure airport, information indicating a condition under which the traveler used the flight such as a seat number, information indicating a state of the arrival airport such as whether or not the language used by the traveler is consistent with the language used at the arrival airport, and weather information. In addition to the above, change information, error information, and information related to an event including information indicating abnormality in transportation or a travel object may also be included in the analysis items.

FIG. 13 shows an example of input items determined for the case where the processing content corresponds to comparison between arrival airport exit time. As a comparison item corresponding to the values to be compared and predicted, the arrival airport exit passage time is determined. Moreover, for each of the comparison objects A and B, the extraction condition items corresponding to the flight specifying information and refinement condition items are determined. The refinement condition items are conditions for further narrowing down the data having been extracted by the extraction condition items from the multivariate data. Also for the processing content in the statistic calculation, the items to be calculated, extraction condition items and refinement condition items are determined as well. At step S506, the CPU 11 selects input items by reading out from the set data the input items determined in accordance with the selected processing content.

The CPU 11 then makes the communication unit 16 transmit menu data to the input/output device 7 in order for the input/output device 7 to show an input menu for accepting the contents of the input items (S507). The input/output device 7 receives the menu data, and shows the input menu on the display unit based on the menu data (S508).

FIGS. 14 and 15 are conceptual views illustrating examples of input menus. FIG. 14 is an example of an input menu in the case where the processing content is a prediction for the arrival airport exit time. A menu is shown for having a user input contents of a prediction item, extraction condition items and analysis items. The input menu also includes a section for accepting the input of a notification condition used when a notification of the processing result is issued, such as date and time of notification and an input/output device to which the notification is given. It is noted that the analysis items determined by the set data may not completely be the same as the analysis items included in the input menu. For example, while the analysis items determined at the set data include a month in which a traveler used the departure airport and a day of the week on which the traveler used the departure airport, the input item indicated on the input menu is shown as date, month and year the traveler used the departure airport to facilitate the user's convenience. The analysis items that are not the same at the set data and the input menu are transformed after input. For example, the date, month and year the traveler used the departure airport will be transformed into the month in which the traveler used the departure airport and the day of the week on which the traveler used the departure airport. Moreover, as exemplified in the item of age, the item of a square value obtained by squaring a value is not shown on the input menu. The item of a square value and an item for which a value to be squared is input are stored in association with each other at the set data, as in the relationship between the item of age and the item of the squared value of age. Similarly, in the case where an item of interaction for calculating the effect of interaction between items is determined at the set data, the item of interaction and the items that constitute the item of interaction are also associated with each other. Dummy variables constituted by multiple items which will be described later (explanatory variables) are also associated with each other. FIG. 15 is an example of an input menu in the case where the processing content is comparison between arrival airport exit time. A menu for inputting the contents of extraction condition items and refinement condition items for each of comparison subjects A and B and for inputting common comparison items is displayed. It is noted that, when comparison is made for different passage points, a comparison item is set for each of the comparison subjects A and B. If the processing content is statistic calculation, the item for designating a value to be calculated as well as similar extraction condition items and refinement condition items is shown on the input menu.

When the user inputs data on the input menu, it is essential to input the item for prediction, item for comparison, item for designating a subject of statistics, and item for extraction condition. As for the analysis items, it is essential to input data in more than one items and desirable to input contents in all the items, though it is possible to perform the prediction processing even if some items are left blank. As, however, the number of blank items is increased, the accuracy in prediction is more deteriorated. As for the refinement condition items, processing may be performed even if the items are left blank. If the notification condition is not input, the processing is performed immediately after the request is accepted, and the input/output device 7 used for input will be notified of the processing result.

The user operates the input/output device 7 to input thereto contents of the flight specifying information and situation information corresponding to the input items (S509). The user inputs for the contents corresponding to the extraction condition items the flight specifying information for specifying a flight the user plans to use, and inputs for the contents corresponding to the items for analysis or refinement conditions the situation information indicating the situation expected when the flight is used. The input/output device 7 transmits the input information to the travel process prediction apparatus 1 (S510), which receives the information transmitted from the input/output device 7 at the communication unit 16.

The CPU 11 then performs processing of selecting an extraction item to be extracted from the multivariate data in response to the received information (S511). When prediction is performed, extraction items include: a value to be a subject of prediction among the passage date and time, elapsed time and comparison data; and items corresponding to the analysis items for which the contents are input among the items included in the situation information. When comparative prediction is performed, the value to be a subject of comparative prediction is the extraction item. When the statistic calculation is performed, the value to be a subject of statistic calculation is the extraction item. The CPU 11 then extracts observation data including information corresponding to the extraction item from the multivariate data stored in the storage unit 14 (S512). It is noted that the extracted observation data is a duplicate and the multivariate data is held without change.

When prediction is performed, the CPU 11 extracts observation data comprised of a combination of a value of the specific passage date and time, elapsed time or comparison data which is to be the subject of prediction and which is associated with the flight specifying information having the same contents as the contents of the input extraction condition items and the items corresponding to the analysis items for which the contents are input among the situation information associated with the same flight specifying information. The observation data includes, for example, a combination of the passage date and time when a travel object passes through a passage point of an exit of an arrival airport and values of multiple items such as date/month/year when the travel object used the departure airport as well as arrival time included in the situation information, which are associated with the same flight specifying information. At step S512, the CPU 11 extracts several patterns of observation data having the contents associated with the same flight specifying information. The several patterns of observation data indicate, respectively, the past records of different travelers who used the same flight of the same departure date and time, or the past records of the flights operated on different dates with the same flight specifying information such as a place of departure. When comparative prediction is performed, the CPU 11 extracts observation data comprised of specific passage date and time, elapsed time or the value of comparison data which is to be the subject of comparative prediction and which is associated with the flight specifying information having the same contents as the ones input to the extraction condition items and with the situation information having the same contents as the ones input to the refinement condition items. Several patterns of observation data are extracted for each of the two flights to be compared. When the statistic calculation is performed, similarly, several patterns of observation data are extracted, each observation data being comprised of the values of the subject for statistic calculation associated with the flight specifying information having the same contents as the ones input to extraction condition items and with the situation information having the same contents as the ones input to refinement condition items. Note that, when the information indicating a year is included in the extraction condition items and the refinement condition items, and yet no observation data to be extracted is present, the CPU 11 excludes the information indicating the year from the extraction condition items, performs extraction again, and transmits to the input/output device 7 a message indicating that the extraction is performed without year. If there is no observation data to be extracted after the second extraction, the CPU 11 transmits a message to the input/output device 7, indicating that the travel process prediction is canceled because there is no observation data to be extracted.

The CPU 11 subsequently determines whether or not each of the extracted observation data has an abnormal value or a missing value (S513). The observation data with an abnormal value includes observation data associated with information indicating abnormality in transportation or abnormality in a travel object. Furthermore, the range in which the content for each item of the situation information falls may be determined in advance, and the CPU 11 may determine that the observation data includes an abnormal value when the content of the extracted item falls out of the range. The observation data with a missing value means observation data with a missing content in the extraction items. If any one of the observation data has an abnormal value or a missing value (S513: YES), the CPU 11 removes or masks the pattern of the observation data with the abnormal value or missing value from the extracted observation data (S514). The mask processing is to exclude observation data from the subject of calculation. In the mask processing, the CPU 11 associates the pattern of the observation data having an abnormal value or a missing value with information indicating that the observation data is not a subject of calculation. By removing or masking the observation data with an abnormal or missing value, such as the observation data associated with the information indicating the abnormality described above, the processing amount for travel process prediction is reduced while the accuracy in a predicted value to be obtained is enhanced.

After step S514 is completed, or if there is no observation data with an abnormal or missing value at step S513 (S513: NO), the CPU 11 determines whether or not there are several patterns of observation data (S515). If the number of observations is not more than one pattern (S515: NO), the CPU 11 makes the communication unit 16 transmit to the input/output device 7 the information indicating that there are no several patterns of observation data and that the travel process prediction is canceled (S516). The input/output device 7 receives the information, outputs through a display unit or speaker a message indicating that the processing of travel process predication cannot be executed (S517), and terminates the processing.

If there are several patterns of observation data at step S515 (S515: YES), the CPU 11 determines whether or not there are observations corresponding to a predetermined upper limit number or more (S518). The predetermined upper limit number may be, for example, a number such as six hundred thousand which is sufficient for the number of observations to be assumed as a size of population. If there are observations amounting to the predetermined upper limit number or more (S518: YES), the CPU 11 extracts the upper-limit number of patterns of observation data with later-obtained information from the observation data at the current time point (S519). The observation data not extracted at step S519 is discarded or masked. After step S519 is completed, or if the number of observations is less than the upper limit number at step S518 (S518: NO), the CPU 11 determines whether or not the extraction items included in the observation data need data transformation (S520). If an extraction item includes qualitative data, the qualitative data needs to be transformed into numeric values for calculation. Some quantitative data may also need to be transformed into data which can be used in calculation. For example, when an extracted item is date/month/year, while the analysis items required for calculation are month and day of the week, the date/month/year is transformed into month and day of the week, and the month and day of the week further need to be transformed into numeric values.

If data transformation is required at step S520 (S520: YES), the CPU 11 performs data transformation by a method corresponding to each of the information which needs data transformation (S521). A method of data transformation is predetermined for each item included at the multivariate data, and the predetermined method of data transformation is stored in the storage unit 14. It is noted that the method of data transformation may also be included in the computer program 15 in advance. The CPU 11 performs data transformation of each pieces of information included in observation data by a predetermined method such as dummy transformation or logit transformation. For example, the passage date and time is transformed into passage time. Moreover, qualitative data which is not a numeric value is transformed into a numeric value. For example, the word expressing weather such as "sunny," "rainy," or "other" is transformed by dummy transformation into two-digit dummy variables such as "00," "01" or "10," and is expressed with two analysis items (explanatory variables). Furthermore, a discrete value expressed by percentage such as the rate of vacant seats and precipitation probability is transformed by logit transformation into a measurable value of the same type as a traveler's height or weight. The logit transformation is expressed by $L(P)=\ln\{P/(1-P)\}$, $\{$target condition: $np^* \geq 5$, and $n(1-p^*) \geq 5\}$. Here, P is a discrete value expressed by percentage, n is a sample size, and $p^*$ is an estimate value of P. The value of L (P) is called logit and approximates to normal distribution. The target condition is the condition to allow the logit to be better approximated to the normal distribution. It is noted that when the percentage P is calculated by the formula called continuity correction expressed by $P=(x+0.5)/(n+1)$, the transformation accuracy is improved. Here, x corresponds to the number of, for example, failures, successes or appearances. After step S521 is completed, or when data transformation is not necessary at step S520 (S520: NO), the CPU 11 executes statistical calculation processing for performing prediction, comparative prediction or statistic calculation of specific passage time, elapsed time or comparison data, based on several patterns of observation data (S522).

Figure 16:
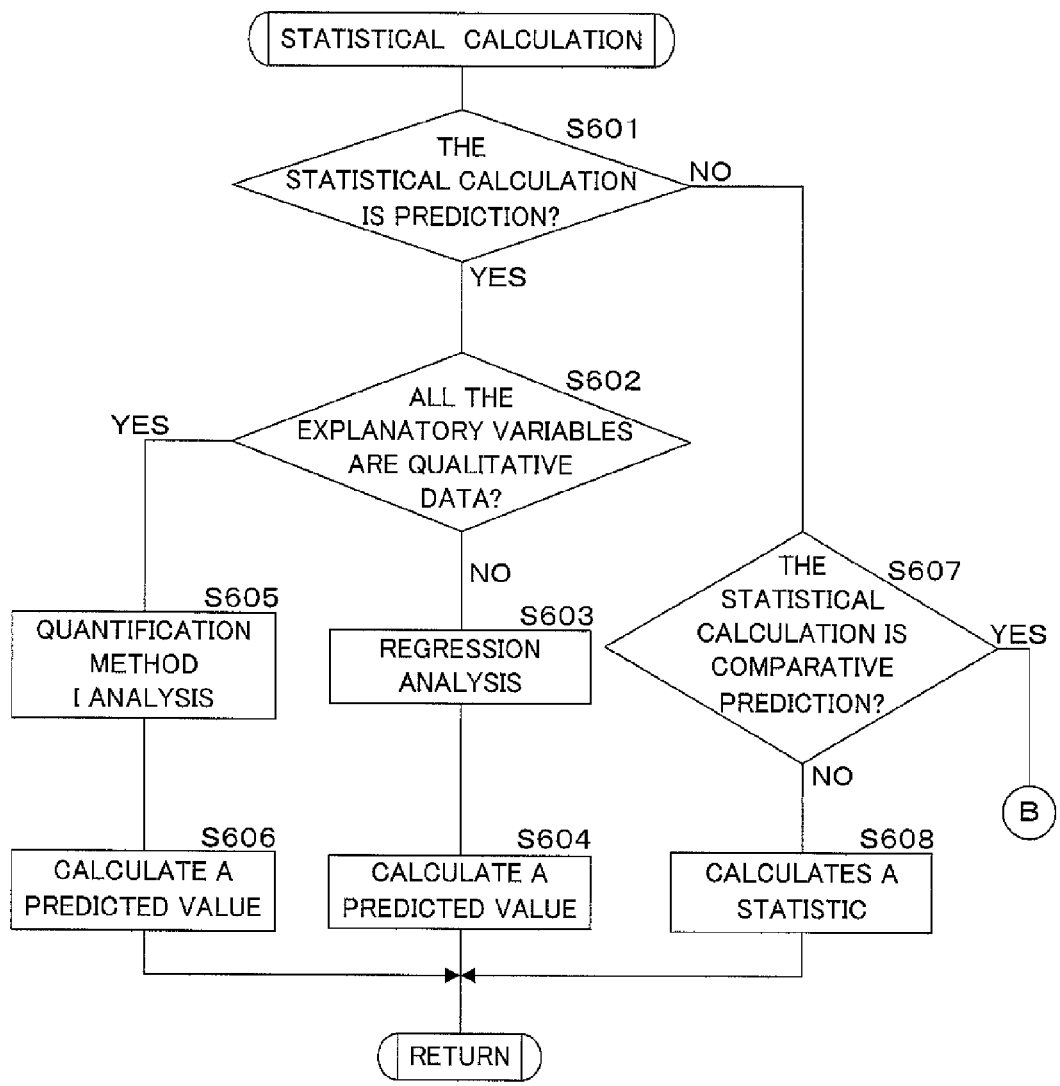
FIG. 16 is a flowchart illustrating a procedure of a subroutine in statistical calculation processing performed at step S522.
Figure 17:
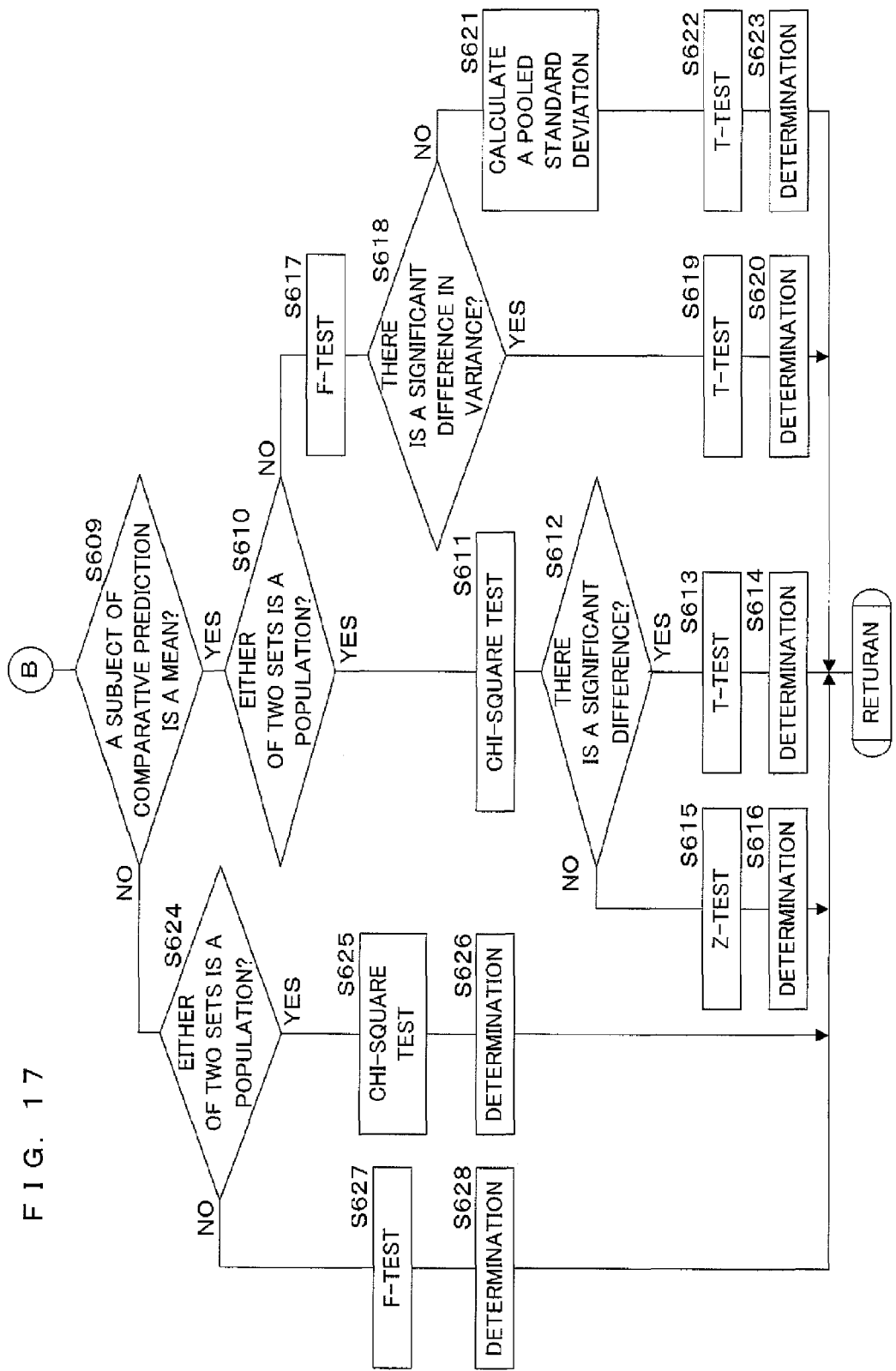
FIG. 17 is a flowchart illustrating a procedure of a subroutine in statistical calculation processing performed at step S522.

FIGS. 16 and 17 illustrate a flowchart showing a procedure of subroutine in the statistical calculation processing performed at step S522. The CPU 11 first determines whether or not the statistical calculation processing to be performed is a prediction for passage time, elapsed time or comparison data (S601). If the statistical calculation processing to be performed is the prediction for passage time, elapsed time or comparison data (S601: YES), the CPU 11 determines whether or not the information that is included in observation data and corresponds to the explanatory variables in a regression analysis is all qualitative data (S602). Among the information included in the observation data, each item of the situation information as well as the information obtained by data transformation from each item is the information corresponding to the explanatory variables. In practice, information other than the subject of prediction, that is, the passage time, elapsed time or comparison data, can correspond to the explanatory variable(s). Since the items used in the regression analysis are, meanwhile, the items of the set data corresponding to the extraction items, those items among the information corresponding to the above explanatory variables will be the information that is included in the observation data and corresponds to the explanatory variables in the regression analysis. If quantitative data is included in the information in the observation data corresponding to the explanatory variables (S602: NO), the CPU 11 executes the regression analysis (S603).

It is assumed that a response variable in the regression analysis is Y, that the number of explanatory variables is p, and that the respective explanatory variables are $X_1$ to $X_p$. In this case, the regression equation is represented by Expression (1) below.

$$Y = a_0 + a_1 X_1 + a_2 X_2 + \ldots + a_p X_p + \epsilon \tag{1}$$

The value $a_0$ included in Expression (1) represents a constant term, $a_1$ to $a_p$ represent partial regression coefficients, and $\epsilon$ represents an error. If p is 2 or larger, Expression (1) is a multiple regression equation. At step S603, the CPU 11 performs the processing of the calculation of a least squares method for obtaining $a_0$, and $a_1$ to $a_p$ which minimize the error $\epsilon$ by using the equations which have the same number as that of the observations and each of which is obtained from each of the observations by substituting the subject of prediction, i.e. the passage time, elapsed time or comparison data, for Y and substituting the information respectively corresponding for the explanatory variables to $X_1$ to $X_p$ in Expression (1). More specifically, assuming that the estimate values of $a_0$ to $a_p$ are $\hat{a}_0$ to $\hat{a}_p$, respectively, a predicted value $\hat{Y}_i$ of the response variable Y for arbitrary values of the explanatory variables $X_1$ to $X_p$ may be calculated by Expression (2) below. It is noted that a sign "^" used in the description of mathematical expressions in the present invention is not for indicating an exponent but a "hat" which is meant to be located directly above the letter of its immediate left.

$$\hat{Y}_i = \hat{a}_0 + \hat{a}_1 X_{i1} + \ldots + \hat{a}_j X_{ij} + \ldots + \hat{a}_p X_{ip} \tag{2}$$

Here, the subscript "i" means that it is the i-th observation pattern number, while the subscript "j" means that it is the j-th explanatory variable number. By substituting $X_1$ to $X_p$ that are information respectively corresponding for the explanatory variables into Expression (2), the predicted value $\hat{Y}_i$ for the same number of response variables as the number of observations can be obtained. Here, assuming that the number of observations is n, n predicted values $\hat{Y}_i$ can be obtained. It is considered that the difference between the obtained predicted value $\hat{Y}_i$ for the response variable and the actually measured value $Y_i$ for the response variable is preferably smaller as a whole. A residual error $e_i$ between $Y_i$ and $\hat{Y}_i$ represented by Expression (3) below is desired to be small.

$$e_i = Y_i - \hat{Y}_i \tag{3}$$

Accordingly, $\hat{a}_0$ to $\hat{a}_p$ are determined so as to minimize the residual sum of squares $S_e$ which is the sum of squared residual errors $e_i$. This method is called a least squares method, while the obtained estimate values $\hat{a}_0$ to $\hat{a}_p$ are called least squares estimations. The residual sum of squares $S_e$ is represented by Expression (4) below.

$$S_e = \sum_{i=1}^{n} e_i^2 \tag{4}$$
$$= \sum_{i=1}^{n} (Y_i - \hat{a}_0 - \hat{a}_1 X_{i1} - \ldots - \hat{a}_j X_{ij} - \ldots - \hat{a}_p X_{ip})^2$$

Each of the values $\hat{a}_0$ to $\hat{a}_p$ for minimizing the residual sum of squares $S_e$ may be obtained as solutions of simultaneous equations represented by Expression (5) below obtained by partially differentiating the equations of Expression (4) with respect to $\hat{a}_0$ to $\hat{a}_p$ and setting the resulting equations equal to zero.

$$\left.\begin{aligned}\frac{\partial S_e}{\partial \hat{a_0}} &= 2\sum_{i=1}^{n}(Y_i - \hat{a_0} - \hat{a_1}X_{i1} - \hat{a_2}X_{i2} - \ldots - \hat{a_p}X_{ip})(-1) = 0 \\ \frac{\partial S_e}{\partial \hat{a_1}} &= 2\sum_{i=1}^{n}(Y_i - \hat{a_0} - \hat{a_1}X_{i1} - \hat{a_2}X_{i2} - \ldots - \hat{a_p}X_{ip})(-X_{i1}) = 0 \\ \frac{\partial S_e}{\partial \hat{a_2}} &= 2\sum_{i=1}^{n}(Y_i - \hat{a_0} - \hat{a_1}X_{i1} - \hat{a_2}X_{i2} - \ldots - \hat{a_p}X_{ip})(-X_{i2}) = 0 \\ &\vdots \\ \frac{\partial S_e}{\partial \hat{a_p}} &= 2\sum_{i=1}^{n}(Y_i - \hat{a_0} - \hat{a_1}X_{i1} - \hat{a_2}X_{i2} - \ldots - \hat{a_p}X_{ip})(-X_{ip}) = 0\end{aligned}\right\} \quad (5)$$

Expression (5) may be simplified into Expression (6) below. The equations of Expression (6) are simultaneous linear equations in (p+1) unknowns with respect to $\hat{a}_0$ to $\hat{a}_p$, and are called normal equations.

$$\left.\begin{aligned}\hat{a_0}\sum_{i=1}^{n}1 + \hat{a_1}\sum_{i=1}^{n}X_{i1} + \hat{a_2}\sum_{i=1}^{n}X_{i2} + \ldots + \hat{a_p}\sum_{i=1}^{n}X_{ip} &= \sum_{i=1}^{n}Y_i \\ \hat{a_0}\sum_{i=1}^{n}X_{i1} + \hat{a_1}\sum_{i=1}^{n}X_{i1}^2 + \hat{a_2}\sum_{i=1}^{n}X_{i1}X_{i2} + \ldots + \hat{a_p}\sum_{i=1}^{n}X_{i1}X_{ip} &= \sum_{i=1}^{n}X_{i1}Y_i \\ \hat{a_0}\sum_{i=1}^{n}X_{i2} + \hat{a_1}\sum_{i=1}^{n}X_{i2}X_{i1} + \hat{a_2}\sum_{i=1}^{n}X_{i2}^2 + \ldots + \hat{a_p}\sum_{i=1}^{n}X_{i2}X_{ip} &= \sum_{i=1}^{n}X_{i2}Y_i \\ &\vdots \\ \hat{a_0}\sum_{i=1}^{n}X_{ip} + \hat{a_1}\sum_{i=1}^{n}X_{ip}X_{i1} + \hat{a_2}\sum_{i=1}^{n}X_{ip}X_{i2} + \ldots + \hat{a_p}\sum_{i=1}^{n}X_{ip}^2 &= \sum_{i=1}^{n}X_{ip}Y_i\end{aligned}\right\} \quad (6)$$

If the first equation in Expression (6) is divided by $\Sigma 1 = n$, Expression (7) below is obtained.

$$\hat{a}_0 = Ym - \hat{a}_1 Xm_1 - \hat{a}_2 Xm_2 - \ldots - \hat{a}_p Xm_p \quad (7)$$

Here, $Xm_1$ to $Xm_p$ and $Ym$ indicate average values of the respective explanatory variables and response variables, and may be represented by Expression (8) below.

$$\left.\begin{aligned}Xm_1 &= \frac{1}{n}\sum_{i=1}^{n}X_{i1} \\ &\vdots \\ Xm_p &= \frac{1}{n}\sum_{i=1}^{n}X_{ip} \\ Ym &= \frac{1}{n}\sum_{i=1}^{n}Y_i\end{aligned}\right\} \quad (8)$$

If $\hat{a}_0$ in Expression (7) is substituted for the second and subsequent equations in Expression (6) and the equations are simplified, Expression (9) below may be obtained.

$$\left.\begin{aligned}\hat{a_1}S_{11} + \hat{a_2}S_{12} + \ldots + \hat{a_p}S_{1p} &= S_{1Y} \\ \hat{a_1}S_{21} + \hat{a_2}S_{22} + \ldots + \hat{a_p}S_{2p} &= S_{2Y} \\ &\vdots \\ \hat{a_1}S_{p1} + \hat{a_2}S_{p2} + \ldots + \hat{a_p}S_{pp} &= S_{pY}\end{aligned}\right\} \quad (9)$$

Here, $\{S_{jk}\}$ represents a sum of squares/products of deviation among explanatory variables $\{X_{ij}\}$, and $\{S_{jY}\}$ represents a sum of products of deviation between $\{X_{ij}\}$ and $\{Y_i\}$. Furthermore, $S_{jk}$ and $S_{jY}$ are defined by Expression (10) below.

$$\left.\begin{aligned}S_{jk} &= \sum_{i=1}^{n}(X_{ij} - Xm_j)(X_{ik} - Xm_k), (j, k = 1, \ldots, p) \\ S_{jY} &= \sum_{i=1}^{n}(X_{ij} - Xm_j)(Y_i - Ym), (j = 1, \ldots, p)\end{aligned}\right\} \quad (10)$$

In other words, $\hat{a}_1$ to $\hat{a}_p$ are obtained as solutions of simultaneous linear equations in p unknowns involving $\{S_{jk}\}$ as a coefficient and $\{S_{jY}\}$ as a constant term. When a sum of squares/products matrix is represented by Expression (11) below and an inverse matrix thereof is represented by Expression (12) below, Expression (9) can be expressed as Expression (13) below. When Expression (13) is deformed, Expression (14) below is obtained.

$$S = \begin{bmatrix} S_{11} & S_{12} & \ldots & S_{1p} \\ S_{21} & S_{22} & \ldots & S_{2p} \\ \vdots & \vdots & \vdots & \vdots \\ S_{p1} & S_{p2} & \ldots & S_{pp} \end{bmatrix} \quad (11)$$

$$S^{-1} = \begin{bmatrix} S^{11} & S^{12} & \ldots & S^{1p} \\ S^{21} & S^{22} & \ldots & S^{2p} \\ \vdots & \vdots & \vdots & \vdots \\ S^{p1} & S^{p2} & \ldots & S^{pp} \end{bmatrix} \quad (12)$$

$$\begin{bmatrix} S_{11} & S_{12} & \ldots & S_{1p} \\ S_{21} & S_{22} & \ldots & S_{2p} \\ \vdots & \vdots & \vdots & \vdots \\ S_{p1} & S_{p2} & \ldots & S_{pp} \end{bmatrix} \begin{bmatrix} \hat{a_1} \\ \hat{a_2} \\ \vdots \\ \hat{a_p} \end{bmatrix} = \begin{bmatrix} S_{1Y} \\ S_{2Y} \\ \vdots \\ S_{pY} \end{bmatrix} \quad (13)$$

$$\begin{bmatrix} \hat{a_1} \\ \hat{a_2} \\ \vdots \\ \hat{a_p} \end{bmatrix} = \begin{bmatrix} S_{11} & S_{12} & \ldots & S_{1p} \\ S_{21} & S_{22} & \ldots & S_{2p} \\ \vdots & \vdots & \vdots & \vdots \\ S_{p1} & S_{p2} & \ldots & S_{pp} \end{bmatrix}^{-1} \begin{bmatrix} S_{1Y} \\ S_{2Y} \\ \vdots \\ S_{pY} \end{bmatrix} \quad (14)$$

$$= \begin{bmatrix} S^{11} & S^{12} & \ldots & S^{1p} \\ S^{21} & S^{22} & \ldots & S^{2p} \\ \vdots & \vdots & \vdots & \vdots \\ S^{p1} & S^{p2} & \ldots & S^{pp} \end{bmatrix} \begin{bmatrix} S_{1Y} \\ S_{2Y} \\ \vdots \\ S_{pY} \end{bmatrix}$$

If Expression (14) is solved with respect to $\hat{a}_1$ to $\hat{a}_p$, $\hat{a}_j = S^{j1}S_{1Y} + S^{j2}S_{2Y} + \ldots + S^{jp}S_{pY}$ (wherein j=1, . . . , p) is obtained, and thus the values of $\hat{a}_1$ to $\hat{a}_p$ can be calculated. If the calculated values of $\hat{a}_1$ to $\hat{a}_p$ are substituted for Expression (7), the value of $\hat{a}_0$ can be calculated. When the values of $\hat{a}_0$ to $\hat{a}_p$ are assigned to $a_0$ to $a_p$ of Expression (1), the regression equation is obtained. At this point, if the number n of observations used in the analysis is smaller than (p+2), the CPU 11 cancels the processing of step S603 and causes the communication unit 16 to send to the input/output device 7 information indicating the cancellation of the analysis due to lack of observation data. The input/output device 7 receives the information and outputs by using the display unit or the speaker a message indicating that the processing of the travel process prediction cannot be executed.

Next, the CPU 11 selects explanatory variables. This selection can be made by some methods, of which a backward stepwise method belonging to a sequential selection method using an F value will be described in the present embodiment. The CPU 11 selects one of the explanatory variables which is involved in the obtained regression equation and which minimizes the residual sum of squares when it is removed from the regression equation. Next, the CPU 11 calculates a variance ratio (an F value) of the increase of the residual sum of squares increased by the selected explanatory variable, and if the calculated F value is not more than a pre-set reference value $F_{OUT}$, the CPU 11 removes this explanatory variable from the regression equation. If the F value exceeds the reference value $F_{OUT}$, the CPU 11 does not remove this explanatory variable. Next, the CPU 11 selects one of the explanatory variables which is not involved in the regression equation and which minimizes the residual sum of squares when it is taken into the regression equation. Then, the CPU 11 calculates an F value of the decrease of the residual sum of squares caused by the selected explanatory variable, and if the calculated F value exceeds a pre-set reference value $F_{IN}$, the CPU 11 incorporates this explanatory variable into the regression equation. If the F value is not more than the reference value $F_{IN}$, the CPU 11 does not incorporate this explanatory variable. The CPU 11 repeatedly performs these procedures until all the explanatory variables involved in the regression equation have F values larger than the reference value $F_{OUT}$ and all the explanatory variables not involved in the regression equation have F values not larger than the reference value $F_{IN}$. As for the reference values for the F value, for example, $F_{OUT}=F_{IN}=2.0$ may be used. It is noted that a backward elimination method is a method not performing the procedure of incorporating an explanatory variable in the backward stepwise method. A forward stepwise method is a method starting in a state where no explanatory variable is involved in a regression equation and performing similar procedures to those of the backward stepwise method. Furthermore, a forward selection method is a method not performing the procedures of removing an explanatory variable in the backward stepwise method. The CPU 11 may employ, instead of the backward stepwise method, the backward elimination method, the forward stepwise method or the forward selection method for selecting explanatory variables.

The dummy variables composed of multiple explanatory variables are removed from the regression equation if all the explanatory variables have F values not more than the reference value $F_{OUT}$, and are incorporated when even one of the explanatory variables exceeds the reference value $F_{IN}$. An explanatory variable working as a base of a squared variable which is corresponding to an item of square value is not removed even when it has an F value not more than the reference value $F_{OUT}$ as long as the squared variable has an F value exceeding the reference value $F_{IN}$. Similarly, explanatory variables which correspond to an item of interaction and which work as a base of a variable of the interaction are not removed even when it has an F value not more than the reference value $F_{OUT}$ as long as the interaction variable has an F value exceeding the reference value $F_{IN}$. Furthermore, an explanatory variable working as a base of a squared variable or an interaction variable is incorporated into the regression equation simultaneously with the squared variable or interaction variable even when it has an F value not more than the reference value $F_{IN}$ as long as the squared variable or the interaction variable has an F value exceeding the reference value $F_{IN}$. Moreover, when the squared variable or interaction variable is removed, the explanatory variable working as a base of the squared variable or the interaction variable is not simultaneously eliminated. It is noted that the significance of an explanatory variable $X_j$ among the p explanatory variables ($X_1$ to $X_p$) in the regression equation is represented by $F=\{(\hat{a}_j)^2/S^{jj}\}/V_e$, wherein $\hat{a}_j$ is a j-th estimate value, $S^{jj}$ is an element (j, j) of the inverse matrix of the sum of squares/products matrix, and $V_e$ is a residual variance. Furthermore, if there already are p explanatory variables in the regression equation, the significance of addition of a new variable $X_r$ is represented by $F=\{(\hat{a}_r^*)^2/S^{rr*}\}/V_e^*$, wherein $\hat{a}_r^*$, $S^{rr*}$ and $V_e^*$ correspond respectively to an estimate value of $a_r$, an element (r, r) of the inverse matrix of the sum of squares/products matrix and a residual variance, which are obtained when (p+1) explanatory variables including the variable $X_r$ are incorporated into the regression equation.

Next, the CPU 11 may perform regression diagnosis by using a statistic such as the leverage. Assuming that the leverage is $h_{ii}$, that a variable $X_j$ of the i-th observation has a value of $X_{ij}$, that a variable $X_k$ of the i-th observation has a value of $X_{ik}$, that the variable $X_j$ has a mean value of $X_{mj}$, that the variable $X_k$ has a mean value of $X_{mk}$, and that an element (j, k) of the inverse matrix of the sum squares/products matrix is $S^{jk}$, the leverage $h_{ii}$ is represented by Expression (15) below.

$$h_{ii} = \frac{1}{n} + \sum_{j=1}^{p}\sum_{k=1}^{p}(X_{ij}-Xm_j)(X_{ik}-Xm_k)S^{jk} \quad (15)$$

The CPU 11 calculates the leverage with respect to each observation, and removes or masks the observation pattern with the calculated leverage not smaller than a prescribed reference value. The reference value is assumed as a double of a mean of the leverages in the present case. The mean of the leverages is obtained in accordance with (p+1)/n. If there is no observation pattern to be removed or masked and no other regression diagnosis is to be conducted, the CPU 11 determines the regression equation. If any observation is removed or masked, the CPU 11 performs the regression analysis again. Next, the CPU calculates statistics, such as a coefficient of multiple correlation, coefficient of determination, significant difference test result, adjusted coefficient of determination and Durbin-Watson statistic for the determined regression equation. The coefficient of multiple correlation is represented by $R=\sqrt{(1-S_e/S_T)}$, the coefficient of determination is represented by $R^2=1-S_e/S_T$, and the adjusted coefficient of determination is represented by $R^{*2}=1-\{S_e/(n-p-1)\}/\{S_T/(n-1)\}$. Moreover, the Durbin-Watson statistic d is represented by Expression (16) below.

$$d = \frac{1}{S_e}\sum_{i=1}^{n-1}(e_{i+1}-e_i)^2 \quad (16)$$

Here, $S_e$ is a residual sum of squares, $S_T$ is a total sum of squares of response variables, and $e_i$ is an i-th residual. It is noted that a part of the regression analysis, such as the selection of explanatory variables or the regression diagnosis, can be manually performed. For example, the travel process prediction apparatus 1 includes an input means (not shown), so that a regression equation can be determined and predicted values can be calculated with the input means operated by an operator having knowledge of statistics and transportation.

Next, the CPU 11 calculates a value of the response variable Y by substituting contents of analysis items input by the input/output device 7 for the explanatory variables of the obtained regression equation so as to obtain a predicted value of the specific passage time, elapsed time or comparison data (S604). If an item to be substituted is required to be transformed, the CPU 11 performs the transformation by using a transformation equation set in the computer program 15 before substituting the item. Furthermore, the CPU 11 calculates a prediction interval. A prediction interval is represented as a predicted value $\pm t(n-p-1, \alpha) \times \sqrt{[\{1+1/n+D_0^2/(n-1)\}V_e]}$, wherein n is the number of observations, $\alpha$ is a significance level, $D_0^2$ is a Mahalanobis' generalized distance and $V_e$ is an estimate value of an error variance. Furthermore, the distance $D_0^2$ is represented by Expression (17) below.

$$D_0^2 = (n-1) \sum_{j=1}^{p} \sum_{k=1}^{p} (X_{0j} - Xm_j)(X_{0k} - Xm_k) S^{jk} \quad (17)$$

Here, $X_{0j}$ and $X_{0k}$ are values to be respectively substituted for variables $X_j$ and $X_k$ for calculating the value of Y, and $S^{jk}$ is an element (j, k) of the inverse matrix of the sum of squares/products matrix. Furthermore, t(n−p−1, $\alpha$) is a critical value t($\phi$, $\alpha$) corresponding to a degree of freedom $\phi$=n−p−1 and a prescribed significance level $\alpha$ in a t-distribution table stored in the storage unit 14 in advance. Next, the CPU 11 terminates the statistical calculation processing of step S522, and returns to the main processing. If a confidence interval is used instead of the prediction interval, a predicted value $\pm t(n-p-1, \alpha) \times \sqrt{[\{1/n+D_0^2/(n-1)\}V_e]}$ is used. Furthermore, both of the intervals may be output with an attached message describing a difference between the confidence interval and the prediction interval.

If the information which is included in the observation data and which corresponds to the explanatory variables is all qualitative data (S602: YES), the CPU 11 executes a quantification method I analysis (S605). In the quantification method I, it is assumed that a response variable is Y, that the number of explanatory variables (items) is p and that the explanatory variables are $X_1$ to $X_p$. Since the explanatory variables are qualitative data, the number of states (categories) in which the respective explanatory variables can be placed is determined in advance. If, for example, "weather" included in the situation information is classified into "sunny," "rainy" and "others," an explanatory variable corresponding to the "weather" can be placed in three kinds of states. It is assumed that the number of kinds of values that can be taken by the explanatory variable $X_i$ is j(i). In the quantification method I, the state of the explanatory variable $X_i$ is expressed as a combination of $X_{i1}, X_{i2}, \ldots, X_{ij(i)}$, one of which is 1 and the others of which are 0. For example, with respect to the explanatory variable $X_i$ that can take a value of 1, 2 or 3, a state corresponding to a value of 1 is expressed as $X_{i1}=1$, $X_{i2}=0$ and $X_{i3}=0$, a state corresponding to a value of 2 is expressed as $X_{i1}=0$, $X_{i2}=1$ and $X_{i3}=0$, and a state corresponding to a value of 3 is expressed as $X_{i1}=0$, $X_{i2}=0$ and $X_{i3}=1$. A regression equation of such quantification method I is represented by Expression (18) below.

$$y = a_0 + a_{11}X_{11} + a_{12}X_{12} + \ldots + a_{1j(1)}X_{1j(1)} + a_{21}X_{21} + \quad (18)$$
$$\ldots + a_{2j(2)}X_{2j(2)} + \ldots + a_{p1}X_{p1} + \ldots + a_{pj(p)}X_{pj(p)} + \varepsilon$$

In Expression (18), $a_0$ is a constant term, $a_{11}$ to $a_{pj(p)}$ are category scores and $\varepsilon$ is an error. In each of the aforementioned three states, however, $X_{i1}+X_{i2}+X_{i3}=1$, and hence multicollinearity always occurs. Therefore, any one of $X_{i1}$, $X_{i2}$ and $X_{i3}$ is deleted. Thus, Expression (18) takes the same form as a regression equation in which all the explanatory variables are dummy variables. Accordingly, at step S605, with respect to each of the observations, the CPU 11 causes the subject of prediction, i.e. the passage time, elapsed time or comparison data, to correspond to Y in Expression (1) and causes the qualitative explanatory variables transformed into dummy variables to correspond to explanatory variables $X_1$ to $X_p$ in Expression (1). Thereafter, the calculation is conducted in the same manner as in the regression analysis.

Next, the CPU 11 calculates a predicted value, a prediction interval or confidence interval and various statistics also in a manner similar to the regression analysis (S606). The CPU 11 then terminates the statistical calculation processing of step S522 and returns to the main processing.

If it is determined at step S601 that the statistical calculation processing to be performed is not prediction (S601: NO), the CPU 11 determines whether or not the statistical calculation processing to be performed is comparative prediction (S607). If the statistical calculation processing to be performed is not comparative prediction (S607: NO), the statistical calculation processing to be performed is statistic calculation, and hence the CPU 11 calculates a requested statistic (S608). At step S608, the CPU 11 calculates, on the basis of observation patterns, a requested statistic, such as a mean, a standard deviation, a median or the like of specific passage time, elapsed time or comparison data that is to be the subject of statistical calculation. Next, the CPU 11 terminates the statistic calculation processing of step S522 and returns to the main processing.

If it is determined at step S607 that the statistical calculation to be performed is comparative prediction (S607: YES), the CPU 11 determines whether or not a subject of comparative prediction is a mean (S609). If the subject of the comparative prediction is a mean (S609: YES), the CPU 11 determines whether or not a population is either of two sets which are composed of items corresponding to the subject of the comparative prediction, among multiple patterns of observation data extracted with respect to each of two flights to be compared (S610). In the present invention, one of the sets for the observations obtained with respect to the two flights is used as a population and the other as a sample so as to conduct comparison by testing whether or not there is a difference between the population and the sample. At step S610, the CPU 11 compares, with a threshold value, the numbers of observations included in the observation data sets obtained with respect to the respective two flights, and if either of the numbers of observations is not smaller than the threshold value, the CPU 11 determines that observation data set as a population. The threshold value is defined in advance as a large numerical value to some extent, such as 200,000. Furthermore, at step S610, the CPU 11 determines the observation data set whose number is not smaller than the threshold value as the population and the observation data set whose number is smaller than the threshold value as the sample. If both numbers of observations are not smaller than the threshold value, the CPU 11 determines one having a larger number as the population and one having a smaller number as the sample. If both numbers of observations are not smaller than the threshold value and the same as each other, the CPU 11 determines one of the observation data sets as the population and the other as the sample. If both numbers of observations are smaller than the threshold value, the CPU 11 determines that there is no population, and determines one of the observation data sets as the first sample and the other as the second sample.

If it is determined at step S610 that one of the observation data sets is a population (S610: YES), the CPU 11 conducts a chi-square test for determining whether or not the variances of the sample and population data are different (S611). At step S611, the CPU 11 calculates a sum of squared deviations S of the sample and a variance $\sigma_0^2$ of the population so as to calculate $\chi^2 = S/\sigma_0^2$. Furthermore, the CPU 11 compares the calculated value of $\chi^2$ with a critical value corresponding to a degree of freedom $\phi = n-1$ and a prescribed significance level $\alpha$ in a chi-square distribution table stored in the storage unit 14 in advance. Here, n is the number of observations of the sample. If the significance level $\alpha$ is, for example, 5%, a lower critical value is expressed as $\chi_1^2(\phi, 0.975)$ and an upper critical value is expressed as $\chi_2^2(\phi, 0.025)$. If the calculated value $\chi^2$ is smaller than the upper critical value and larger than the lower critical value, the CPU 11 determines that it cannot be said that there is a significant difference between the variances of the sample and population. And if the calculated value of $\chi^2$ is not smaller than the upper critical value or not larger than the lower critical value, the CPU 11 determines that there is a significant difference between the variances of the sample and population.

Next, the CPU 11 determines, in accordance with a result of the chi-square test conducted at step S611, whether or not there is a significant difference between the variances of the sample and population (S612). If there is a significant difference between the variances of the sample and population (S612: YES), the CPU 11 conducts a t-test for determining whether or not a sample mean is different from a mean of the population (S613). At step S613, the CPU 11 calculates a mean $y_m$ of the sample, a mean $\mu$ of the population and a standard deviation s of the sample so as to calculate $t=(y_m-\mu)/(s/\sqrt{n})$, wherein n is the number of observations of the sample. Furthermore, the CPU 11 compares the calculated value of t with a critical value $t(\phi, \alpha)$ corresponding to a degree of freedom $\phi = n-1$ and a prescribed significance level $\alpha$ in a t-distribution table precedently stored in the storage unit 14. If the absolute value of the calculated value of t is not smaller than the critical value, the CPU 11 determines that there is a significant difference between the means of the sample and population, and if the absolute value of the calculated value of t is smaller than the critical value, the CPU 11 determines that it cannot be said that there is a significant difference between the means of the sample and population. The CPU 11 determines $\mu$ as a point estimate and calculates $\mu \pm Z(\alpha)\sigma_0/\sqrt{n_0}$ as a confidence interval so as to obtain a point estimate and confidence interval of the population. Here, $Z(\alpha)$ is a critical value corresponding to a prescribed significance level $\alpha$ in a normal distribution table precedently stored in the storage unit 14. Furthermore, $\sigma_0$ is a standard deviation of the population, and $n_0$ is the number of observations of the population. Moreover, the CPU 11 performs processing for determining $y_m$ as a point estimate of the sample and $y_m \pm t(\phi, \alpha) s/\sqrt{n}$ as a confidence interval of the sample.

The CPU 11 determines, in accordance with a result of the t-test conducted at step S613, whether or not there is a difference in the specific passage time, elapsed time or comparison data between the two flights to be used (S614). If it is determined at step S613, as a result of the test, that there is a significant difference between the means of the sample and population, the CPU 11 determines that there is a difference in the specific passage time, elapsed time or comparison data between the two flights to be used. If it is determined at step S613, as a result of the test, that it cannot be said that there is a significant difference between the means of the sample and population, the CPU 11 determines that there is no difference in the specific passage time, elapsed time or comparison data between the two flights to be used. Next, the CPU 11 terminates the statistical calculation processing of step S522 and returns to the main processing.

If it is determined at step S612 that it cannot be said that there is a significant difference between the variances of the sample and population (S612: NO), the CPU 11 conducts a Z-test for determining whether or not a sample mean and population mean are different (S615). At step S615, the CPU 11 calculates a mean $y_m$ of the sample, a mean $\mu$ of the population and a standard deviation $\sigma_0$ of the population so as to calculate $Z=(y_m-\mu)/(\sigma_0/\sqrt{n})$, wherein n is the number of observation data included in the sample. Furthermore, the CPU 11 compares the calculated value of Z with a critical value $Z(\alpha)$ corresponding to a prescribed significance level $\alpha$ in the normal distribution table precedently stored in the storage unit 14. If the absolute value of the calculated value of Z is not smaller than the critical value, the CPU 11 determines that there is a significant difference between the means of the sample and population, and if the absolute value of the calculated value of Z is smaller than the critical value, the CPU 11 determines that it cannot be said that there is a significant difference between the means of the sample and population. The CPU 11 determines $\mu$ as a point estimate and calculates $\mu \pm Z(\alpha)\sigma_0/\sqrt{n_0}$ as a confidence interval so as to obtain a point estimate and confidence interval of the population. Here, $n_0$ is the number of observations of the population. Furthermore, the CPU 11 performs processing for determining $y_m$ as a point estimate of the sample and $y_m \pm Z(\alpha)\sigma_0/\sqrt{n}$ as a confidence interval of the sample. If it cannot be said that there is a significant difference, a pooled point estimate and a pooled confidence interval may be obtained. At this point, the CPU 11 calculates a new mean value $\mu_1$ and a new standard deviation $\sigma_1$ with respect to all the observations of both sample and population. Moreover, the CPU 11 determines $\mu_1$ as a pooled point estimate shared between the sample and population and calculates $\mu_1 \pm Z(\alpha)\sigma_1/\sqrt{(n_0+n)}$ as a confidence interval so as to obtain a pooled confidence interval.

Next, the CPU 11 determines, in accordance with a result of the Z-test conducted at step S615, whether or not there is a difference in the specific passage time, elapsed time or comparison data between the two flights to be used (S616). If it is determined at step S615, as a result of the test, that there is a significant difference between the means of the sample and population, the CPU 11 determines that there is a difference in the specific passage time, elapsed time or comparison data between the two flights to be used. If it is determined at step S615, as a result of the test, that it cannot be said that there is a significant difference between the means of the sample and population, the CPU 11 determines that there is no difference in the specific passage time, elapsed time or comparison data between the two flights to be used. Next, the CPU 11 terminates the statistical calculation processing of step S522, and returns to the main processing.

If it is determined at step S610 that none of the observation data sets is a population (S610: NO), the CPU 11 conducts an F-test for determining whether or not a variance of the first sample and a variance of the second sample are different from each other (S617). At step S617, the CPU 11 calculates the variance $V_1$ of the first sample and the variance $V_2$ of the second sample, so as to calculate $F=V_1/V_2$. Furthermore, the CPU 11 compares the calculated value of F with critical values corresponding to a prescribed significance level $\alpha$, a degree of freedom of the first sample $\phi_1=n_1-1$ and a degree of freedom of the second sample $\phi_2=n_2-1$ in an F distribution table precedently stored in the storage unit 14. Here, $n_1$ is the number of observations of the first sample, and $n_2$ is the number of observations of the second sample. For example, if the significance level corresponds to $\alpha=5\%$, a lower critical value is expressed as $F_1(\phi_1, \phi_2; 0.975)$ and an upper critical value is expressed as $F_2(\phi_1, \phi_2; 0.025)$. It is noted that $F_1(\phi_1, \phi_2; 0.975)=1/F(\phi_2, \phi_1, 0.025)$. If the calculated value of F is smaller than the upper critical value and larger than the lower critical value, the CPU 11 determines that it cannot be said that there is a significant difference between the variances of the first and second samples, and if the calculated value of F is not smaller than the upper critical value or not larger than the lower critical value, the CPU 11 determines that there is a significant difference between the variances of the first and second samples.

Next, the CPU 11 determines, in accordance with a result of the F-test conducted at step S617, whether or not there is a significant difference between the variances of the first and second samples (S618). If there is a significant difference between the variances of the first and second samples (S618: YES), the CPU 11 conducts a t-test for determining whether or not a mean of the first sample and a mean of the second sample are different (S619). At step S619, the CPU 11 calculates a mean value $y_{1m}$ of the first sample and a mean value $y_{2m}$ of the second sample, so as to calculate $t=(y_{1m}-y_{2m})/\sqrt{(V_1/n_1+V_2/n_2)}$. The degrees of freedom are obtained in accordance with $(1/\phi)=c^2/(n_1-1)+(1-c)^2/(n_2-1)$ and $c=(V_1/n_1)/(V_1/n_1+V_2/n_2)$. Furthermore, the CPU 11 compares the calculated value of t with a critical value $t(\phi, \alpha)$ corresponding to a degree of freedom $\phi$ and a prescribed significance level $\alpha$ in the t-distribution table precedently stored in the storage unit 14. If the absolute value of the calculated value of t is not smaller than the critical value, the CPU 11 determines that there is a significant difference between the means of the first and second samples, and if the absolute value of the calculated value of t is smaller than the critical value, the CPU 11 determines that it cannot be said that there is a significant difference between the means of the first and second samples. Furthermore, the CPU 11 performs processing of determining a point estimate corresponding to the subject of the comparison in the first sample as $y_{1m}$ and a confidence interval of the first sample as $y_{1m}\pm t(n_1-1, \alpha)\sqrt{V_1}/\sqrt{n_1}$, and performs processing of determining a point estimate corresponding to the subject of the comparison in the second sample as $y_{2m}$ and a confidence interval of the second sample as $y_{2m}\pm t(n_2-1, \alpha)\sqrt{V_2}/\sqrt{n_2}$.

Next, the CPU 11 determines, in accordance with a result of the t-test conducted at step S619, whether or not there is a difference in the specific passage time, elapsed time or comparison data between the two flights to be used (S620). If it is determined at step S619, as a result of the test, that there is a significant difference between the means of the first and second samples, the CPU 11 determines that there is a difference in the specific passage time, elapsed time or comparison data between the two flights to be used. If it is determined at step S619, as a result of the test, that it cannot be said there is a significant difference between the means of the first and second samples, the CPU 11 determines that there is no difference in the specific passage time, elapsed time or comparison data between the two flights to be used. Next, the CPU 11 terminates the statistical calculation processing of step S522, and returns to the main processing.

If there is no significant difference between the variances of the first and second samples (S618: NO), the CPU 11 calculates a pooled standard deviation of the first sample and the second sample (S621). At step S621, the CPU 11 calculates a sum of squared deviations $S_1$ of the first sample and a sum of squared deviations $S_2$ of the second sample, and calculates a pooled variance $V=(S_1+S_2)/\{(n_1-1)+(n_2-1)\}$ so as to calculate a pooled standard deviation $s=\sqrt{V}$. Next, the CPU 11 conducts a t-test for determining whether or not means of the first and second samples are different from each other (S622). At step S622, the CPU 11 calculates a mean value $y_{1m}$ of the first sample and a mean value $y_{2m}$ of the second sample so as to calculate $t=(y_{1m}-y_{2m})/\{s\sqrt{(1/n_1+1/n_2)}\}$. Furthermore, the CPU 11 compares the calculated value of t with a critical value $t(\phi, \alpha)$ corresponding to a degree of freedom $\phi=n_1+n_2-2$ and a prescribed significance level $\alpha$ in the t-distribution table precedently stored in the storage unit 14. If the absolute value of the calculated value of t is not smaller than the critical value, the CPU 11 determines that there is a significant difference between the means of the first and second samples, and if the absolute value of the calculated value t is smaller than the critical value, the CPU 11 determines that it cannot be said that there is a significant difference between the means of the first and second samples. Furthermore, the CPU 11 performs processing of determining a point estimate corresponding to the subject of the comparison in the first sample as $y_{1m}$ and a confidence interval of the first sample as $y_{1m}\pm t(n_1+n_2-2, \alpha)\sqrt{\{(S_1+S_2)/(n_1+n_2-2)\}}/\sqrt{n_1}$, and performs processing of determining a point estimate corresponding to the subject of the comparison in the second sample as $y_{2m}$ and a confidence interval of the second sample as $y_{2m}\pm t(n_1+n_2-2, \alpha)\sqrt{\{(S_1+S_2)/(n_1+n_2-2)\}}/\sqrt{n_2}$. If it cannot be said that there is a significant difference, the CPU 11 may combine the observation data included in these two samples and calculate a pooled mean y and a pooled standard deviation $\sigma$. At this point, the CPU 11 may determine y as a point estimate and calculate $y\pm t(n_1+n_2-1, \alpha)\sigma/\sqrt{(n_1+n_2)}$ as a confidence interval.

Next, the CPU 11 determines, in accordance with a result of the t-test conducted at step S622, whether or not there is a difference in the specific passage time, elapsed time or comparison data between the two flights to be used (S623). If it is determined at step S622, as a result of the test, that there is a significant difference between the means of the first and second samples, the CPU 11 determines that there is a difference in the specific passage time, elapsed time or comparison data between the two flights to be used. If it is determined at step S622, as a result of the test, that it cannot be said there is a significant difference between the means of the first and second samples, the CPU 11 determines that there is no difference in the specific passage time, elapsed time or comparison data between the two flights to be used. Next, the CPU 11 terminates the statistical calculation processing of step S522 and returns to the main processing.

If it is determined at step S609 that the subject of comparative prediction is not a mean value but a dispersion (S609: NO), the CPU 11 determines whether or not a population is either of two sets which are composed of items corresponding to the subject of comparative prediction, among multiple patterns of observation data extracted with respect to each of two flight to be compared (S624). If one of the observation data sets is a population (S624: YES), the CPU 11 conducts a chi-square test for determining whether or not variances of the sample and population are different (S625). At step S625, the CPU 11 performs similar calculation to that performed at step S611. Furthermore, the CPU 11 calculates the sample variance $\sigma^2=S/(n-1)$ and performs processing of determining a point estimate corresponding to the subject of the comparison set as $\sigma 2$ and a confidence interval as $S/\chi^2(\phi, \alpha/2)<\sigma^2<S/\chi^2(\phi, 1-(\alpha/2))$. Moreover, the CPU 11 calculates a sum of squared deviations $S_0$ of the population, and determines a point estimate of the variance of the population set as $\sigma_0^2$ and a confidence interval as $S_0/\chi^2(\phi_0, \alpha/2)<\sigma_0^2<S_0/\chi^2(\phi_0, 1-(\alpha/2))$. If it cannot be said there is a significant difference, the CPU 11 may perform processing of determining a pooled confidence interval as $(S_0+S)/\chi^2(n_0+n-2, \alpha/2)<\sigma_1^2<(S_0+S)/\chi^2(n_0+n-2, 1-(\alpha/2))$. Here, $\sigma_1^2$ is a pooled point estimate defined as $\sigma_1^2=(S_0+S)/\{(n_0-1)+(n-1)\}$, $n_0$ is the number of observations of the population, and $\phi_0$ is a degree of freedom defined as $\phi_0=n_0-1$.

Next, the CPU 11 determines, in accordance with a result of the chi-square test conducted at step S625, whether or not there is a difference in the dispersion of the specific passage time, elapsed time or comparison data between the two flights to be used (S626). If it is determined at step S625, as a result of the test, that there is a significant difference between the variances of the sample and population, the CPU 11 determines that there is a difference in the dispersion of the specific passage time, elapsed time or comparison data between the two flights to be used. If it is determined at step S625, as a result of the test, that it cannot be said there is a significant difference between the variances of the sample and population, the CPU 11 determines that there is no difference in the dispersion of the specific passage time, elapsed time or comparison data between the two flights to be used. Next, the CPU 11 terminates the statistical calculation processing of step S522 and returns to the main processing.

If it is determined at step S624 that none of the observation data sets is a population (S624: NO), the CPU 11 conducts an F-test for determining whether or not a variance of the first sample and a variance of the second sample are different from each other (S627). At step S627, the CPU 11 performs similar calculation to that performed at step S617. Furthermore, the CPU 11 determines a point estimate corresponding to the subject of comparison in the first sample set as $V_1$, calculates a sum of squared deviations $S_1 = V_1(n_1-1)$ of the first sample, and performs processing of determining a confidence interval as $S_1/\chi^2(\phi_1, \alpha/2) < V_1 < S_1/\chi^2(\phi_1, 1-(\alpha/2))$. Moreover, the CPU 11 determines a point estimate corresponding to the subject of comparison in the second sample set as $V_2$, calculates a sum of squared deviations $S_2 = V_2(n_2-1)$ of the second sample, and performs processing of determining a confidence interval as $S_2/\chi^2(\phi_2, \alpha/2) < V_2 < S_2/\chi^2(\phi_2, 1-(\alpha/2))$. In the case where it cannot be said that there is a significant difference between the variances of the first and second samples, the CPU 11 may determine a pooled confidence interval as $(S_1+S_2)/\chi^2(\phi_1+\phi_2, \alpha/2) < V_3 < (S_1+S_2)/\chi^2(\phi_1+\phi_2, 1-(\alpha/2))$. Here, $V_3$ is a pooled point estimate and is defined as $V_3 = (S_1+S_2)/\{(n_1-1)+(n_2-1)\}$.

Next, the CPU 11 determines, in accordance with a result of the F-test conducted at step S627, whether or not there is a difference in the dispersion of the specific passage time, elapsed time or comparison data between the two flights to be used (S628). If it is determined at step S627, as a result of the test, that there is a significant difference between the variances of the first and second samples, the CPU 11 determines that there is a difference in the dispersion of the specific passage time, elapsed time or comparison data between the two flights to be used. If it is determined at step S627, as a result of the test, that it cannot be said there is a significant difference between the variances of the first and second samples, the CPU 11 determines that there is no difference in the dispersion of the specific passage time, elapsed time or comparison data between the two flights to be used. Next, the CPU 11 terminates the statistical calculation processing of step S522, and returns to the main processing. Though two-sided tests for determining whether or not there is a difference are employed as the statistical tests conducted at steps S613, S615, S619, S622, S625 and S627, a one-sided test for determining whether one is larger or smaller than the other may be employed instead.

After the statistical calculation processing at step S522 is completed, the CPU 11 first determines whether or not the values obtained through the calculation in the statistical calculation processing, such as point estimates or statistics, include data having been transformed. If transformed data is included, the CPU 11 performs inverse transformation for the values calculated in the statistical calculation by using a method precedently stored in the storage unit 14 or set in the computer program 15. For example, inverse transformation of the logit transformation is performed in accordance with an expression $P=1/[1+\exp\{-L(P)\}]$. Furthermore, if the inverse transformation cannot be conducted, for example, as in the case where the month and date are to be inversely transformed into the date and time, it is determined that the inverse transformation is not performed. Next, the CPU 11 performs processing for extracting from explanatory data stored in the storage unit 14 an explanatory text for explaining the calculation result of the statistical calculation processing in accordance with features of the observation data used in the statistical calculation processing and results of the statistical calculation processing (S523). FIGS. 18 and 19 are conceptual views illustrating an example of contents of explanatory data. An explanatory text is associated with a feature of the first observation data set and a feature of the second observation data set used in the statistical calculation processing and various statistics obtained by the statistical calculation processing. In the case where the prediction or statistic calculation is performed in the statistical calculation processing, the first observation data set corresponds to the extracted multiple patterns of observation data. In the case where the comparative prediction is conducted in the statistical calculation processing, the first observation data set corresponds to a population while the second observation data set corresponds to a sample, or the first observation data set corresponds to the first sample while the second observation data set corresponds to the second sample. Each explanatory text includes a simple comment on reliability of the corresponding calculation result, a judgment describing the reliability of the calculation result in more detail and an advice on how the user should act based on the calculation result. FIG. 19 illustrates an example of contents of the explanatory text. At the explanatory data, an appropriate explanatory text is associated in advance with a feature of information used in the statistical calculation processing and a result of the statistical calculation processing. For example, in the case where a period spent for acquiring information included in observation data is not more than one month, an explanatory text indicating that variation caused by change of a month is not taken into consideration is associated thereto.

The CPU 11 then makes the communication unit 16 transmit the data of calculation result and explanatory text to an input/output device 7 (S524). Here, the CPU 11 sets the input/output device 7 to which the data is to be transmitted as the input/output device 7 which was designated to be given notification. If there is no input/output device 7 designated to be given the notification, the input/output device from which a request for travel process prediction was transmitted is set as the input/output device 7 to be transmitted. The input/output device 7 receives the data of the calculation result and explanatory text, outputs the calculation result and explanatory text through a display unit or a speaker (S525), and terminates the processing.

As described above, when a traveler or baggage actually used the airplane, the travel process prediction system according to the present invention acquires, for example, the passage date and time when the traveler or baggage pass through each passage point at an airport, flight specifying information and situation information indicating situations and stores them in association with each other. The travel process prediction apparatus 1 according to the present invention further extracts the passage date and time as well as situation information associated with specific flight specifying information and obtains through a multivariate analysis a regression equation representing the relationship between the multiple items included in the situation information and the passage time at which the traveler or baggage passed through a specific passage point, the elapsed time while the traveler or baggage passed through specific two passage points or the comparison data indicating a result of comparison between the passage date/time and the airplane boarding completion date and time. The obtained regression equation represents degrees of effects that in using an airplane, various conditions, e.g. the state of the traveler such as age, difference of airports, state of an airport, a condition in which the traveler used the flight such as a seat number, change in a once-determined condition and weather condition, change the specific passage time, elapsed time or comparison data. Moreover, the travel process prediction apparatus 1 inputs the content of an expected situation when a traveler uses the flight into the regression equation obtained with respect to the flight the traveler plans to use in order to calculate a predicted value including a prediction interval or confidence interval of the specific passage time, elapsed time or comparison data. If the specific passage time is set as the passage time at the exit of an arrival airport, the time at which a traveler leaves the arrival airport may be predicted. If the specific elapsed time is set as the elapsed time while a traveler moves from the first passage point to the last passage point at a departure airport, time required for staying at the departure airport may be predicted. If the specific comparison data is set as a time difference between the date and time when the traveler passes through a boarding gate at the departure airport and the date and time when the boarding gate is closed, a spare time at the boarding gate may be predicted. Each of the obtained predicted value is derived by the least-square method from the relationship between the actual passage time, elapsed time or comparison data in the past and the situation in which the traveler uses the flight, becomes more reliable than the conventional case, and allows the user to more accurately predict the time required for travelling. This enables the traveler to create a more accurate travel schedule when planning it and thus to travel efficiently. In the present embodiment, even a general user who has no special knowledge of statistics and transportation can easily obtain a predicted value by merely selecting a desired item to be predicted from the selection menu and inputting a desired condition for the prediction into the analysis items or extraction condition items.

Furthermore, the travel process prediction apparatus 1 according to the present invention extracts a passage date and time associated with each of two pieces of flight specifying information, and determines whether or not there is a difference in the specific passage time, elapsed time or comparison data between the two flights to be used, using an appropriate test method in accordance with the number of observations extracted for each flight specifying information. Since it tests the past records by using an appropriate test method, the travel process prediction apparatus 1 can accurately determine whether or not there is a difference in the specific passage time, elapsed time or comparison data between the two flights to be used, and outputs point estimates including the calculation of the confidence intervals. The travel process prediction apparatus 1 further accepts a part of the situation information indicating a situation expected when one uses a flight, extracts observation patterns associated with the situation information having the content corresponding to the accepted situation information when extracting the observation data of the passage date and time, and refines the observation data to be extracted. Because the observation data that meets the purpose of a user, such as a traveler, can be extracted from numerous and various types of data, it also helps the user obtain a reliable predicted value. This, at the same time, also leads to reduce the amount of data required for calculation and alleviate the burden of calculation. As in the case of prediction, the user can also quickly obtain a result of comparative prediction with a simple operation without a special knowledge.

Furthermore, the travel process prediction apparatus 1 according to the present invention outputs together with the actual result of statistical calculation processing an explanatory text stored and associated in advance with results obtained by the statistical calculation processing and with the features of information used in the statistical calculation processing, such as an amount of the information and a period when the information was obtained. Though various statistics are calculated in the statistical calculation processing, the user who is not a specialist would neither understand the meaning of the statistics nor recognize the reliability of the obtained result. Accordingly, by getting explanatory text in accordance with the result of the statistical calculation processing, the user can understand the result of the statistical calculation processing and can create a more practical travel schedule in accordance with the prediction result of the travel process.

Embodiment 2

Figure 20:
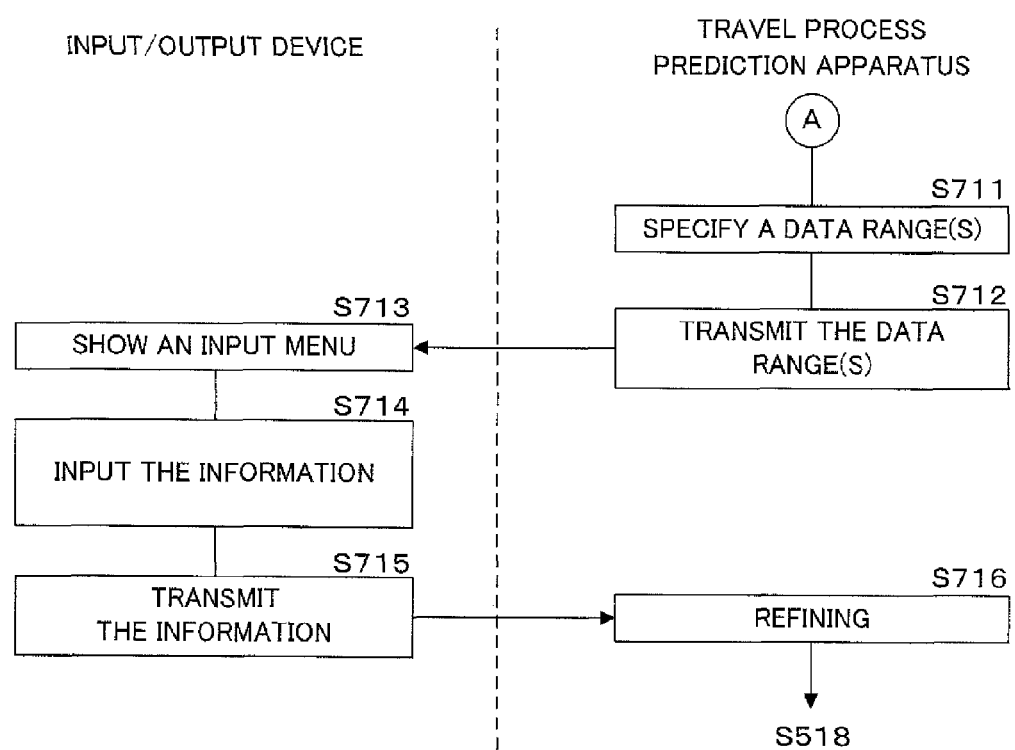
FIG. 20 is a flowchart illustrating a part of a procedure of processing for travel process prediction executed by the travel process prediction system according to Embodiment 2.

In Embodiment 2, another processing model according to the present invention will be described. The travel process prediction system is configured as in Embodiment 1. FIG. 20 is a flowchart illustrating a part of a procedure of processing for travel process prediction executed by the travel process prediction system according to Embodiment 2. As in Embodiment 1, the travel process prediction system executes the processing at steps S501 to S517. The CPU 11 of the travel process prediction apparatus 1, however, makes the communication unit 16 transmit menu data for showing an input menu not including any analysis item at step S507. The input/output device 7 shows on the display unit the input menu not including the analysis item at step S508, and receives flight specifying information input at step S509. Furthermore, when the processing content to be performed is prediction or statistic calculation, at step S512, the CPU 11 extracts observation patterns including a combination of: values of the subject of specific passage time, elapsed time or comparison data which is to be predicted and which is associated with the flight specifying information having the same content as that of the input flight specifying information; and multiple predetermined items among situation information associated with the same flight specifying information. When the processing content to be performed is comparative prediction, the CPU 11 extracts, for each of the two flights to be compared at step S512, observation patterns including the combination of values of the subject of specific passage time, elapsed time or comparison data which is to be predicted and which is associated with the flight specifying information having the same content as that of the input flight specifying information, and multiple predetermined refinement items among the situation information associated with the same flight specifying information.

When there are more than one observation at step S515, the CPU 11 specifies a data range for each item of the situation information included in the extracted observation data (S711). In the case where, for example, the number of observation data is three and the contents of arrival time are 12:00, 12:30 and 13:00, respectively, the data range for the item of arrival time is set as 12:00-13:00. In the case where the processing to be performed is comparative prediction, the data range for each item is specified for each of the two flights. In the case where the processing to be performed is prediction or statistic calculation, only one pattern of the data range is specified for each item. The CPU 11 then makes the communication unit 16 transmit the information indicating the data range of each of the specified item to the input/output device 7 (S712). The input/output device 7 receives information indicating the data range for each item, and shows on the display unit the data range for each item of the situation information while indicating an input menu to let a user input the content of each item (S713).

FIG. 21 is a conceptual view illustrating an example of an input menu according to Embodiment 2. FIG. 21 shows an example of an input menu in the case where the content of the processing to be performed is prediction for the arrival airport exit time. Along with each of the analysis items to be input, a specified data range is shown. A user inputs content within the shown data range. It is noted that showing the data range by listing the contents included in the observation data may be possible. Likewise, in the case where the processing to be performed is comparative prediction or statistic calculation, a specified data range is shown along with each of the refinement condition items. The user inputs content of each item of the situation information by referring to the shown data range. Note that a user can also input the content falling out of the data range. When inputting, the user is likely to input the content included in the data range. It is also possible to set preventing a user from inputting the content falling out of the data range. When the content included in the data range is input, the travel process prediction apparatus 1 performs statistical calculation processing by using the observation data in which the input situation information that falls in the data range is included, and increases the accuracy of calculation. More specifically, in the case of quantitative variables, as a user has it process the prediction by inputting the situation information closer to the mean value of the values included in the range, the confidence interval and prediction interval of the obtained predicted value increasingly become narrower. In the case of qualitative variables, as a user more inputs the same values as the listed data in the range, the calculation accuracy gets more improved. Furthermore, in the comparative prediction and statistic calculation, the range of possible refinement may be shown to the user, and it generates an effect of preventing the user from selecting the refinement falling out of the range.

By getting user's operation, the input/output device 7 inputs the content of each item of the situation information which is requested by the user (S714). The input/output device 7 transmits the input information to the travel process prediction apparatus 1 (S715), which receives the information transmitted from the input/output device 7 at the communication unit 16. The CPU 11 then performs processing of refining observation data based on the input items of situation information (S716). In the case where the processing to be performed is prediction, the CPU 11 deletes from the observation data the items for which no content is input among the situation information. In the case where the processing to be performed is comparative prediction or statistic calculation, the CPU 11 extracts, from the original observation data, the observation data that are comprised of the values of the specific passage time, elapsed time or comparison data which is a subject of comparative prediction or statistic calculation and is associated with the situation information having the same contents as the input contents. The CPU 11 then executes processing at and after S518.

The travel process prediction apparatus 1 may have such a form that an analysis item less probable to be incorporated into the regression equation is removed from input items when the input items are selected at step S506. When finishing selecting explanatory variables based on the F value at step S522, the CPU 11 counts the number of predictions executed and the number of incorporations into the regression equation for each analysis item, and records at the set data in the storage unit 14 the number of predictions and the rate of incorporations which is the ratio of the number of incorporations to the number of predictions. Next, at S506, the CPU 11 only selects for each of the preset analysis items an input item which does not have the recorded number of predictions exceeding a predetermined number or which has the recorded number of predictions exceeding a predetermined number and has the recorded incorporation rate not lower than a predetermined rate. For example, at step S506 after 100 times of predictions, the CPU 11 selects from pre-set input items the input items which are analysis items with the incorporation rate not lower than 1%. In the multivariate analysis which processes a large amount of data, reduction in the number of analysis items corresponding to explanatory variables results in the reduction of a calculation load and the increase of a calculation speed. In particular, a qualitative variable indicating various kinds of states such as weather or day of the week needs (the number of states−1) explanatory variables when dummy transformation is performed thereon, so that the removal of such qualitative variables greatly reduces the calculation load. Alternatively, the travel process prediction apparatus 1 may store the items to be switched with the item having a low incorporation rate at the set data in advance, while the CPU 11 may select an input item by switching the stored item with the item having an incorporation rate lower than the predetermined rate at step S506 where the number of predictions has exceeded the predetermined number. Note that the original data stored in advance remains unchanged regardless of any change at the set data such as removing or switching of the analysis item.

Figure 22:
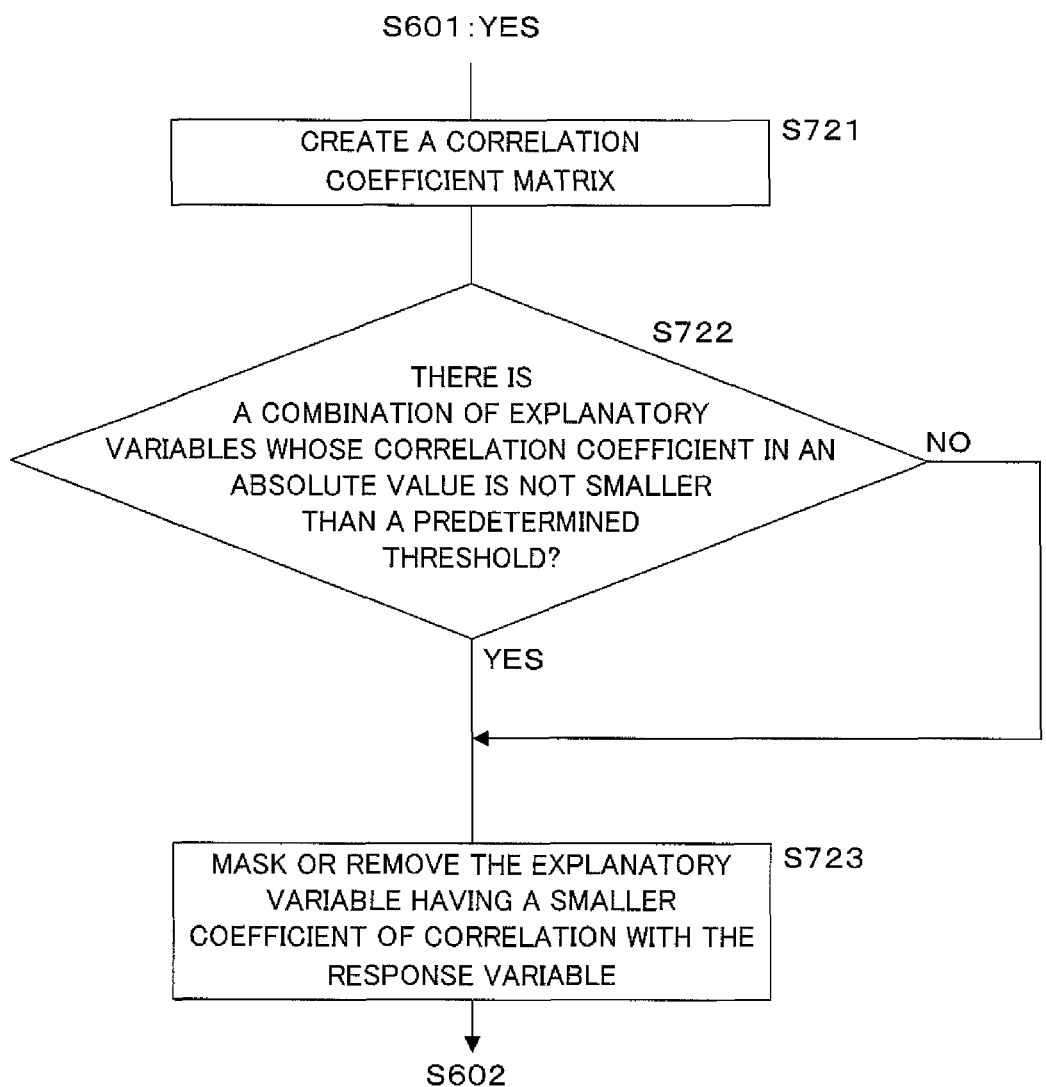
FIG. 22 is a flowchart illustrating a part of a procedure for statistical calculation processing performed at step S522 in Embodiment 2.

Moreover, the step, one of the steps of regression diagnosis, of detecting an explanatory variable with strong multicollinearity is performed after the regression equation is obtained in Embodiment 1. However, in the Embodiment 2, the step is performed before the regression equation is obtained. FIG. 22 is a flowchart illustrating a part of a procedure for statistical calculation processing performed at step S522 in Embodiment 2. At step S601, in the case where the statistical calculation processing to be performed is prediction for passage time, elapsed time or comparison data, the CPU 11 sets, based on the extracted observation data, the passage time, elapsed time or comparison data which is a subject of prediction included in the observation data as a response variable, sets the items of situation information as explanatory variables, and calculates correlation coefficients for the response variable and explanatory variables in order to create a correlation coefficient matrix (S721). Based on the created correlation coefficient matrix, the CPU 11 then determines whether or not there is a combination of explanatory variables for which an absolute value of the correlation coefficient between the explanatory variables is not smaller than a predetermined threshold value (S722). As a threshold value, a positive value smaller than 1 is determined in advance. It is assumed as, for example, the threshold value=0.6. In the case where there is a combination of explanatory variables for which the absolute value of correlation coefficient between explanatory variables is not smaller than the predetermined threshold value (S722: YES), the CPU 11 masks or removes from the observation data the explanatory variable having a smaller coefficient of correlation with the response variable among the combinations of explanatory variables for which the absolute value of the correlation coefficient between the explanatory variables is not smaller than the predetermined threshold value (S723). Note that each of the dummy variables constituted by multiple explanatory variables, each of the squared variable and explanatory variable on which the squared variable is based, or each of the interaction variable and explanatory variables on which the interaction variable is based correlates with one another in the first place and thus are associated with one another at the set data stored in the storage unit 14. The CPU 11 does not perform removing or masking for the explanatory variables associated with one another at the set data, even if the correlation coefficient between the explanatory variables is not smaller than the threshold value. Moreover, when one of the dummy variables constituted by multiple explanatory variables shows a correlation coefficient corresponding to the threshold value or larger with an explanatory variable other than the other associated dummy variables, and when the CPU 11 removes or masks that dummy variable, the CPU 11 also removes or masks t the other dummy variables that are associated with that dummy variable. Likewise, when an explanatory variable on which the squared variable is based shows a correlation coefficient corresponding to the threshold value or larger with the explanatory variable other than the squared variable, and when the CPU 11 removes or masks that explanatory variable, the CPU 11 also removes or masks the squared variable. Similarly, when one of the multiple explanatory variables on which the interaction variable is based shows a correlation coefficient corresponding to the threshold value or larger with an explanatory variable other than the interaction variable and the other multiple explanatory variables, and when the CPU 11 removes or masks the one, the CPU 11 also removes the interaction variable. After step S723 is completed, or if there is no combination of explanatory variables for which the absolute value of the correlation coefficient between explanatory variables is not smaller than the predetermined threshold value at step S722 (S722: NO), the CPU 11 executes the processing at and after step S602.

Furthermore, the travel process prediction apparatus 1 may take such a form that an explanatory variable with strong multicollinearity is removed by another method before the regression analysis is performed. For example, when there is a combination of explanatory variables for which the absolute value of their correlation coefficients is not smaller than the predetermined value, the CPU 11 removes or masks an explanatory variable having a smaller coefficient of correlation with the response variable if the number of explanatory variables is large, such as 10 or larger, and the CPU 11 adds a new explanatory variable made by multiplying or adding the two explanatory variables if the number of explanatory variables is small, such as less than 10. The new added variable which is a product or sum of the two explanatory variables with strong multicollinearity serves to lessen the multicollinearity. The CPU 11 may perform the processing of re-creating a correlation coefficient matrix after addition of the new variable.

Though, in Embodiment 1, the prediction accuracy is enhanced by removing the explanatory variable with strong multicollinearity from the analysis, it is required to re-calculate the regression equation, since the variable with strong multicollinearity is removed in the regression diagnosis after the regression equation is obtained. Thus, when handling a large amount of data, the travel process prediction apparatus 1 increases the calculation load and calculation time to a large degree. In Embodiment 2, however, it is not necessary to re-calculate the regression equation, and the travel process prediction apparatus 1 reduces the calculation load and time.

Moreover, in Embodiment 1, a part of the situation information indicating the situation in which a future traveler or baggage travels is input through the input/output device 7, and the travel process prediction apparatus 1 substitutes the input situation information for the explanatory variables in the regression equation to calculate a predicted value for specific passage time, elapsed time or comparison data. In Embodiment 2, unlike Embodiment 1, the input/output device 7 does not perform inputting the situation information, while the travel process prediction apparatus 1 performs processing of obtaining the regression equation by setting multiple items in the situation information predetermined at the set data as explanatory variables. The travel process prediction apparatus 1 transmits the obtained regression equation to the input/output device 7 while the input/output device 7 receives the content of necessary situation information. The input/output device 7 substitutes the content of the input situation information for the explanatory variables in the regression equation in order to calculate a predicted value for specific passage time, elapsed time or comparison data. The travel process prediction apparatus 1 may also transmit the data range specified at step S711 together with the obtained regression equation. In the present embodiment, the travel process prediction apparatus 1 does not need to perform processing of obtaining the regression equation every time when the content of the situation information input by a user is changed. It is, therefore, easier for the user to change in various ways the content of situation information to be input to the input/output device 7 so as to find a predicted value for specific passage time, elapsed time or comparison data in various situations. It is also possible to set a variable other than explanatory variables as one of the input items. On the input screen displayed by the input/output device 7, all the variables in the regression equation can accept user's input, and the user can obtain the solution of a target variable he/she wishes to find when he/she inputs values into the variables other than that target variable. It is, therefore, also possible to obtain a value of a target explanatory variable the user wishes to obtain by inputting values into the variables other than the target explanatory variable. As another advantage, the calculation load of the travel process prediction apparatus 1 can be reduced when the user tries to find predicted values in various situations for specific passage time, elapsed time or comparison data.

Embodiment 1 described that if the departure/arrival date and time of an airplane fall out of the allowable range and if the event history data does not include change information, the information indicating abnormality of transportation is associated with flight specifying information including at least a flight number and a departure date, and in the processing of travel process prediction, observation data is removed or masked. In Embodiment 2, unlike Embodiment 1, the travel process prediction apparatus 1 performs the processing of precedently removing the observation data associated with the information indicating abnormality of transportation when information is recorded at the multivariate data. It is noted that the processing of precedently removing the observation data associated with the information indicating abnormality of transportation may also be performed by the information acquiring apparatus 2 when the information is recorded at the travel process data. In this embodiment, the number of observation data extracted by the travel process prediction apparatus 1 in the processing of travel process prediction is reduced, the need for removing or masking the observation data associated with the information indicating abnormality of transportation is eliminated, and the load of calculation in the travel process prediction apparatus 1 is reduced. Note that, in Embodiment 2, similar processing is performed also for the observation data associated with the information indicating abnormality of a travel object.

While the prediction processing in Embodiments 1 and 2 above used a quantitative variable for the response variable, the use of qualitative variable for the response variable allows a discriminant analysis or an analysis of quantification method II to be performed. If, for example, the comparison data recorded at the multivariate data in the storage unit 14 are discriminative values, the response variable will be qualitative. The analysis of quantification method II is performed when the response variable is qualitative and all the explanatory variables are qualitative variables, while the discriminant analysis is performed when any one of the explanatory variables is quantitative. When the qualitative response variable is not a discriminative value, the response variable is transformed by dummy transformation before analysis into a discriminative value for which similar processing is performed. Thus, the predicted value obtained in either case mainly takes a numeric value between 0 and 1, which is inversely transformed by inverse transformation to obtain a discriminative prediction. If, for example, the discriminative values indicating "1" for possible transfer and indicating "0" for impossible transfer are set as the response variable and the same number of observation data are prepared for both of the above, the predicted value mainly takes a numeric value between 0 and 1. The CPU 11 uses an inverse transformation formula, "impossible transfer" when $Y \leq 0.5$ and "possible transfer" when $Y > 0.5$, that is pre-set in the storage unit 14, and determines whether or not the transfer is possible. Assuming that if a is the number of observation data for which transfer is possible and b is the number of observation data for which transfer is impossible, the threshold for discrimination is represented by $a/(a+b)$. For example, if the number of both observation data corresponds to 10, the threshold is represented by $10/(10+10)=0.5$. Moreover, the CPU 11 calculates a correct answer rate and incorrect answer rate instead of the confidence interval or prediction interval in order to attach to the discrimination result. The correct answer rate is a percentage of the number of observation data that matches with the result of the judgment made by the regression equation, among the number of observation data used for analysis. The incorrect answer rate is a percentage of the number of observation data that does not match with the result of the judgment made by the regression equation. Other methods of discriminant analysis include, for example, a logistic regression analysis characterized by performing logit transformation for a response variable comprised of discriminative values or a dummy variable, or a regression analysis characterized by the discrimination which uses a Mahalanobis' distance or linear discriminant function. Since these methods of the discriminant analysis are well-known, details thereof will not be described here.

Furthermore, in the processing of prediction, comparative prediction and statistic calculation, according to Embodiments 1 and 2, the items to be an objective variable correspond to passage time, elapsed time or comparison data. It is, however, also possible to set items other than these items as an objective variable. If the items in the selection menu, set data and input menu that are set in the storage unit 14 are changed, the items other than passage time, elapsed time or comparison data may be set as an objective variable. For example, the rate of vacant seats may be set for the item of prediction, comparison or statistic calculation and be calculated. Here, the rate of vacant seats is transformed by logit transformation or the like before the statistical calculation, and is inversely transformed after the calculation.

Moreover, in the processing of prediction, comparative prediction and statistic calculation in Embodiments 1 and 2, the extraction condition items are set as the items included in the flight specifying information while the refinement condition items are included in the situation information. It is, however, also possible to set items other than above as the extraction condition items or refinement condition items. That is, the extraction condition items may be the items included in the situation information or the items other than the item which is to be a response variable among passage time, elapsed time or comparison data. Furthermore, the refinement condition items may be the items included in the flight specifying information or the items other than that serving as a response variable among passage time, elapsed time or comparison data.

In the prediction processing, according to Embodiments 1 and 2, the items to be explanatory variables are items included in the situation information. In the present invention, however, information other than the situation information included at the multivariate data may also be set as explanatory variables. For example, the items included in the flight specifying information may also be set as explanatory variables. Moreover, the items other than the item to be a response variable among the passage time, elapsed time and comparison data may also be set as explanatory variables. For example, the elapsed time or comparison data may be set as an explanatory variable when the passage time is a response variable. Moreover, the passage time at a passage point where No. a check machine 21 is located may be set as a response variable, while the passage time at a passage point where No. b check machine 21 is located may be set as an explanatory variable. If the items on the selection menu, set data and input menu that are set in the storage unit 14 are alternated, items other than the situation information can be set as explanatory variables. In the extraction of observation data at step S512, observation data including information other than the situation information are extracted.

Though the processing of comparative prediction in Embodiments 1 and 2 was described as the processing of comparing two items, the processing of comparative prediction among three or more items may be performed in the present invention. The comparison of more than three items may be possible in, for example, performing the processing of comparative prediction described in Embodiment 1 or 2 for all the combinations of two items among the three or more items.

Furthermore, in the processing of prediction, comparative prediction and statistical calculation in Embodiments 1 and 2, as shown in FIGS. 12 to 15, the information corresponding to the extraction condition items that are conditions for extracting observation data from the multivariate data was set as the flight specifying information. In the present invention, however, as the information corresponding to the extraction condition items, the information which is other than the flight specifying information and which satisfies the above objective may also be used. For example, the information indicating a travel pathway such as position information of the start point and end point of the travel pathway by a travel object may also be set as information corresponding to an extraction condition item. More specifically, the location information includes the names of departure and arrival airports, the names of airport facilities that are to be the start point and end point of travel. Alternatively, instead of the name of airport facilities, the positional information or IDs of the check machines 21 corresponding to the start point and end point of travel may also be used. It is also possible to delete information corresponding to the extraction condition items. The travel process prediction apparatus 1 can perform analysis, since extraction can be performed only by using the extraction items selected at step S511 without using the information corresponding to the extraction condition item at step S512. In such cases, as for the set data stored in the storage unit 14, the information removed from the extraction condition items is to be included in the analysis items or refinement condition items, while the information removed from the analysis items or refinement condition items is to be included in the extraction condition items. As the number of items corresponding to the extraction condition items decreases, the volume of the information to be extracted increases. Accordingly, the calculation load and calculation time in the travel process prediction apparatus 1 is increased.

Though the embodiments above showed the example where an ID recorded in the ticket 31 or baggage claim tag 32 is acquired, another medium for recording the ID may also be used in the present invention, such as a mobile phone, a magnetic card or a wireless tag. Moreover, the identification information used in the present invention may also be unique information that can be used in any transportation. For example, as the information for identifying a person, biological information such as a fingerprint may be utilized so that trains, buses or airplanes operated by different companies may use unified identification information. Moreover, the barcode reader in the present invention may also be a biometric device, a two-dimensional code reader or a noncontact IC card reader/writer. In the present invention, the input/output device 7 operated by a user may be an input/output device that is installed at an airport and can be used by an unspecified person. Though the embodiments above described that the travel process prediction system calculates year, month, date, day of the week, time and the like by acquiring and transforming a date and time, it may have a form of separately acquiring each of the year, month, date, day of the week, time and the like. These pieces of information are preferably transformed into prescribed numbers and are stored, as an existing computer program adopts. Furthermore, the travel process prediction system may have a form of specifying only the passage time when specifying the passage date and time, or specifying only the boarding completion time when acquiring the boarding completion date and time.

In the embodiments above, the transportation is assumed as an airplane while the departure/arrival facility is assumed as an airport. The present invention may, however, also be applied to any transportation that is repeatedly operated at specified time. For example, the transportation may also be a train, bus, taxi, a private vehicle, a snow vehicle, a horse carriage, a ropeway, a cable car, a linear motor car, an air-cushion vehicle, a submarine or a ship. In the future, an aerotrain and a spaceship may also be applicable. Furthermore, the present invention may also be applied to a case where plural pieces of different transportation are used. The departure/arrival facility includes an area where the check machine 21 may be used, such as a train station, bus terminal, station building, bus stop, depot, maintenance area, turn-around area, delivery and collection area, place of meet and break-up, traffic circle, accessway or underground pathway. Though the travel object is assumed to be a traveler or baggage in the embodiments above, the any object including a person may be employed in the present invention as long as the object travels by transportation that repeatedly operates at specified time. Moreover, a baggage includes not only the ones carried into a cargo space of transportation such as an airplane but also all baggage carried by the transportation such as a carry-on baggage of a traveler. Furthermore, though the embodiments above set the timing of measuring the passage date and time as the timing in the last half of the information acquiring processing performed by the check machine 21, the timing may also be other timing in the first half. Furthermore, though the some pieces of information acquired by the present invention are stored in association with one another, other methods of association may also be used as long as the information required for processing can be extracted. For example, at least one piece of information which is to be extracted in the present invention may be associated with other information and be stored. Finally, while the present invention described the result of statistical calculation as an estimate value for predicting the future, the result of statistics may be used for past record data that collected the past records and may serve to improve management and productivity, since the statistics result is the aggregation of past results.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A travel process prediction system for predicting a travel process of a travel object traveling with transportation repeatedly operated at a specific time, comprising:
   a processor;
   a memory;
   a passage time specifying unit for specifying passage time at which a travel object actually passes through each of a plurality of passage points at a departure/arrival facility of transportation;
   a transportation specifying information acquiring unit for acquiring transportation specifying information which specifies transportation used by the travel object;
   a situation information acquiring unit for acquiring situation information indicating a situation in which the travel object uses the transportation;
   a storage unit for storing passage time at each passage point, transportation specifying information and situation information, in an associated manner for each of a plurality of travel objects;
   an extraction unit for extracting, from the storage unit, a plurality of combinations of passage time concerning a specific passage point and other information associated with the passage time; and
   a calculation unit for calculating, based on the extracted plurality of combinations, an estimate value of passage time at which a travel object passes through a specific passage point under a specific condition by conducting at least one of a regression analysis for obtaining a relationship between the passage time and said other information and a calculation of at least one of a mean and variance of the passage time.

2. A travel process prediction system for predicting a travel process of a travel object traveling with transportation repeatedly operated at a specific time, comprising:
   a processor;
   a memory;
   a passage time specifying unit for specifying passage time at which a travel object actually passes through each of a plurality of passage points at a departure/arrival facility of transportation;

a transportation specifying information acquiring unit for acquiring transportation specifying information which specifies transportation used by the travel object;

a situation information acquiring unit for acquiring situation information indicating a situation in which the travel object uses the transportation;

a storage unit for storing elapsed time calculated from passage time at each passage point while the travel object passes through two passage points, transportation specifying information and situation information, in an associated manner for each of a plurality of travel objects;

an extraction unit for extracting, from the storage unit, a plurality of combinations of elapsed time concerning two specific passage points and other information associated with the elapsed time; and a calculation unit for calculating, based on the extracted plurality of combinations, an estimate value of elapsed time while a travel object passes through two specific passage points under a specific condition by conducting at least one of a regression analysis for obtaining a relationship between the elapsed time and said other information and a calculation of at least one of a mean and variance of the elapsed time.

3. A travel process prediction system for predicting a travel process of a travel object traveling with transportation repeatedly operated at a specific time, comprising:

a processor;

a memory;

a passage time specifying unit for specifying passage time at which a travel object actually passes through each of a plurality of passage points at a departure/arrival facility of transportation;

a transportation specifying information acquiring unit for acquiring transportation specifying information which specifies transportation used by the travel object;

a situation information acquiring unit for acquiring situation information indicating a situation in which the travel object uses the transportation;

a boarding completion time specifying unit for specifying boarding completion time at which boarding of travel objects is actually completed for the transportation;

a storage unit for storing transportation specifying information, situation information and a result of comparison between boarding completion time and passage time at each passage point, in an associated manner for each of a plurality of travel objects;

an extraction unit for extracting, from the storage unit, a plurality of combinations of a result of comparison between passage time concerning a specific passage point and boarding completion time concerning specific transportation and other information associated with the result of comparison; and a calculation unit for calculating, based on the extracted plurality of combinations, an estimate value of a result of comparison between boarding completion time under a specific condition and passage time concerning a specific passage point by conducting at least one of a regression analysis for obtaining a relationship between the results of comparison and said other information and a calculation of at least one of a mean and variance of the results of comparison.

4. A travel process prediction system for predicting a travel process of a travel object traveling with repeatedly operated transportation, comprising:

a processor;

a memory;

a passage time specifying unit for specifying passage time at which a travel object actually passes through one passage point or a plurality of passage points at a departure/arrival facility of transportation;

a transportation specifying information acquiring unit for acquiring transportation specifying information which specifies transportation used by the travel object;

a situation information acquiring unit for acquiring situation information indicating a situation in which the travel object uses the transportation;

a storage unit for storing passage time at one passage point or a plurality of passage points, transportation specifying information and situation information, in an associated manner for each of a plurality of travel objects;

an extraction unit for extracting, from the storage unit, a plurality of combinations of passage time concerning a specific passage point and other information associated with the passage time; and a calculation unit for calculating, based on the extracted plurality of combinations, a statistic of the passage time at which travel objects pass through a specific passage point under a specific condition by conducting at least one of a regression analysis for obtaining a relationship between the passage time and said other information and a calculation of at least one of a mean and variance of the passage time.

5. A travel process prediction system for predicting a travel process of a travel object traveling with repeatedly operated transportation, comprising:

a processor;

a memory;

a passage time specifying unit for specifying passage time at which a travel object actually passes through a plurality of passage points at a departure/arrival facility of transportation;

a transportation specifying information acquiring unit for acquiring transportation specifying information which specifies transportation used by the travel object;

a situation information acquiring unit for acquiring situation information indicating a situation in which the travel object uses the transportation;

a storage unit for storing elapsed time calculated from passage time at a plurality of passage points while the travel object passes through two passage points, transportation specifying information and situation information, in an associated manner for each of a plurality of travel objects;

an extraction unit for extracting, from the storage unit, a plurality of combinations of elapsed time concerning two specific passage points and other information associated with the elapsed time; and a calculation unit for calculating, based on the extracted plurality of combinations, a statistic of the elapsed time while travel objects pass through two specific passage points under a specific condition by conducting at least one of a regression analysis for obtaining a relationship between the elapsed time and said other information and a calculation of at least one of a mean and variance of the elapsed time.

6. A travel process prediction system for predicting a travel process of a travel object traveling with repeatedly operated transportation, comprising:

a processor;

a memory;

a passage time specifying unit for specifying passage time at which a travel object actually passes through one passage point or a plurality of passage points at a departure/arrival facility of transportation;

a transportation specifying information acquiring unit for acquiring transportation specifying information which specifies transportation used by the travel object;

a situation information acquiring unit for acquiring situation information indicating a situation in which the travel object uses the transportation;

a boarding completion time specifying unit for specifying boarding completion time at which boarding of travel objects is actually completed for the transportation;

a storage unit for storing transportation specifying information, situation information and a result of comparison between boarding completion time and passage time at one passage point or a plurality of passage points, in an associated manner for each of a plurality of travel objects;

an extraction unit for extracting, from the storage unit, a plurality of combinations of a result of comparison between passage time concerning a specific passage point and boarding completion time concerning specific transportation and other information associated with the result of comparison; and a calculation unit for calculating, based on the extracted plurality of combinations, a statistic of the results of comparison between passage time concerning a specific passage point and boarding completion time under a specific condition by conducting at least one of a regression analysis for obtaining a relationship between the result of comparison and said other information and a calculation of at least one of a mean and variance of the result of comparison.

7. A travel process prediction system for predicting a travel process of a travel object traveling with transportation repeatedly operated at a specific time, comprising:

a processor;

a memory;

a passage time specifying unit for specifying passage time at which a travel object actually passes through each of a plurality of passage points at a departure/arrival facility of transportation;

a transportation specifying information acquiring unit for acquiring transportation specifying information which specifies transportation used by the travel object; and a travel process prediction apparatus for predicting a travel process of a travel object under a specific condition, wherein the travel process prediction apparatus includes:

a storage unit for storing passage time specified at each passage point and the acquired transportation specifying information, in an associated manner for each of a plurality of travel objects;

a transportation specifying information accepting unit for accepting a plurality of pieces of transportation specifying information which specifies a plurality of pieces of transportation which is candidates to be used by an arbitrary travel object;

a request accepting unit for accepting a request for comparing passage time at which the travel object passes through a specific passage point when the travel object uses each of the plurality of pieces of transportation;

an extraction unit for extracting, from the storage unit, for each of the plurality of pieces of transportation specifying information, a plurality of pieces of passage time concerning the specific passage point, associated with transportation specifying information having a same content as the accepted transportation specifying information;

a calculation unit for calculating, for each of the plurality of pieces of transportation specifying information, at least one of a mean and variance of the extracted passage time;

a test unit for statistically testing a difference in at least one of the mean and variance of the passage time calculated for each of the plurality of pieces of transportation specifying information; and an output unit for outputting a test result obtained by the test unit.

8. A travel process prediction system for predicting a travel process of a travel object traveling with transportation repeatedly operated at a specific time, comprising:

a processor;

a memory;

a passage time specifying unit for specifying passage time at which a travel object actually passes through each of a plurality of passage points at a departure/arrival facility of transportation;

a situation information acquiring unit for acquiring situation information indicating a situation specified by a plurality of items when the travel object uses transportation; and a travel process prediction apparatus for predicting a travel process of a travel object under a specific condition, wherein the travel process prediction apparatus includes:

a storage unit for storing the passage time specified at each passage point and the acquired situation information, in an associated manner for each of a plurality of travel objects;

a situation information accepting unit for accepting a plurality of pieces of situation information indicating a plurality of situations in which an arbitrary travel object uses transportation;

a request accepting unit for accepting a request for comparing passage time at which the travel object passes through a specific passage point when the travel object uses transportation in the plurality of situations;

an extraction unit for extracting, from the storage unit, a plurality of pieces of passage time concerning the specific passage point, associated with the situation information having a same content as the accepted situation information, for each of the plurality of pieces of situation information;

a calculation unit for calculating at least one of a mean and variance of the extracted passage time for each of the plurality of pieces of situation information;

a test unit for statistically testing a difference in at least one of the mean and variance of the passage time calculated for each of the plurality of pieces of situation information; and an output unit for outputting a test result obtained by the test unit.

9. A travel process prediction system for predicting a travel process of a travel object traveling with transportation repeatedly operated at a specific time, comprising:

a processor;

a memory;

a passage time specifying unit for specifying passage time at which a travel object actually passes through each of a plurality of passage points at a departure/arrival facility of transportation;

a transportation specifying information acquiring unit for acquiring transportation specifying information which specifies transportation used by the travel object; and a travel process prediction apparatus for predicting a travel process of a travel object under a specific condition, wherein the travel process prediction apparatus includes:

a storage unit for storing elapsed time calculated from the passage time specified at each passage point while the travel object passes through two passage points and the acquired transportation specifying information, in an associated manner for each of a plurality of travel objects;

a transportation specifying information accepting unit for accepting a plurality of pieces of transportation specifying information which specifies a plurality of pieces of transportation which is candidates to be used by an arbitrary travel object;

a request accepting unit for accepting a request for comparing elapsed time while the travel object passes through two specific passage points when the travel object uses each of the plurality of pieces of transportation;

an extraction unit for extracting, from the storage unit, a plurality of pieces of elapsed time concerning the two specific passage points, associated with transportation specifying information having a same content as the accepted transportation specifying information, for each of the plurality of pieces of transportation specifying information;

a calculation unit for calculating at least one of a mean and variance of the extracted elapsed time for each of the plurality of pieces of transportation specifying information;

a test unit for statistically testing a difference in at least one of the mean and variance of the elapsed time calculated for each of the plurality of pieces of transportation specifying information; and an output unit for outputting a test result obtained by the test unit.

10. A travel process prediction system for predicting a travel process of a travel object traveling with transportation repeatedly operated at a specific time, comprising:

a processor;

a memory;

a passage time specifying unit for specifying passage time at which a travel object actually passes through each of a plurality of passage points at a departure/arrival facility of transportation;

a situation information acquiring unit for acquiring situation information indicating a situation specified by a plurality of items when the travel object uses the transportation; and a travel process prediction apparatus for predicting a travel process of a travel object under a specific condition, wherein the travel process prediction apparatus includes:

a storage unit for storing elapsed time calculated from the passage time specified at each passage point while the travel object passes through two passage points and the acquired situation information, in an associated manner for each of a plurality of travel objects;

a situation information accepting unit for accepting a plurality of pieces of situation information indicating a plurality of situations in which an arbitrary travel object uses transportation;

a request accepting unit for accepting a request for comparing elapsed time while the travel object passes through two specific passage points when the travel object uses transportation in the plurality of situations;

an extraction unit for extracting, from the storage unit, a plurality of pieces of elapsed time concerning the two specific passage points, associated with situation information having a same content as the accepted situation information, for each of the plurality of pieces of situation information;

a calculation unit for calculating at least one of a mean and variance of the extracted elapsed time for each of the plurality of pieces of situation information;

a test unit for statistically testing a difference in at least one of the mean and variance of the elapsed time calculated for each of the plurality of pieces of situation information; and an output unit for outputting a test result obtained by the test unit.

11. A travel process prediction system for predicting a travel process of a travel object traveling with transportation repeatedly operated at a specific time, comprising:

a processor;

a memory;

a passage time specifying unit for specifying passage time at which a travel object actually passes through each of a plurality of passage points at a departure/arrival facility of transportation;

a transportation specifying information acquiring unit for acquiring transportation specifying information which specifies transportation used by the travel object;

a boarding completion time specifying unit for specifying boarding completion time at which boarding of travel objects is actually completed for the transportation; and a travel process prediction apparatus for predicting a travel process of a travel object under a specific condition, wherein the travel process prediction apparatus includes:

a storage unit for storing the acquired transportation specifying information and a result of comparison between boarding completion time and passage time at each passage point, in an associated manner for each of the plurality of travel objects;

a transportation specifying information accepting unit for accepting a plurality of pieces of transportation specifying information which specifies a plurality of pieces of transportation which is candidates to be used by an arbitrary travel object;

a request accepting unit for accepting a request for comparing the results of comparison between passage time at a specific passage point and boarding completion time for the plurality of pieces of transportation;

an extraction unit for extracting, from the storage unit, a plurality of results of comparison between boarding completion time and passage time at the specific passage point, associated with transportation specifying information having a same content as the accepted transportation specifying information, for each of the plurality of pieces of transportation specifying information;

a calculation unit for calculating at least one of a mean and variance of the extracted results of comparison for each of the plurality of pieces of transportation specifying information;

a test unit for statistically testing a difference in at least one of the mean and variance of the results of comparison calculated for each of the plurality of pieces of transportation specifying information; and an output unit for outputting a test result obtained by the test unit.

12. A travel process prediction system for predicting a travel process of a travel object traveling with transportation repeatedly operated at a specific time, comprising:

a processor;

a memory;

a passage time specifying unit for specifying passage time at which a travel object actually passes through each of a plurality of passage points at a departure/arrival facility of transportation;

a situation information acquiring unit for acquiring situation information indicating a situation specified by a plurality of items when the travel object uses transportation;

a boarding completion time specifying unit for specifying boarding completion time at which boarding of travel objects is actually completed for the transportation used by the travel object; and a travel process prediction apparatus for predicting a travel process of a travel object under a specific condition, wherein the travel process prediction apparatus includes:

a storage unit for storing the acquired situation information and a result of comparison between boarding completion time and passage time at each passage point, in an associated manner for each of the plurality of travel objects;

a situation information accepting unit for accepting a plurality of pieces of situation information indicating a plurality of situations in which an arbitrary travel object uses transportation;

a request accepting unit for accepting a request for comparing the results of comparison between passage time at a specific passage point and boarding completion time for the transportation used by the travel object in the plurality of situations;

an extraction unit for extracting, from the storage unit, a plurality of results of comparison between boarding completion time and the passage time at the specific passage point, associated with situation information having a same content as the accepted situation information, for each of the plurality of pieces of situation information;

a calculation unit for calculating at least one of a mean and variance of the extracted results of comparison for each of the plurality of pieces of situation information;

a test unit for statistically testing a difference in at least one of the mean and variance of the results of comparison calculated for each of the plurality of pieces of situation information; and an output unit for outputting a test result obtained by the test unit.

13. A travel process prediction apparatus for predicting a travel process of a travel object traveling with transportation repeatedly operated at a specific time, comprising:

a processor;

a memory;

a storage unit for storing passage time at which a travel object actually passes through each of a plurality of passage points at a departure/arrival facility of transportation, transportation specifying information which specifies transportation used by the travel object, and situation information indicating a situation in which the travel object uses the transportation, in an associated manner for each of a plurality of travel objects;

an extraction unit for extracting, from the storage unit, a plurality of combinations of passage time concerning a specific passage point and other information associated with the passage time; and a calculation unit for calculating, based on the extracted plurality of combinations, an estimate value of passage time at which a travel object passes through a specific passage point under a specific condition by conducting at least one of a regression analysis for obtaining a relationship between the passage time and said other information, and a calculation of at least one of a mean and variance of the passage time.

14. A travel process prediction apparatus for predicting a travel process of a travel object traveling with transportation repeatedly operated at a specific time, comprising:

a processor;

a memory;

a storage unit for storing elapsed time while a travel object passes through two passage points of a plurality of passage points at a departure/arrival facility of transportation, transportation specifying information which specifies transportation used by the travel object, and situation information indicating a situation in which the travel object uses the transportation, in an associated manner for each of a plurality of travel objects;

an extraction unit for extracting, from the storage unit, a plurality of combinations of elapsed time concerning two specific passage points and other information associated with the elapsed time; and a calculation unit for calculating, based on the extracted plurality of combinations, an estimate value of elapsed time while a travel object passes through two specific passage points under a specific condition by conducting at least one of a regression analysis for obtaining a relationship between the elapsed time and said other information, and a calculation of at least one of a mean and variance of the elapsed time.

15. A travel process prediction apparatus for predicting a travel process of a travel object traveling with transportation repeatedly operated at a specific time, comprising:

a processor;

a memory;

a storage unit for storing transportation specifying information which specifies transportation, situation information indicating a situation in which a travel object uses the transportation, and a result of comparison between passage time at which a travel object actually passes through each of a plurality of passage points at a departure/arrival facility of the transportation and boarding completion time at which boarding of travel objects is actually completed for the transportation, in an associated manner for each of a plurality of travel objects;

an extraction unit for extracting, from the storage unit, a plurality of combinations of a result of comparison between boarding completion time concerning specific transportation and passage time concerning a specific passage point, and other information associated with the result of comparison; and a calculation unit for calculating, based on the extracted plurality of combinations, an estimate value of a result of comparison between boarding completion time under a specific condition and passage time concerning a specific passage point by conducting at least one of a regression analysis for obtaining a relationship between the results of comparison and said other information, and a calculation of at least one of a mean and variance of the results of comparison.

16. A travel process prediction apparatus for predicting a travel process of a travel object traveling with repeatedly operated transportation, comprising:

a processor;
a memory;
a storage unit for storing passage time at which a travel object actually passes through one passage point or a plurality of passage points at a departure/arrival facility of transportation, transportation specifying information which specifies transportation used by the travel object, and situation information indicating a situation in which the travel object uses the transportation, in an associated manner for each of a plurality of travel objects;
an extraction unit for extracting, from the storage unit, a plurality of combinations of passage time concerning a specific passage point and other information associated with the passage time; and
a calculation unit for calculating a statistic of the passage time at which travel objects pass through a specific passage point under a specific condition, based on the extracted plurality of combinations by conducting at least one of a regression analysis for obtaining a relationship between the passage time and said other information and a calculation of at least one of a mean and variance of the passage time.

17. A travel process prediction apparatus for predicting a travel process of a travel object traveling with repeatedly operated transportation, comprising:
a processor;
a memory;
a storage unit for storing elapsed time while a travel object passes through two passage points of a plurality of passage points at a departure/arrival facility of transportation, transportation specifying information which specifies transportation used by the travel object, and situation information indicating a situation in which the travel object uses the transportation, in an associated manner for each of a plurality of travel objects;
an extraction unit for extracting, from the storage unit, a plurality of combinations of elapsed time concerning two specific passage points and other information associated with the elapsed time; and
a calculation unit for calculating, based on the extracted plurality of combinations, a statistic of the elapsed time while travel objects pass through two specific passage points under a specific condition by conducting at least one of a regression analysis for obtaining a relationship between the elapsed time and said other information and a calculation of at least one of a mean and variance of the elapsed time.

18. A travel process prediction apparatus for predicting a travel process of a travel object traveling with repeatedly operated transportation, comprising:
a processor;
a memory;
a storage unit for storing transportation specifying information which specifies transportation, situation information indicating a situation in which a travel object uses the transportation, and a result of comparison between passage time at which a travel object actually passes through one passage point or a plurality of passage points at a departure/arrival facility of the transportation and boarding completion time at which boarding of travel objects is actually completed for the transportation, in an associated manner for each of a plurality of travel objects;
an extraction unit for extracting, from the storage unit, a plurality of combinations of a result of comparison between boarding completion time concerning specific transportation and passage time concerning a specific passage point, and other information associated with the result of comparison; and
a calculation unit for calculating, based on the extracted plurality of combinations, a statistic of the results of comparison between passage time concerning a specific passage point and boarding completion time under a specific condition by conducting at least one of a regression analysis for obtaining a relationship between the result of comparison and said other information and a calculation of at least one of a mean and variance of the result of comparison.

19. A travel process prediction apparatus for predicting a travel process of a travel object traveling with transportation repeatedly operated at a specific time, comprising:
a processor;
a memory;
a storage unit for storing passage time at which a travel object actually passes through each of a plurality of passage points at a departure/arrival facility of transportation and transportation specifying information which specifies transportation used by the travel object, in an associated manner for each of a plurality of travel objects;
a transportation specifying information accepting unit for accepting a plurality of pieces of transportation specifying information which specifies a plurality of pieces of transportation which is candidates to be used by an arbitrary travel object;
a request accepting unit for accepting a request for comparing passage time at which the travel object passes through a specific passage point when the travel object uses each of the plurality of pieces of transportation;
an extraction unit for extracting, from the storage unit, for each of the plurality of pieces of transportation specifying information, a plurality of pieces of passage time concerning the specific passage point, associated with transportation specifying information having a same content as the accepted transportation specifying information;
a calculation unit for calculating, for each of the plurality of pieces of transportation specifying information, at least one of a mean and variance of the extracted passage time;
a test unit for statistically testing a difference in at least one of the mean and variance of the passage time calculated for each of the plurality of pieces of transportation specifying information; and
an output unit for outputting a test result obtained by the test unit.

20. A travel process prediction apparatus for predicting a travel process of a travel object traveling with transportation repeatedly operated at a specific time, comprising:
a processor;
a memory;
a storage unit for storing passage time at which a travel object actually passes through each of a plurality of passage points at a departure/arrival facility of transportation, and situation information indicating a situation specified by a plurality of items when the travel object uses transportation, in an associated manner for each of a plurality of travel objects;
a situation information accepting unit for accepting a plurality of pieces of situation information indicating a plurality of situations in which an arbitrary travel object uses transportation;

a request accepting unit for accepting a request for comparing passage time at which the travel object passes through a specific passage point when the travel object uses transportation in the plurality of situations;

an extraction unit for extracting, from the storage unit, for each of the plurality of pieces of situation information, a plurality of pieces of passage time concerning the specific passage point, associated with situation information having a same content as the accepted situation information;

a calculation unit for calculating at least one of a mean and variance of the extracted passage time for each of the plurality of pieces of situation information;

a test unit for statistically testing a difference in at least one of the mean and variance of the passage time calculated for each of the plurality of pieces of situation information; and an output unit for outputting a test result obtained by the test unit.

21. A travel process prediction apparatus for predicting a travel process of a travel object traveling with transportation repeatedly operated at a specific time, comprising:

a processor;

a memory;

a storage unit for storing elapsed time while a travel object passes through two passage points of a plurality of passage points at a departure/arrival facility of transportation, and transportation specifying information which specifies transportation used by the travel object, in an associated manner for each of a plurality of travel objects;

a transportation specifying information accepting unit for accepting a plurality of pieces of transportation specifying information which specifies a plurality of pieces of transportation which is candidates to be used by an arbitrary travel object;

a request accepting unit for accepting a request for comparing elapsed time while the travel object passes through two specific passage points when the travel object uses each of the plurality of pieces of transportation;

an extraction unit for extracting, from the storage unit, for each of the plurality of pieces of transportation specifying information, a plurality of pieces of elapsed time concerning the two specific passage points, associated with transportation specifying information having a same content as the accepted transportation specifying information;

a calculation unit for calculating, for each of the plurality of pieces of transportation specifying information, at least one of a mean and variance of the extracted elapsed time;

a test unit for statistically testing a difference in at least one of the mean and variance of the elapsed time calculated for each of the plurality of pieces of transportation specifying information; and an output unit for outputting a test result obtained by the test unit.

22. A travel process prediction apparatus for predicting a travel process of a travel object traveling with transportation repeatedly operated at a specific time, comprising:

a processor;

a memory;

a storage unit for storing elapsed time while a travel object passes through two passage points of a plurality of passage points at a departure/arrival facility of transportation and situation information indicating a situation specified by a plurality of items when the travel object uses transportation, in an associated manner for each of a plurality of travel objects;

a situation information accepting unit for accepting a plurality of pieces of situation information indicating a plurality of situations in which an arbitrary travel object uses transportation;

a request accepting unit for accepting a request for comparing elapsed time while the travel object passes through two specific passage points when the travel object uses transportation in the plurality of situations;

an extraction unit for extracting, from the storage unit, for each of the plurality of pieces of situation information, a plurality of pieces of elapsed time concerning the two specific passage points associated with situation information having a same content as the accepted situation information;

a calculation unit for calculating at least one of a mean and variance of the extracted elapsed time for each of the plurality of pieces of situation information;

a test unit for statistically testing a difference in at least one of the mean and variance of the elapsed time calculated for each of the plurality of pieces of situation information; and an output unit for outputting a test result obtained by the test unit.

23. A travel process prediction apparatus for predicting a travel process of a travel object traveling with transportation repeatedly operated at a specific time, comprising:

a processor;

a memory;

a storage unit for storing transportation specifying information which specifies transportation, and a result of comparison between passage time at which a travel object actually passes through each of a plurality of passage points at a departure/arrival facility of the transportation and boarding completion time at which boarding of travel objects is actually completed for the transportation, in an associated manner for each of a plurality of travel objects;

a transportation specifying information accepting unit for accepting a plurality of pieces of transportation specifying information which specifies a plurality of pieces of transportation which is candidates to be used by an arbitrary travel object;

a request accepting unit for accepting a request for comparing results of comparison between passage time at a specific passage point and boarding completion time for the plurality of pieces of transportation;

an extraction unit for extracting, from the storage unit, for each of the plurality of pieces of transportation specifying information, a plurality of results of comparison between boarding completion time and passage time at the specific passage point, associated with transportation specifying information having a same content as the accepted transportation specifying information;

a calculation unit for calculating at least one of a mean and variance of the extracted results of comparison for each of the plurality of pieces of transportation specifying information;

a test unit for statistically testing a difference in at least one of the mean and variance of the results of comparison calculated for each of the plurality of pieces of transportation specifying information; and an output unit for outputting a test result obtained by the test unit.

24. A travel process prediction apparatus for predicting a travel process of a travel object traveling with transportation repeatedly operated at a specific time, comprising:
- a processor;
- a memory;
- a storage unit for storing situation information indicating a situation specified by a plurality of items when a travel object uses transportation, and a result of comparison between passage time at which the travel object actually passes through each of a plurality of passage points at a departure/arrival facility of transportation and boarding completion time at which boarding of travel objects is actually completed for the transportation used by the travel object, in an associated manner for a plurality of travel objects;
- a situation information accepting unit for accepting a plurality of pieces of situation information indicating a plurality of situations in which an arbitrary travel object uses transportation;
- a request accepting unit for accepting a request for comparing results of comparison between passage time at a specific passage point and boarding completion time for the transportation used by the travel object in the plurality of situations;
- an extraction unit for extracting, from the storage unit, for each of the plurality of pieces of situation information, a plurality of results of comparison between passage time at the specific passage point and boarding completion time, associated with situation information having a same content as the accepted situation information;
- a calculation unit for calculating at least one of a mean and variance of the extracted results of comparison for each of the plurality of pieces of situation information;
- a test unit for statistically testing a difference in at least one of the mean and variance of the results of comparison calculated for each of the plurality of pieces of situation information; and
- an output unit for outputting a test result obtained by the test unit.

25. A non-transitory recording medium in which a computer program is recorded for making a computer predict a travel process of a travel object traveling with transportation operated repeatedly at a specific time, said computer program comprising the steps of:
- making a computer extract a plurality of combinations of passage time concerning a specific passage point and other information associated with the passage time from data including passage time at which a travel object actually passes through each of a plurality of passage points at a departure/arrival facility of transportation, transportation specifying information which specifies transportation used by the travel object and situation information indicating a situation in which the travel object uses the transportation, in an associated manner for each of a plurality of travel objects; and
- making a computer calculate, based on the extracted plurality of combinations, an estimate value of passage time at which a travel object passes through a specific passage point under a specific condition by conducting at least one of a regression analysis for obtaining a relationship between the passage time and said other information, and a calculation of at least one of a mean and variance of the passage time.

26. A non-transitory recording medium in which a computer program is recorded for making a computer predict a travel process of a travel object traveling with transportation operated repeatedly at a specific time, said computer program comprising the steps of:
- making a computer extract a plurality of combinations of elapsed time concerning two specific passage points and other information associated with the elapsed time from data including elapsed time while a travel object passes through two passage points of a plurality of passage points at a departure/arrival facility of transportation, transportation specifying information which specifies transportation used by the travel object and situation information indicating a situation in which the travel object uses the transportation, in an associated manner for each of the plurality of travel objects; and
- making a computer calculate, based on the extracted plurality of combinations, an estimate value of elapsed time while a travel object passes through two specific passage points under a specific condition by conducting at least one of a regression analysis for obtaining a relationship between the elapsed time and said other information, and a calculation of at least one of a mean and variance of the elapsed time.

27. A non-transitory recording medium in which a computer program is recorded for making a computer predict a travel process of a travel object traveling with transportation operated repeatedly at a specific time, said computer program comprising the steps of:
- making a computer extract a plurality of combinations of a result of comparison between passage time concerning a specific passage point and boarding completion time concerning specific transportation, and other information associated with the result of comparison, from data including transportation specifying information which specifies transportation, situation information indicating a situation in which a travel object uses the transportation, and a result of comparison between passage time at which the travel object actually passes through each of a plurality of passage points at a departure/arrival facility of the transportation and boarding completion time at which boarding of travel objects is actually completed for the transportation, in an associated manner for each of the plurality of travel objects; and
- making a computer calculate, based on the extracted plurality of combinations, an estimate value of a result of comparison between passage time concerning a specific passage point and boarding completion time under a specific condition by conducting at least one of a regression analysis for obtaining a relationship between the results of comparison and said other information, and a calculation of at least one of a mean and variance of the results of comparison.

28. A non-transitory recording medium in which a computer program is recorded for making a computer predict a travel process of a travel object traveling with repeatedly operated transportation, said computer program comprising the steps of:
- making a computer extract a plurality of combinations of passage time concerning a specific passage point and other information associated with the passage time from data including passage time at which a travel object actually passes through one passage point or a plurality of passage points at a departure/arrival facility of transportation, transportation specifying information which specifies transportation used by the travel object and situation information indicating a situation in which the travel object uses the transportation, in an associated manner for each of the travel objects; and making a computer calculate, based on the extracted plurality of combinations, a statistic of the passage time at which travel objects pass through a specific passage point under a specific condition by conducting at least one of a regression analysis for obtaining a relationship between the passage time and said other information and a calculation of at least one of a mean and variance of the passage time.

29. A non-transitory recording medium in which a computer program is recorded for making a computer predict a travel process of a travel object traveling with repeatedly operated transportation, said computer program comprising the steps of:

making a computer extract a plurality of combinations of elapsed time concerning two specific passage points and other information associated with the elapsed time from data including elapsed time while a travel object passes through two passage points of a plurality of passage points at a departure/arrival facility of transportation, transportation specifying information which specifies transportation used by the travel object and situation information indicating a situation in which the travel object uses the transportation, in an associated manner for each of the plurality of travel objects; and making a computer calculate, based on the extracted plurality of combinations, a statistic of elapsed time while the travel object passes through two specific passage points under a specific condition by conducting at least one of a regression analysis for obtaining a relationship between the elapsed time and said other information and a calculation of at least one of a mean and variance of the elapsed time.

30. A non-transitory recording medium in which a computer program is recorded for making a computer predict a travel process of a travel object traveling with repeatedly operated transportation, said computer program comprising the steps of:

making a computer extract a plurality of combinations of a result of comparison between passage time concerning a specific passage point and boarding completion time concerning specific transportation, and other information associated with the result of comparison, from data including transportation specifying information which specifies transportation, situation information indicating a situation in which a travel object uses the transportation, and a result of comparison between passage time at which the travel object actually passes through one passage point or a plurality of passage points at a departure/arrival facility of the transportation and boarding completion time at which boarding of travel objects is actually completed for the transportation, in an associated manner for each of the plurality of travel objects; and making a computer calculate, based on the extracted plurality of combinations, a statistic of the results of comparison between passage time concerning a specific passage point and boarding completion time under a specific condition by conducting at least one of a regression analysis for obtaining a relationship between the result of comparison and said other information and a calculation of at least one of a mean and variance of the result of comparison.

31. A non-transitory recording medium in which a computer program is recorded for making a computer conduct a comparison in passage time at which a travel object traveling with transportation repeatedly operated at a specific time passes through a specific passage point when the travel object uses each of the plurality of pieces of transportation, said computer program comprising the steps of:

making a computer extract, when data, including passage time at which a travel object actually passes through each of a plurality of passage points provided at a departure/arrival facility of transportation and including transportation specifying information that specifies transportation which is used by the travel object and which is specified by a plurality of items, are stored in an associated manner for each of the plurality of travel objects and when a plurality of pieces of transportation specifying information which specifies a plurality of pieces of transportation which is candidates to be used by an arbitrary travel object is accepted, a plurality of pieces of passage time which concerns the specific passage point and which is associated with transportation specifying information having a same content as the accepted transportation specifying information, from the data, for each of the plurality of pieces of transportation specifying information;

making a computer calculate, for each of the plurality of pieces of transportation specifying information, at least one of a mean and variance of the extracted passage time; and making a computer statistically test a difference in at least one of the mean and variance of the passage time calculated for each of the plurality of pieces of transportation specifying information.

32. A non-transitory recording medium in which a computer program is recorded for making a computer conduct a comparison in passage time at which a travel object traveling with transportation repeatedly operated at a specific time passes through a specific passage point when the travel object uses the transportation in a plurality of situations, said computer program comprising the steps of:

making a computer extract, when data, including passage time at which a travel object actually passes through each of a plurality of passage points provided at a departure/arrival facility of transportation and including situation information indicating a situation specified by a plurality of items at a time when the travel object uses transportation, are stored in an associated manner for each of the plurality of travel objects and when a plurality of pieces of situation information indicating a plurality of situations in which an arbitrary travel object uses transportation is accepted, a plurality of pieces of passage time which concerns the specific passage point and which is associated with situation information having a same content as the accepted situation information, from the data, for each of the plurality of pieces of situation information;

making a computer calculate, for each of the plurality of pieces of situation information, at least one of a mean and variance of the extracted passage time; and making a computer statistically test a difference in at least one of the mean and variance of the passage time calculated for each of the plurality of pieces of situation information.

33. A non-transitory recording medium in which a computer program is recorded for making a computer conduct a comparison in elapsed time while a travel object traveling with transportation repeatedly operated at a specific time passes through two specific passage points when the travel object uses each of the plurality of pieces of transportation, said computer program comprising the steps of:

making a computer extract, when data, including elapsed time while a travel object passes through two passage points of a plurality of passage points provided at a departure/arrival facility of transportation and including transportation specifying information that specifies transportation which is used by the travel object and which is specified by a plurality of items, are stored in an associated manner for each of the plurality of travel objects and when a plurality of pieces of transportation specifying information which specifies a plurality of pieces of transportation which is candidates to be used by an arbitrary travel object is accepted, a plurality of pieces of elapsed time which concerns the two specific passage points and which is associated with transportation specifying information having a same content as the accepted transportation specifying information, from the data, for each of the plurality of pieces of transportation specifying information;

making a computer calculate at least one of a mean and variance of the extracted elapsed time for each of the plurality of pieces of transportation specifying information; and making a computer statistically test a difference in at least one of the mean and variance of the elapsed time calculated for each of the plurality of pieces of transportation specifying information.

34. A non-transitory recording medium in which a computer program is recorded for making a computer conduct a comparison in elapsed time while a travel object traveling with transportation repeatedly operated at a specific time passes through two specific passage points when the travel object uses the transportation in a plurality of situations, said computer program comprising the steps of:

making a computer extract, when data, including elapsed time while a travel object passes through two passage points of a plurality of passage points provided at a departure/arrival facility of transportation and including situation information indicating a situation specified by a plurality of items at a time when the travel object uses transportation, are stored in an associated manner for each of the plurality of travel objects and when a plurality of pieces of situation information indicating a plurality of situations in which an arbitrary travel object uses transportation is accepted, a plurality of pieces of elapsed time which concerns the two specific passage points and which is associated with situation information having a same content as the accepted situation information, from the data, for each of the plurality of pieces of situation information;

making a computer calculate at least one of a mean and variance of the extracted elapsed time for each of the plurality of pieces of situation information; and making a computer statistically test a difference in at least one of the mean and variance of the elapsed time calculated for each of the plurality of pieces of situation information.

35. A non-transitory recording medium in which a computer program is recorded for making a computer conduct a comparison in results of comparison between passage time at which a travel object traveling with transportation repeatedly operated at a specific time passes through a specific passage point when the travel object uses the plurality of pieces of transportation, and boarding completion time at which boarding the transportation is completed, said computer program comprising the steps of:

making a computer extract, when data, including transportation specifying information which specifies transportation by a plurality of items and including results of comparison between passage time at which a travel object actually passes through each of a plurality of passage points at a departure/arrival facility of the transportation and boarding completion time at which boarding of travel objects is actually completed for the transportation, are stored in an associated manner for each of the plurality of travel objects and when a plurality of pieces of transportation specifying information which specifies a plurality of pieces of transportation which is candidates to be used by an arbitrary travel objet is accepted, a plurality of results of comparison between passage time at the specific passage point and boarding completion time which are associated with transportation specifying information having a same content as the accepted transportation specifying information, from the data, for each of the plurality of pieces of transportation specifying information;

making a computer calculate, for each of the plurality of pieces of transportation specifying information, at least one of a mean and variance of the extracted results of comparison; and making a computer statistically test a difference in at least one of the mean and variance of the results of comparison calculated for each of the plurality of pieces of transportation specifying information.

36. A non-transitory recording medium in which a computer program is recorded for making a computer conduct a comparison in results of comparison between passage time at which a travel object traveling with transportation repeatedly operated at a specific time passes through a specific passage point when the travel object uses the transportation in a plurality of situations, and boarding completion time at which boarding the transportation is completed, said computer program comprising the steps of:

making a computer extract, when data, including situation information indicating a situation specified by a plurality of items at a time when a travel object uses transportation and including results of comparison between passage time at which the travel object actually passes through each of a plurality of passage points at a departure/arrival facility of transportation and boarding completion time at which boarding of travel objects is actually completed for the transportation used by the travel object, are stored in an associated manner for each of the plurality of travel objects and when a plurality of pieces of situation information indicating a plurality of situations in which an arbitrary travel object uses transportation is accepted, a plurality of results of comparison between passage time at the specific passage point and boarding completion time which are associated with situation information having a same content as the accepted situation information, from the data, for each of the plurality of pieces of situation information;

making a computer calculate, for each of the plurality of pieces of situation information, at least one of a mean and variance of the extracted results of comparison; and making a computer statistically test a difference in at least one of the mean and variance of the results of comparison calculated for each of the plurality of pieces of situation information.

* * * * *